(12) United States Patent
Lei et al.

(10) Patent No.: US 12,089,139 B2
(45) Date of Patent: Sep. 10, 2024

(54) TECHNIQUES FOR ADAPTATIVELY REQUESTING ON-DEMAND SYSTEM INFORMATION

(71) Applicant: QUALCOMM Incorporated, San Diego, CA (US)

(72) Inventors: Jing Lei, San Diego, CA (US); Yongjun Kwak, San Diego, CA (US); Linhai He, San Diego, CA (US); Miguel Griot, La Jolla, CA (US); Wanshi Chen, San Diego, CA (US); Peter Gaal, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/466,915

(22) Filed: Sep. 3, 2021

(65) Prior Publication Data

US 2022/0104109 A1    Mar. 31, 2022

Related U.S. Application Data

(60) Provisional application No. 63/084,441, filed on Sep. 28, 2020.

(51) Int. Cl.
*H04W 48/14* (2009.01)
*H04W 72/51* (2023.01)

(52) U.S. Cl.
CPC ........... *H04W 48/14* (2013.01); *H04W 72/51* (2023.01)

(58) Field of Classification Search
CPC ..... H04W 48/14; H04W 72/51; H04W 48/12; H04W 4/70
See application file for complete search history.

(56) References Cited

U.S. PATENT DOCUMENTS

| 11,570,693 | B2 * | 1/2023 | Jiang | H04W 48/10 |
| 11,576,093 | B2 * | 2/2023 | Kubota | H04W 48/12 |
| 11,711,841 | B2 * | 7/2023 | Khirallah | H04W 72/23 |
| 2016/0234759 | A1 * | 8/2016 | Kubota | H04W 48/14 |
| 2018/0249387 | A1 * | 8/2018 | Zhang | H04W 74/0833 |

(Continued)

FOREIGN PATENT DOCUMENTS

| WO | WO-2017209478 A1 * | 12/2017 | H04L 1/0038 |
| WO | WO-2021257971 A1 * | 12/2021 | |

(Continued)

OTHER PUBLICATIONS

Vodafone Group PLC: "NB-Iot on Demand System information", 3GPP Draft; R2-1711826, Oct. 8, 2017 (Year: 2017).*

(Continued)

*Primary Examiner* — Yuwen Pan
*Assistant Examiner* — Swati Jain
(74) *Attorney, Agent, or Firm* — Holland & Hart LLP

(57) ABSTRACT

Methods, systems, and devices for wireless communications are described. A user equipment (UE) may be configured to receive first system information from a base station, the first system information being for reduced-capability UEs including UEs with a bandwidth capability below a threshold, the UE being a reduced-capability UE. The UE may evaluate the first system information for a dedicated field that includes an indicator that additional system information for reduced-capability UEs is to be received in response to on-demand requests. Subsequently, the UE may obtain the additional system information for reduced-capability UEs in accordance with information included in either the dedicated field when the dedicated field is included in the first system information or in a configuration information element of the first system information when the dedicated field is absent from the first system information.

30 Claims, 16 Drawing Sheets

(56) References Cited

U.S. PATENT DOCUMENTS

| | | | | |
|---|---|---|---|---|
| 2018/0288748 | A1* | 10/2018 | Horn | H04W 72/23 |
| 2019/0110217 | A1* | 4/2019 | Nam | H04W 72/044 |
| 2019/0124568 | A1* | 4/2019 | Kubota | H04L 12/18 |
| 2019/0261421 | A1* | 8/2019 | Peisa | H04W 74/0833 |
| 2020/0022131 | A1* | 1/2020 | Li | H04W 72/23 |
| 2020/0053777 | A1* | 2/2020 | Babaei | H04L 1/1812 |
| 2020/0084708 | A1* | 3/2020 | Ingale | H04W 48/16 |
| 2020/0100170 | A1* | 3/2020 | Babaei | H04W 74/006 |
| 2020/0107248 | A1* | 4/2020 | Brismar | H04W 48/12 |
| 2020/0163002 | A1* | 5/2020 | Liu | H04W 36/26 |
| 2020/0322878 | A1* | 10/2020 | Prabhakar | H04W 48/12 |
| 2020/0389838 | A1* | 12/2020 | Breuer | H04W 48/12 |
| 2021/0329718 | A1* | 10/2021 | Hu | H04W 76/11 |
| 2022/0124716 | A1* | 4/2022 | Fu | H04L 1/0038 |
| 2023/0012497 | A1* | 1/2023 | Lee | H04W 72/0453 |
| 2023/0042361 | A1* | 2/2023 | Wu | H04W 74/006 |
| 2023/0164781 | A1* | 5/2023 | Kim | H04W 48/02 370/329 |
| 2023/0189308 | A1* | 6/2023 | Choi | H04W 72/1273 370/329 |
| 2023/0319841 | A1* | 10/2023 | Ratasuk | H04L 1/0063 370/329 |

FOREIGN PATENT DOCUMENTS

| | | | |
|---|---|---|---|
| WO | WO-2022031062 | A1 * | 2/2022 |
| WO | WO-2023205029 | A1 * | 10/2023 |

OTHER PUBLICATIONS

Mediatek Inc: "On-demand S! Delivery", 3GPP Draft; R2-166573 On-Demand SI Deuvery V1 .0, Sep. 30, 2016 (Year: 2016).*

Mediatek Inc: "On-demand S! Delivery", 3GPP Draft; R2-166573 On-Demand SI Delivery V1 .0, Sep. 30, 2016. (Year: 2016).*

International Search Report and Written Opinion—PCT/US2021/049293—ISA/EPO—Dec. 6, 2021.

Mediatek Inc: "On-Demand SI Delivery", 3GPP TSG-RAN2 #95bis Meeting, 3GPP Draft, R2-166573 On-Demand SI Delivery V1.0, 3rd Generation Partnership Project (3GPP), Mobile Competence Centre, 650, Route Des Lucioles, F-06921 Sophia-Antipolis Cedex, France, vol. RAN WG2, No. Kaohsiung, Taiwan, Oct. 10, 2016-Oct. 14, 2016, Sep. 30, 2016 (Sep. 30, 2016), 4 Pages, XP051161766, Retrieved from the Internet: URL: https://www.3gpp.org/ftp/tsg_ran/wg2_rl2/TSGR2_95bis/Docs/ [retrieved on Sep. 30, 2016], Paragraphs [0031]-[0075].

Vodafone Group PLC: "NB-Iot on Demand System Information", 3GPP TSG RAN WG2 #99-bis, 3GPP Draft, R2-1711826, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, Oct. 8, 2017 (Oct. 8, 2017), 1 Page, XP051343781, Retrieved from the Internet: URL: https://www.3gpp.org/ftp/TSG_RAN/WG2_RL2/TSGR2_99bis/Docs/ [retrieved on Oct. 8, 2017], p. 1.

* cited by examiner

TECHNIQUES FOR ADAPTATIVELY REQUESTING ON-DEMAND SYSTEM INFORMATION

CROSS REFERENCE

The present application for patent claims the benefit of U.S. Provisional Patent Application No. 63/084,441 by LEI et al., entitled "TECHNIQUES FOR ADAPTIVELY REQUESTING ON-DEMAND SYSTEM INFORMATION," filed Sep. 28, 2020, assigned to the assignee hereof, and expressly incorporated by reference herein.

FIELD OF TECHNOLOGY

The following relates to wireless communications, including techniques for adaptively requesting on-demand system information (ODSI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, base stations may be configured to support both regular, full-capability UEs (e.g., full-bandwidth UEs) as well as reduced-capability UEs (e.g., reduced-bandwidth UEs). Due to the reduced bandwidth capabilities, reduced-capability UEs may be unable to receive system information (e.g., master information blocks (MIBs) or system information blocks (SIBs)) which is broadcast by the network using bandwidths receivable by regular, full-capability UEs.

SUMMARY

The described techniques relate to improved methods, systems, devices, and apparatuses that support techniques for adaptively requesting on-demand system information (ODSI). Generally, the described techniques are directed to signaling which may be used to indicate whether system information for reduced-capability user equipments (UEs) may be broadcast on-demand. For example, a reduced-capability UE may receive a first system information for reduced-capability or reduced-bandwidth (RB) UEs. The first system information may include a reduced-bandwidth system information block (RB-SIB1) or a reduced-bandwidth master information block (RB-MIB), each of which may be received within a reduced-bandwidth synchronization signal block (RB-SSB). Upon receiving the first system information, the UE may determine whether the first system information includes a dedicated field which indicates whether or not additional system information for reduced-capability UEs (e.g., RB-SIB2, RB-SIB3) may be received in response to on-demand requests. The UE may then determine whether additional system information may be received in response to on-demand requests based on the dedicated field if the dedicated field is included within the first system information. Alternatively, if the dedicated field is not included within the first system information, the UE may determine whether additional system information may be received in response to on-demand requests based on a configuration information element of the first system information. In this regard, the dedicated field may serve as an efficient, early indicator as to whether or not a network is configured for ODSI.

A method for wireless communication at a UE is described. The method may include receiving first system information from a base station, the first system information being for reduced-capability UEs including UEs with a bandwidth capability below a threshold, the UE being a reduced-capability UE, evaluating the first system information for a dedicated field that includes an indicator that additional system information for reduced-capability UEs is to be received in response to on-demand requests, and obtaining the additional system information for reduced-capability UEs in accordance with information included in either the dedicated field when the dedicated field is included in the first system information or in a configuration information element of the first system information when the dedicated field is absent from the first system information.

An apparatus for wireless communication at a UE is described. The apparatus may include a processor, memory coupled with the processor, and instructions stored in the memory. The instructions may be executable by the processor to cause the apparatus to receive first system information from a base station, the first system information being for reduced-capability UEs including UEs with a bandwidth capability below a threshold, the UE being a reduced-capability UE, evaluate the first system information for a dedicated field that includes an indicator that additional system information for reduced-capability UEs is to be received in response to on-demand requests, and obtain the additional system information for reduced-capability UEs in accordance with information included in either the dedicated field when the dedicated field is included in the first system information or in a configuration information element of the first system information when the dedicated field is absent from the first system information.

Another apparatus for wireless communication at a UE is described. The apparatus may include means for receiving first system information from a base station, the first system information being for reduced-capability UEs including UEs with a bandwidth capability below a threshold, the UE being a reduced-capability UE, means for evaluating the first system information for a dedicated field that includes an indicator that additional system information for reduced-capability UEs is to be received in response to on-demand requests, and means for obtaining the additional system information for reduced-capability UEs in accordance with information included in either the dedicated field when the dedicated field is included in the first system information or in a configuration information element of the first system information when the dedicated field is absent from the first system information.

A non-transitory computer-readable medium storing code for wireless communication at a UE is described. The code may include instructions executable by a processor to receive first system information from a base station, the first system information being for reduced-capability UEs including UEs with a bandwidth capability below a threshold, the UE being a reduced-capability UE, evaluate the first system information for a dedicated field that includes an indicator that additional system information for reduced-capability UEs is to be received in response to on-demand requests, and obtain the additional system information for reduced-capability UEs in accordance with information included in either the dedicated field when the dedicated field is included in the first system information or in a configuration information element of the first system information when the dedicated field is absent from the first system information.

In some examples of the method, apparatuses, and non-transitory computer-readable medium described herein, obtaining the additional system information for reduced-capability UEs may include operations, features, means, or instructions for determining that the additional system information may be to be received in response to on-demand requests based on the information included in either the dedicated field or in the configuration information element and transmitting, to the base station, a request for the additional system information in accordance with the information included in either the dedicated field or in the configuration information element.

In some examples of the method, apparatuses, and non-transitory computer-readable medium described herein, obtaining the additional system information for reduced-capability UEs may include operations, features, means, or instructions for identifying a system information request mode from the information included in either the dedicated field or in the configuration information element and transmitting, to the base station and in accordance with the system information request mode, a request for the additional system information via a set of resources associated with a physical random access channel (PRACH), a sounding reference signal (SRS), a physical uplink shared channel (PUSCH), or a physical uplink control channel (PUCCH).

In some examples of the method, apparatuses, and non-transitory computer-readable medium described herein, obtaining the additional system information for reduced-capability UEs may include operations, features, means, or instructions for identifying a system information request mode from the information included in either the dedicated field or in the configuration information element and obtaining the additional system information from the base station in accordance with the system information request mode without transmitting a request for the additional system information.

Some examples of the method, apparatuses, and non-transitory computer-readable medium described herein may further include operations, features, means, or instructions for determining a set of thresholds for transmitting a request for the additional system information based on the information included in the dedicated field or in the configuration information element and transmitting, to the base station, the request for the additional system information based on determining that the UE satisfies at least one threshold of the set of thresholds.

In some examples of the method, apparatuses, and non-transitory computer-readable medium described herein, the dedicated field includes one or more bit fields and determining the set of thresholds may be based on one or more values of the one or more bit fields of the dedicated field.

In some examples of the method, apparatuses, and non-transitory computer-readable medium described herein, the set of thresholds for transmitting the request for the additional system information include a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

Some examples of the method, apparatuses, and non-transitory computer-readable medium described herein may further include operations, features, means, or instructions for receiving, via the first system information, an indication of a second downlink bandwidth part (BWP) for obtaining the additional system information, where the additional system information may be obtained via the second downlink BWP, where the second downlink BWP may be associated with reduced-capability UEs, and where the second downlink BWP may be the same as the first downlink BWP or different from the first downlink BWP.

Some examples of the method, apparatuses, and non-transitory computer-readable medium described herein may further include operations, features, means, or instructions for transmitting, to the base station, a request for the additional system information via an uplink BWP associated with reduced-capability UEs, where the uplink BWP may be indicated via the first system information.

In some examples of the method, apparatuses, and non-transitory computer-readable medium described herein, the dedicated field includes one or more bit fields, a first value of a bit field of the one or more bit fields indicates that the additional system information for reduced-capability UEs may be to be received in response to on-demand requests, and a second value of the bit field of the one or more bit fields indicates that the additional system information for reduced-capability UEs may be not to be received in response to on-demand requests.

Some examples of the method, apparatuses, and non-transitory computer-readable medium described herein may further include operations, features, means, or instructions for determining a set of additional system informations for reduced-capability UEs which may be requested based on the information included in the dedicated field or in the configuration information element, where the set of additional system informations include synchronization signal blocks (SSBs), downlink broadcast reference signals, control resource set configurations (CORESETs), common search space (CSS) configurations for random access procedures, paging and system information update information, or any combination thereof and transmitting, to the base station, an indication of the additional system information included within the set of additional system informations, where obtaining the additional system information may be based on transmitting the indication of the additional system information.

Some examples of the method, apparatuses, and non-transitory computer-readable medium described herein may further include operations, features, means, or instructions for determining a set of parameters usable by the base station to transmit the additional system information based on the information included in the dedicated field or in the configuration information element and transmitting, to the base station, an indication of one or more parameters included within the set of parameters, where obtaining the additional system information may be based on transmitting the indication of the one or more parameters.

In some examples of the method, apparatuses, and non-transitory computer-readable medium described herein, the one or more parameters includes a modulation and coding scheme (MCS), a code rate, or both.

In some examples of the method, apparatuses, and non-transitory computer-readable medium described herein, the one or more parameters used to obtain the additional system information may be different from at least one parameter used to receive the first system information.

Some examples of the method, apparatuses, and non-transitory computer-readable medium described herein may further include operations, features, means, or instructions for determining a periodicity associated with the additional system information based on the information included in the dedicated field or in the configuration information element, where obtaining the additional system information may be based on determining the periodicity.

In some examples of the method, apparatuses, and non-transitory computer-readable medium described herein, the periodicity associated with the additional system information may be different from a periodicity associated with the first system information and the periodicity associated with the additional system information may be based on information included within the additional system information, the information including SSBs, downlink broadcast reference signals, CORESETs, CSS configurations for random access procedures, paging and system information update information, or any combination thereof.

In some examples of the method, apparatuses, and non-transitory computer-readable medium described herein, the first system information includes a system information block (SIB) of a first type and the method, apparatuses, and non-transitory computer-readable medium may include further operations, features, means, or instructions for receiving, via the first system information, an indication of one or more downlink BWP configurations associated with reduced-capability UEs for receiving the first system information, one or more uplink BWP configurations associated with reduced-capability UEs for transmitting requests for the additional system information, one or more additional downlink BWP configurations associated with reduced-capability UEs for receiving the additional system information, or any combination thereof.

In some examples of the method, apparatuses, and non-transitory computer-readable medium described herein, the additional system information includes a SIB of a second type which may be different from the first type, a MIB of a second type, or a combination thereof.

In some examples of the method, apparatuses, and non-transitory computer-readable medium described herein, the first system information may be received multiplexed with other system information receivable by the other UEs.

In some examples of the method, apparatuses, and non-transitory computer-readable medium described herein, the first system information may be received via a physical broadcast channel (PBCH) associated with reduced-capability UEs, a physical downlink shared channel (PDSCH) associated with reduced-capability UEs, or both.

A method for wireless communication at a base station is described. The method may include transmitting first system information to a UE, the first system information being for reduced-capability UEs including UEs with a bandwidth capability below a threshold, the UE being a reduced-capability UE, evaluating the first system information for a dedicated field that includes an indicator that additional system information for reduced-capability UEs is to be transmitted in response to on-demand requests, and transmitting the additional system information for reduced-capability UEs in accordance with information included in either the dedicated field when the dedicated field is included in the first system information or in a configuration information element of the first system information when the dedicated field is absent from the first system information.

An apparatus for wireless communication at a base station is described. The apparatus may include a processor, memory coupled with the processor, and instructions stored in the memory. The instructions may be executable by the processor to cause the apparatus to transmit first system information to a UE, the first system information being for reduced-capability UEs including UEs with a bandwidth capability below a threshold, the UE being a reduced-capability UE, evaluate the first system information for a dedicated field that includes an indicator that additional system information for reduced-capability UEs is to be transmitted in response to on-demand requests, and transmit the additional system information for reduced-capability UEs in accordance with information included in either the dedicated field when the dedicated field is included in the first system information or in a configuration information element of the first system information when the dedicated field is absent from the first system information.

Another apparatus for wireless communication at a base station is described. The apparatus may include means for transmitting first system information to a UE, the first system information being for reduced-capability UEs including UEs with a bandwidth capability below a threshold, the UE being a reduced-capability UE, means for evaluating the first system information for a dedicated field that includes an indicator that additional system information for reduced-capability UEs is to be transmitted in response to on-demand requests, and means for transmitting the additional system information for reduced-capability UEs in accordance with information included in either the dedicated field when the dedicated field is included in the first system information or in a configuration information element of the first system information when the dedicated field is absent from the first system information.

A non-transitory computer-readable medium storing code for wireless communication at a base station is described. The code may include instructions executable by a processor to transmit first system information to a UE, the first system information being for reduced-capability UEs including UEs with a bandwidth capability below a threshold, the UE being a reduced-capability UE, evaluate the first system information for a dedicated field that includes an indicator that additional system information for reduced-capability UEs is to be transmitted in response to on-demand requests, and transmit the additional system information for reduced-capability UEs in accordance with information included in either the dedicated field when the dedicated field is included in the first system information or in a configuration information element of the first system information when the dedicated field is absent from the first system information.

In some examples of the method, apparatuses, and non-transitory computer-readable medium described herein, transmitting the additional system information for reduced-capability UEs may include operations, features, means, or instructions for determining that the additional system information may be to be transmitted in response to on-demand requests based on the information included in either the dedicated field or in the configuration information element and receiving, from the UE, a request for the additional system information in accordance with the information included in either the dedicated field or in the configuration information element.

In some examples of the method, apparatuses, and non-transitory computer-readable medium described herein, transmitting the additional system information for reduced-capability UEs may include operations, features, means, or instructions for identifying a system information request mode from the information included in either the dedicated field or in the configuration information element and receiving, from the UE and in accordance with the system information request mode, a request for the additional system information via a set of resources associated with a PRACH, a SRS, a PUSCH, or a PUCCH.

In some examples of the method, apparatuses, and non-transitory computer-readable medium described herein, transmitting the additional system information for reduced-capability UEs may include operations, features, means, or instructions for identifying a system information request mode from the information included in either the dedicated field or in the configuration information element and transmitting the additional system information from the base station in accordance with the system information request mode without receiving a request for the additional system information.

Some examples of the method, apparatuses, and non-transitory computer-readable medium described herein may further include operations, features, means, or instructions for determining a set of thresholds for transmitting a request for the additional system information based on the information included in the dedicated field or in the configuration information element and receiving, from the UE, the request for the additional system information based on the UE satisfying at least one threshold of the set of thresholds, where the set of thresholds include a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

In some examples of the method, apparatuses, and non-transitory computer-readable medium described herein, the first system information, the additional system information, or both, may be received via a downlink BWP associated with reduced-capability UEs.

Some examples of the method, apparatuses, and non-transitory computer-readable medium described herein may further include operations, features, means, or instructions for receiving, from the UE, a request for the additional system information via an uplink BWP associated with reduced-capability UEs.

In some examples of the method, apparatuses, and non-transitory computer-readable medium described herein, the dedicated field includes one or more bit fields, a first value of a bit field of the one or more bit fields indicates that the additional system information for reduced-capability UEs may be to be received in response to on-demand requests, and a second value of the bit field of the one or more bit fields indicates that the additional system information for reduced-capability UEs may be not to be received in response to on-demand requests.

A method for wireless communication at a UE is described. The method may include receiving first system information from a base station, the first system information being for reduced-capability UEs including UEs with a bandwidth capability below a threshold, the UE being a reduced-capability UE, evaluating the first system information for a dedicated field that includes an indicator that additional system information for reduced-capability UEs is to be received in response to on-demand requests, and obtaining the additional system information for reduced-capability UEs in accordance with information included in either the dedicated field when the dedicated field is included in the first system information or in a configuration information element of the first system information when the dedicated field is absent from the first system information.

An apparatus for wireless communication at a UE is described. The apparatus may include a processor, memory in electronic communication with the processor, and instructions stored in the memory. The instructions may be executable by the processor to cause the apparatus to receive first system information from a base station, the first system information being for reduced-capability UEs including UEs with a bandwidth capability below a threshold, the UE being a reduced-capability UE, evaluate the first system information for a dedicated field that includes an indicator that additional system information for reduced-capability UEs is to be received in response to on-demand requests, and obtain the additional system information for reduced-capability UEs in accordance with information included in either the dedicated field when the dedicated field is included in the first system information or in a configuration information element of the first system information when the dedicated field is absent from the first system information.

Another apparatus for wireless communication at a UE is described. The apparatus may include means for receiving first system information from a base station, the first system information being for reduced-capability UEs including UEs with a bandwidth capability below a threshold, the UE being a reduced-capability UE, means for evaluating the first system information for a dedicated field that includes an indicator that additional system information for reduced-capability UEs is to be received in response to on-demand requests, and means for obtaining the additional system information for reduced-capability UEs in accordance with information included in either the dedicated field when the dedicated field is included in the first system information or in a configuration information element of the first system information when the dedicated field is absent from the first system information.

A non-transitory computer-readable medium storing code for wireless communication at a UE is described. The code may include instructions executable by a processor to receive first system information from a base station, the first system information being for reduced-capability UEs including UEs with a bandwidth capability below a threshold, the UE being a reduced-capability UE, evaluate the first system information for a dedicated field that includes an indicator that additional system information for reduced-capability UEs is to be received in response to on-demand requests, and obtain the additional system information for reduced-capability UEs in accordance with information included in either the dedicated field when the dedicated field is included in the first system information or in a configuration information element of the first system information when the dedicated field is absent from the first system information.

Some examples of the method, apparatuses, and non-transitory computer-readable medium described herein may further include operations, features, means, or instructions for determining that the additional system information may be received in response to on-demand requests based on the information included in either the dedicated field or in the configuration information element and transmitting, to the base station, a request for the additional system information in accordance with the information included in either the dedicated field or in the configuration information element.

Some examples of the method, apparatuses, and non-transitory computer-readable medium described herein may further include operations, features, means, or instructions for identifying a system information request mode from the information included in either the dedicated field or in the configuration information element and transmitting, to the base station and in accordance with the system information request mode, a request for the additional system information via a set of resources associated with a PRACH or an SRS.

Some examples of the method, apparatuses, and non-transitory computer-readable medium described herein may further include operations, features, means, or instructions for identifying a system information request mode from the information included in either the dedicated field or in the configuration information element and transmitting, to the base station and in accordance with the system information request mode, a request for the additional system information via a set of resources associated with a PUSCH or a PUCCH.

Some examples of the method, apparatuses, and non-transitory computer-readable medium described herein may further include operations, features, means, or instructions for identifying a system information request mode from the information included in either the dedicated field or in the configuration information element and transmitting, to the base station and in accordance with the system information request mode, a request for the additional system information via a set of resources associated with a PRACH, an SRS, a PUSCH, or a PUCCH.

Some examples of the method, apparatuses, and non-transitory computer-readable medium described herein may further include operations, features, means, or instructions for identifying a system information request mode from the information included in either the dedicated field or in the configuration information element and obtaining the additional system information from the base station in accordance with the system information request mode without transmitting a request for the additional system information.

Some examples of the method, apparatuses, and non-transitory computer-readable medium described herein may further include operations, features, means, or instructions for determining a set of thresholds for transmitting a request for the additional system information based on the information included in the dedicated field or in the configuration information element and transmitting, to the base station, the request for the additional system information based on determining that the UE satisfies at least one threshold of the set of thresholds.

In some examples of the method, apparatuses, and non-transitory computer-readable medium described herein, the dedicated field includes one or more bit fields, and determining the set of thresholds may be based on one or more values of the one or more bit fields of the dedicated field.

In some examples of the method, apparatuses, and non-transitory computer-readable medium described herein, the set of thresholds for transmitting the request for the additional system information include a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

In some examples of the method, apparatuses, and non-transitory computer-readable medium described herein, the dedicated field includes one or more bit fields, a first value of a bit field of the one or more bit fields indicates that the additional system information for reduced-capability UEs may be received in response to on-demand requests, and a second value of the bit field of the one or more bit fields indicates that the additional system information for reduced-capability UEs may be not to be received in response to on-demand requests.

Some examples of the method, apparatuses, and non-transitory computer-readable medium described herein may further include operations, features, means, or instructions for determining a set of additional system informations broadcasts which may be requested based on the information included in the dedicated field or in the configuration information element and transmitting, to the base station, an indication of the additional system information included within the set of additional system informations, wherein obtaining the additional system information may be based on transmitting the indication of the additional system information.

Some examples of the method, apparatuses, and non-transitory computer-readable medium described herein may further include operations, features, means, or instructions for determining a set of parameters usable by the base station to transmit the additional system information based on the information included in the dedicated field or in the configuration information element and transmitting, to the base station, an indication of one or more parameters included within the set of parameters, wherein obtaining the additional system information may be based on transmitting the indication of the one or more parameters.

In some examples of the method, apparatuses, and non-transitory computer-readable medium described herein, the one or more parameters includes an MCS, a code rate, or both.

In some examples of the method, apparatuses, and non-transitory computer-readable medium described herein, the one or more parameters used to obtain the additional system information may be different from at least one parameter used to receive the first system information.

Some examples of the method, apparatuses, and non-transitory computer-readable medium described herein may further include operations, features, means, or instructions for determining a periodicity associated with the additional system information based on the information included in the dedicated field or in the configuration information element, wherein obtaining the additional system information may be based on determining the periodicity.

In some examples of the method, apparatuses, and non-transitory computer-readable medium described herein, the periodicity associated with the additional system information may be different from a periodicity associated with the first system information.

In some examples of the method, apparatuses, and non-transitory computer-readable medium described herein, the first system information includes a SIB of a first type, an MIB, an SSB, or any combination thereof.

In some examples of the method, apparatuses, and non-transitory computer-readable medium described herein, the additional system information includes a SIB of a second type which may be different from the first type.

In some examples of the method, apparatuses, and non-transitory computer-readable medium described herein, the first system information may be received multiplexed with other system information receivable by the other UEs.

In some examples of the method, apparatuses, and non-transitory computer-readable medium described herein, the first system information may be received via a PBCH associated with reduced-capability UEs, a PDSCH associated with reduced-capability UEs, or both.

A method for wireless communication at a base station is described. The method may include transmitting first system information to a UE, the first system information being for reduced-capability UEs including UEs with a bandwidth capability below a threshold, the UE being a reduced-capability UE, evaluating the first system information for a dedicated field that includes an indicator that additional system information for reduced-capability UEs is to be transmitted in response to on-demand requests, and transmitting the additional system information for reduced-capability UEs in accordance with information included in either the dedicated field when the dedicated field is included in the first system information or in a configuration information element of the first system information when the dedicated field is absent from the first system information.

An apparatus for wireless communication at a base station is described. The apparatus may include a processor, memory in electronic communication with the processor, and instructions stored in the memory. The instructions may be executable by the processor to cause the apparatus to transmit first system information to a UE, the first system information being for reduced-capability UEs including UEs with a bandwidth capability below a threshold, the UE being a reduced-capability UE, evaluate the first system information for a dedicated field that includes an indicator that additional system information for reduced-capability UEs is to be transmitted in response to on-demand requests, and transmit the additional system information for reduced-capability UEs in accordance with information included in either the dedicated field when the dedicated field is included in the first system information or in a configuration information element of the first system information when the dedicated field is absent from the first system information.

Another apparatus for wireless communication at a base station is described. The apparatus may include means for transmitting first system information to a UE, the first system information being for reduced-capability UEs including UEs with a bandwidth capability below a threshold, the UE being a reduced-capability UE, means for evaluating the first system information for a dedicated field that includes an indicator that additional system information for reduced-capability UEs is to be transmitted in response to on-demand requests, and means for transmitting the additional system information for reduced-capability UEs in accordance with information included in either the dedicated field when the dedicated field is included in the first system information or in a configuration information element of the first system information when the dedicated field is absent from the first system information.

A non-transitory computer-readable medium storing code for wireless communication at a base station is described. The code may include instructions executable by a processor to transmit first system information to a UE, the first system information being for reduced-capability UEs including UEs with a bandwidth capability below a threshold, the UE being a reduced-capability UE, evaluate the first system information for a dedicated field that includes an indicator that additional system information for reduced-capability UEs is to be transmitted in response to on-demand requests, and transmit the additional system information for reduced-capability UEs in accordance with information included in either the dedicated field when the dedicated field is included in the first system information or in a configuration information element of the first system information when the dedicated field is absent from the first system information.

Some examples of the method, apparatuses, and non-transitory computer-readable medium described herein may further include operations, features, means, or instructions for determining that the additional system information may be transmitted in response to on-demand requests based on the information included in either the dedicated field or in the configuration information element and receiving, from the UE, a request for the additional system information in accordance with the information included in either the dedicated field or in the configuration information element.

Some examples of the method, apparatuses, and non-transitory computer-readable medium described herein may further include operations, features, means, or instructions for identifying a system information request mode from the information included in either the dedicated field or in the configuration information element and receiving, from the UE and in accordance with the system information request mode, a request for the additional system information via a set of resources associated with a PRACH or an SRS.

Some examples of the method, apparatuses, and non-transitory computer-readable medium described herein may further include operations, features, means, or instructions for identifying a system information request mode from the information included in either the dedicated field or in the configuration information element and receiving, from the UE and in accordance with the system information request mode, a request for the additional system information via a set of resources associated with a PUSCH or a PUCCH.

Some examples of the method, apparatuses, and non-transitory computer-readable medium described herein may further include operations, features, means, or instructions for identifying a system information request mode from the information included in either the dedicated field or in the configuration information element and receiving, from the UE and in accordance with the system information request mode, a request for the additional system information via a set of resources associated with a PRACH, an SRS, a PUSCH, or a PUCCH.

Some examples of the method, apparatuses, and non-transitory computer-readable medium described herein may further include operations, features, means, or instructions for identifying a system information request mode from the information included in either the dedicated field or in the configuration information element and transmitting the additional system information from the base station in accordance with the system information request mode without receiving a request for the additional system information.

Some examples of the method, apparatuses, and non-transitory computer-readable medium described herein may further include operations, features, means, or instructions for determining a set of thresholds for transmitting a request for the additional system information based on the information included in the dedicated field or in the configuration information element and receiving, from the UE, the request for the additional system information based on the UE satisfying at least one threshold of the set of thresholds.

In some examples of the method, apparatuses, and non-transitory computer-readable medium described herein, the dedicated field includes one or more bit fields, and determining the set of thresholds may be based on one or more values of the one or more bit fields of the dedicated field.

In some examples of the method, apparatuses, and non-transitory computer-readable medium described herein, the set of thresholds for transmitting the request for the additional system information include a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

In some examples of the method, apparatuses, and non-transitory computer-readable medium described herein, the dedicated field includes one or more bit fields, a first value of a bit field of the one or more bit fields indicates that the additional system information for reduced-capability UEs may be received in response to on-demand requests, and a second value of the bit field of the one or more bit fields indicates that the additional system information for reduced-capability UEs may be not to be received in response to on-demand requests.

Some examples of the method, apparatuses, and non-transitory computer-readable medium described herein may further include operations, features, means, or instructions for determining a set of additional system informations which may be requested based on the information included in the dedicated field or in the configuration information element and receiving, from the UE, an indication of the additional system information included within the set of additional system informations, wherein transmitting the additional system information may be based on receiving the indication of the additional system information.

Some examples of the method, apparatuses, and non-transitory computer-readable medium described herein may further include operations, features, means, or instructions for determining a set of parameters usable by the base station to transmit the additional system information based on the information included in the dedicated field or in the configuration information element and receiving, from the UE, an indication of one or more parameters included within the set of parameters, wherein transmitting the additional system information may be based on receiving the indication of the one or more parameters.

In some examples of the method, apparatuses, and non-transitory computer-readable medium described herein, the one or more parameters includes an MCS, a code rate, or both.

In some examples of the method, apparatuses, and non-transitory computer-readable medium described herein, the one or more parameters used to transmit the additional system information may be different from at least one parameter used to transmit the first system information.

Some examples of the method, apparatuses, and non-transitory computer-readable medium described herein may further include operations, features, means, or instructions for determining a periodicity associated with the additional system information based on the information included in the dedicated field or in the configuration information element, wherein transmitting the additional system information may be based on determining the periodicity.

In some examples of the method, apparatuses, and non-transitory computer-readable medium described herein, the periodicity associated with the additional system information may be different from a periodicity associated with the first system information.

In some examples of the method, apparatuses, and non-transitory computer-readable medium described herein, the first system information includes a SIB of a first type, an MIB, an SSB, or any combination thereof.

In some examples of the method, apparatuses, and non-transitory computer-readable medium described herein, the additional system information includes a SIB of a second type which may be different from the first type.

In some examples of the method, apparatuses, and non-transitory computer-readable medium described herein, the first system information may be transmitted multiplexed with other system information receivable by the other UEs.

In some examples of the method, apparatuses, and non-transitory computer-readable medium described herein, the first system information may be transmitted via a PBCH associated with reduced-capability UEs, a PDSCH associated with reduced-capability UEs, or both.

DETAILED DESCRIPTION

Figure 1:
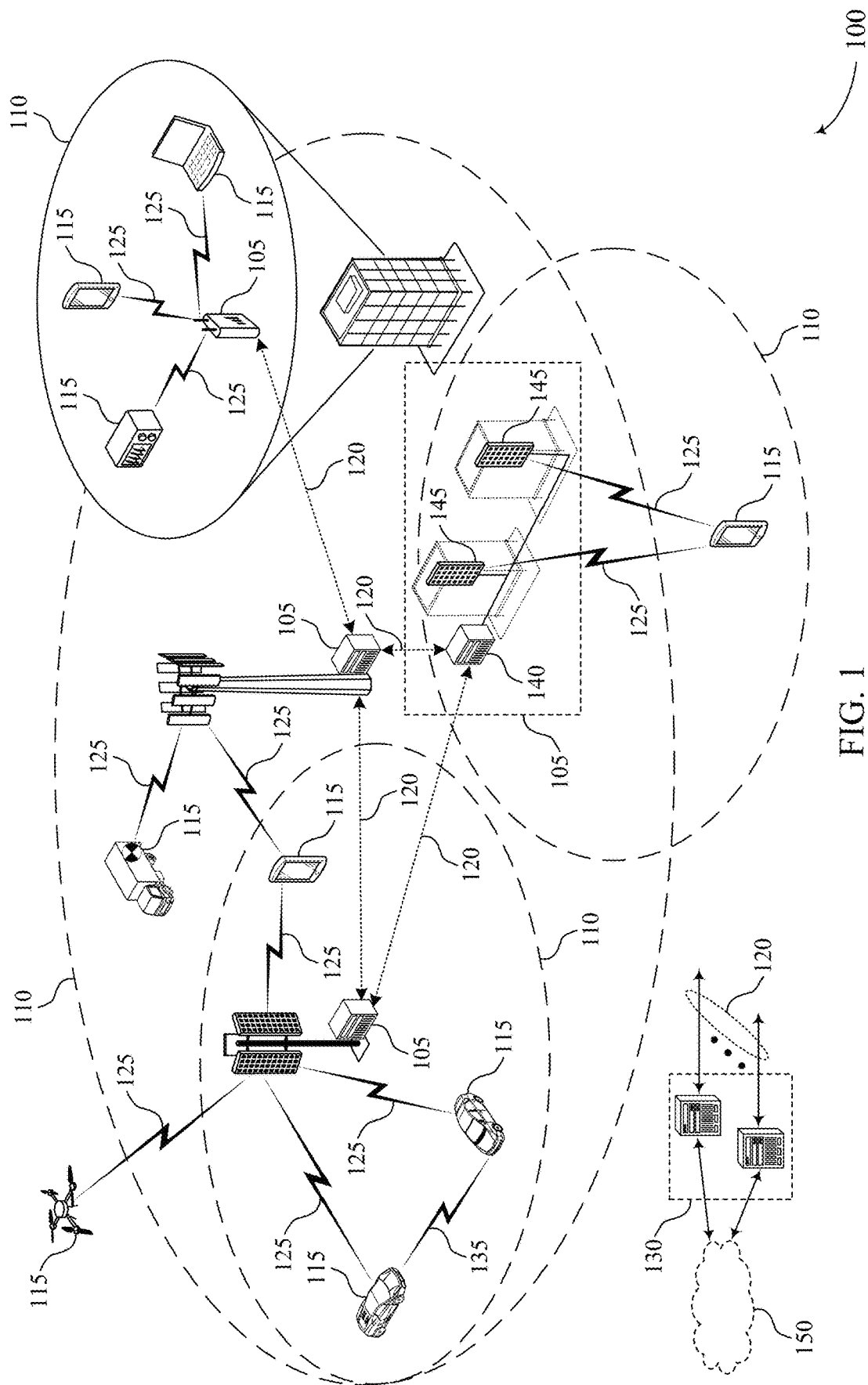
FIG. 1 illustrates an example of a wireless communications system that supports techniques for adaptively requesting on-demand system information (ODSI) in accordance with aspects of the present disclosure.

In some wireless communications systems, base stations may be configured to support both regular, full-capability user equipments (UEs) (e.g., full-bandwidth UEs) as well as reduced-capability UEs. Reduced-capability UEs may include UEs which include a bandwidth capability below a given threshold, and may thereby include UEs which communicate over a reduced bandwidth (RB) as compared to full-capability UEs. Due to the reduced bandwidth capabilities, reduced-capability UEs may be unable to receive system information (e.g., master information block (MIB), system information block (SIB)) which is broadcast by the network using bandwidths (e.g., bandwidth parts (BWPs)) receivable by regular, full-capability UEs. To enable reduced-capability UEs to receive system information, a base station may selectively adjust a bandwidth or other parameters used to transmit the system information such that both full-capability UEs and reduced-capability UEs may be able to receive the same system information. However, broadcasting system information over smaller bandwidths may lead to an inefficient use of resources, and increase power consumption at the base station. Additionally or alternatively, a base station may transmit both regular system information for full-capability UEs, as well as reduced-bandwidth system information for reduced-capability UEs. However, transmitting separate system informations may lead to increased network overhead and resource congestion. Moreover, in cases where there are few or no reduced-capability UEs which require reduced-bandwidth system information, the resources allocated for the reduced-bandwidth system information may be wasted.

Accordingly, techniques for on-demand broadcast of system information for reduced-capability UEs are described. Generally, the described techniques enable a network to continuously broadcast first system information for reduced-capability UEs, where the first system information includes an indication as to whether or not additional system information for reduced-capability UEs may be received in response to on-demand requests.

For example, a reduced-capability UE may receive a first system information for reduced-capability UEs (e.g., reduced-bandwidth UEs). The first system information may include a reduced-bandwidth system information block (RB-SIB1) or a reduced-bandwidth master information block (RB-MIB), each of which may be received via a reduced-bandwidth synchronization signal block (RB-SSB), or any combination thereof. Upon receiving the first system information, the UE may determine whether the first system information includes a dedicated field which indicates whether or not additional system information for reduced-capability UEs (e.g., RB-SIB2, RB-SIB3) may be received in response to on-demand requests. The UE may then determine whether additional system information may be received in response to on-demand requests based on the dedicated field if the dedicated field is included within the first system information. Alternatively, if the dedicated field is not included within the first system information, the UE may determine whether additional system information may be received in response to on-demand requests based on a configuration information element of the first system information. In this regard, the dedicated field may serve as an efficient, early indicator as to whether or not a network is configured for on-demand system information (ODSI).

In some aspects, the requests for additional system information may be transmitted via a physical random access channel (PRACH), a sounding reference signal (SRS), a physical uplink shared channel (PUSCH), a physical uplink control channel (PUCCH), or any combination thereof. The resources associated with transmitting the request for additional system information may be indicated in the first system information. In cases where the first system information includes the dedicated field, the dedicated field may include one or more bit fields. For example, in cases where the dedicated field includes a single bit field, a first value (e.g., Other System Information (OSI)-Indicator–RB=1) may indicate that the network supports ODSI, where a second value (e.g., OSI-Indicator–RB=0) may indicate that the network does not support ODSI. By way of another example, in cases where the dedicated field includes multiple bit fields, values of the bit fields may reference one or more look-up tables which may be referenced to determine parameters for receiving the additional system information (e.g., coverage levels, modulation and coding scheme (MCS), code rate, periodicity), thresholds or other criteria for requesting the additional system information (e.g., bandwidth capability thresholds of UEs, reference signal received power (RSRP) thresholds, etc.).

By enabling UEs to obtain additional system information in response to on-demand requests, techniques described herein may reduce signaling overhead, and lead to a more efficient use of resources. In particular, techniques described herein may enable the network to broadcast additional system information only upon request, thereby reducing signaling overhead and preventing a waste of resources in cases where there are few (or no) reduced-capability UEs which are to receive the additional system information.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for adaptatively requesting ODSI.

FIG. 1 illustrates an example of a wireless communications system 100 that supports techniques for adaptatively requesting ODSI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be coupled to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for on-demand broadcast of additional system information for reduced-capability UEs 115. In particular, a reduced-capability UE 115 of the wireless communications system 100 may receive, from a base station 105, a first system information for reduced-capability UEs 115, and may be able to determine whether additional system information may be received in response to on-demand requests based on an indication in the first system information.

For example, a base station 105 of the wireless communications system 100 may be configured to regularly (e.g., continuously) broadcast first system information for reduced-capability UEs 115. The first system information for reduced-capability UEs 115 may include RB-SIB1 or RB-MIB, received via RB-SSB. In this example, a reduced-capability UE 115 may receive the first system information for reduced-capability UEs 115 and may determine whether the first system information includes a dedicated field which indicates whether or not additional system information for reduced-capability UEs 115 (e.g., RB-SIB2, RB-SIB3) may be received in response to on-demand requests. The UE 115 may then determine whether additional system information may be received in response to on-demand requests based on the dedicated field if the dedicated field is included within the first system information. Alternatively, if the dedicated field is not included within the first system information, the UE 115 may determine whether additional system information may be received in response to on-demand requests based on a configuration information element of the first system information. In this regard, the dedicated field may serve as an efficient, early indicator as to whether or not a network is configured for ODSI.

In cases where the first system information indicates that additional system information may not be received in response to on-demand requests, the reduced-capability UE 115 may continue wireless communications without acquiring the additional system information or it may search for a new cell. Conversely, in cases where the first system information indicates that additional system information may be received in response to on-demand requests, the UE 115 may transmit a request for the additional system information, and may obtain the additional system information in response to the request.

In some aspects, the requests for additional system information may be transmitted via a PRACH, an SRS, a PUSCH, a PUCCH, or any combination thereof. The resources associated with transmitting the request for additional system information may be indicated in the first system information. In cases where the first system information includes the dedicated field, the dedicated field may include one or more bit fields. For example, in cases where the dedicated field includes a single bit field, a first value (e.g., OSI-Indicator-RB=1) may indicate that the network supports ODSI, where a second value (e.g., OSI-Indicator-RB=0) may indicate that the network does not support ODSI. By way of another example, in cases where the dedicated field includes multiple bit fields, values of the bit fields may reference one or more look-up tables which may be referenced to determine parameters for receiving the additional system information (e.g., coverage levels, MCS, code rate, periodicity), thresholds or other criteria for requesting the additional system information (e.g., bandwidth capability thresholds of UEs, RSRP thresholds, etc.).

The techniques described herein may provide for on-demand broadcast of system information, which may reduce signaling overhead and lead to a more efficient use of resources within the wireless communications system 100. In particular, techniques described herein may enable a base station 105 of the wireless communications system to broadcast additional system information upon request, thereby reducing signaling overhead and preventing a waste of resources in cases where there are few (or no) reduced-capability UEs 115 which are to receive the additional system information.

Figure 2:
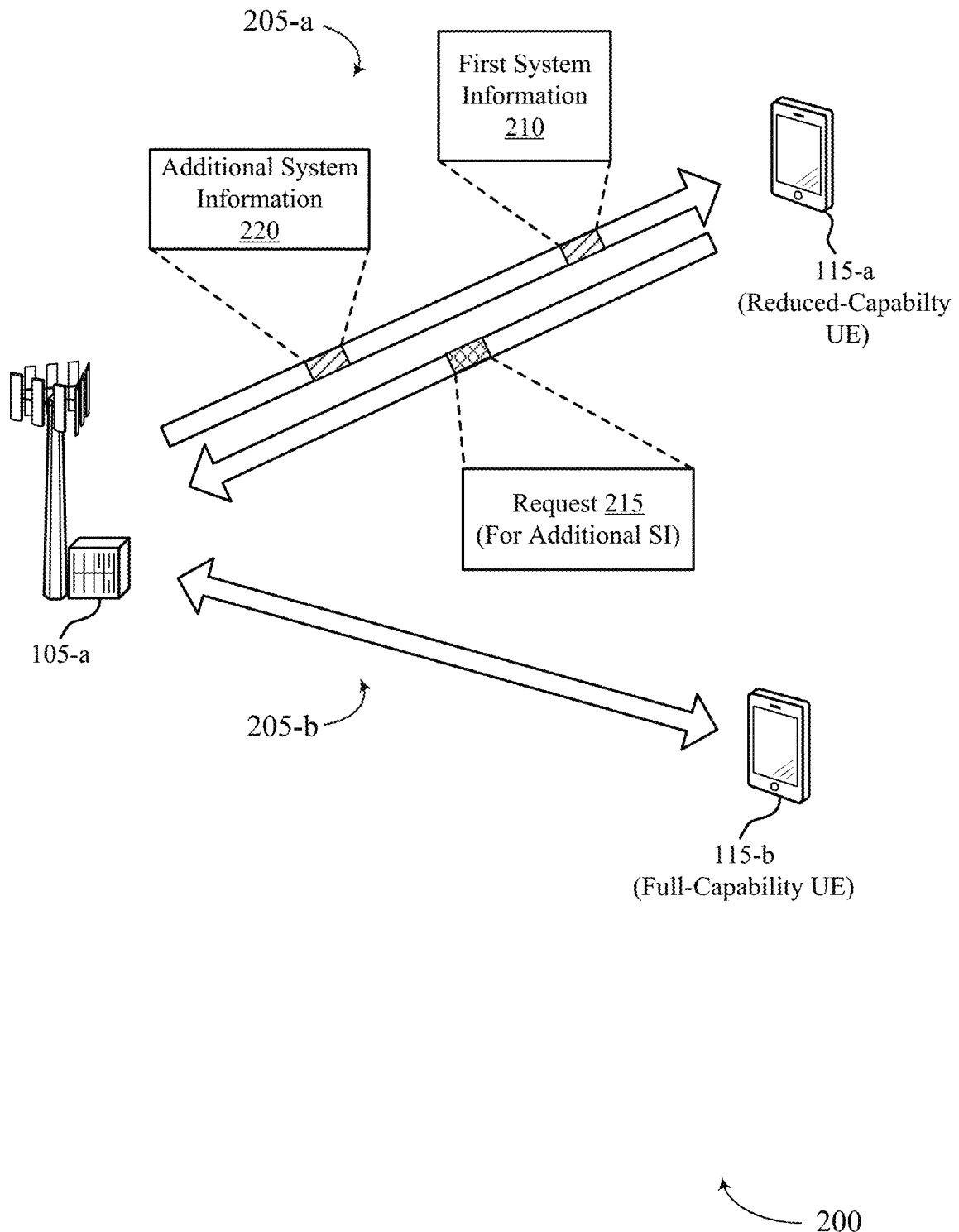
FIG. 2 illustrates an example of a wireless communications system that supports techniques for adaptively requesting ODSI in accordance with aspects of the present disclosure.

FIG. 2 illustrates an example of a wireless communications system 200 that supports techniques for adaptively requesting ODSI in accordance with aspects of the present disclosure. In some examples, wireless communications system 200 may implement aspects of wireless communications system 100. The wireless communications system 200 may include a first UE 115-a (e.g., reduced-capability UE 115-a), a second UE 115-b (e.g., full-capability UE 115-b), and a base station 105-a, which may be examples of UEs 115 and base stations 105, as described with reference to FIG. 1.

In some aspects, the UEs 115-a and 115-b may communicate with the base station 105-a using one or more beams, one or more carriers, one or more communications links, or any combination thereof. For example, the first UE 115-a may communicate with the base station 105-a via a communication link 205-a, and the second UE 115-b may communicate with the base station 105-a via a communication link 205-b. In some aspects, the communication links 205-a and 205-b may include examples of access links (e.g., Uu links). The communication links 205-a and 205-b may include bi-directional links that can include both uplink and downlink communication. For example, the first UE 115-a may transmit uplink transmissions, such as uplink control signals or uplink data signals, to the base station 105-a using the communication link 205-a, and the base station 105-a may transmit downlink transmissions, such as downlink control signals or downlink data signals, to the first UE 115-a using the communication link 205-a. In some aspects, the wireless communications system 200 may support wireless communications with wireless devices (e.g., first UE 115-a, second UE 115-b) via one or more serving cells of the wireless communications system 200. Each serving cell may be supported by one or more base stations 105 of the wireless communications system 200.

As shown in FIG. 2, the base station 105-a of the wireless communications system 200 may be configured to support both regular, full-capability user equipments UEs 115 as well as reduced-capability UEs 115. For example, the second UE 115-b may include an example of a full-capability (e.g., full-bandwidth) UE 115-b, whereas the first UE 115-a may include an example of a reduced-capability (e.g., reduced-bandwidth) UE 115-a. The reduced-capability UE 115-a may exhibit a reduced capability as compared to the full-capability UE 115-b with respect to one or more parameters, including a bandwidth over which it may communicate, processing capabilities, quantities of antennas, or any combination thereof. For instance, in some cases, the first UE 115-a may include a bandwidth capability below a given threshold, and may communicate with the base station 105-a over a reduced bandwidth as compared to full-capability UE 115-b.

In some wireless communications systems, due to the reduced-capability (e.g., reduced bandwidth capability) of the first UE 115-a, the first UE 115-a may be unable to receive system information (e.g., MIB, SIB, SSB) which is broadcast by the base station 105-a using bandwidths (e.g., BWPs) receivable by the regular, full-capability UE 115-b. The additional system information may be obtained by the UEs 115-a and 115-b to perform some communications services or programs, such as gaming applications, video messaging services, and the like. In some wireless communications systems, in order to enable the reduced-capability UE 115-a to receive additional system information, the base station 105-a may selectively adjust a bandwidth or other parameters used to transmit the additional system information such that both the full-capability UE 115-b and the reduced-capability UE 115-a may be able to receive the same system information. However, broadcasting system information over smaller bandwidths may lead to an inefficient use of resources, and increase power consumption at the base station 105-a. Additionally or alternatively, the base station 105-a may transmit both regular system information for the full-capability UE 115-b, as well as reduced-bandwidth system information for the reduced-capability UE 115-a. However, transmitting separate system informations may lead to increased network overhead and resource congestion. Moreover, in cases where there are few or no reduced-capability UEs 115 (e.g., first UE 115-a) which require reduced-bandwidth system information, the resources allocated for the reduced-bandwidth system information may be wasted.

Accordingly, the wireless communications system 200 may be configured to enable the base station 105-a to broadcast additional system information for reduced-capability UEs 115 (e.g., reduced-capability UE 115-a) in response to on-demand requests. Generally, the described techniques enable a network to continuously broadcast first system information for the reduced-capability UE 115-a (e.g., RB-SIB1 or RB-MIB, received via RB-SSB), where the first system information includes an indication as to whether or not additional system information for the reduced-capability UE 115-a may be received in response to on-demand requests.

For example, the UE 115-a (e.g., reduced-capability UE 115-a) may receive first system information 210 from the base station 105-a. In some aspects, the first system information 210 may be configured for (e.g., receivable by) reduced-capability UEs 115 which include a bandwidth capability below a threshold. For example, the first system information 210 may include SIB of a first type (e.g., RB-SIB1) or of an MIB (e.g., RB-MIB), or a combination thereof.

In some aspects, the first system information 210 may be received via a dedicated physical broadcast channel (PBCH) associated with reduced-capability UEs 115, a dedicated physical downlink shared channel (PDSCH) associated with reduced-capability UEs 115, or both. In other words, first system information may be broadcast/transmitted within resources which are associated with (e.g., dedicated for) reduced-capability UEs 115. For example, the wireless communications system 200 may be configured with (e.g., via RRC signaling, SIB messaging) downlink and/or uplink BWPs which are dedicated for reduced capability UEs 115, regular UEs 115, or both. In some cases, the wireless communications system 200 may include different sets of downlink and uplink BWPs which are dedicated to reduced-capability and regular UEs 115, respectively. For instance, an initial downlink BWP dedicated for reduced-capability UEs 115 may be defined or configured (e.g., via RRC), where the dedicated downlink BWP is different from an initial downlink BWP for regular, non-reduced-bandwidth UEs 115. Sets of resources which are associate with or dedicated for reduced-capability UEs 115 (e.g., dedicated BWPs) may be configured so as to not exceed an expected maximum bandwidth capability supported by reduced-capability UEs 115. Moreover, in some cases, the wireless communications system 200 may be configured with random access channel (RACH) occasions (ROs) for transmitting the first system information. Sets of ROs may be dedicated for reduced-capability UEs 115, or shared with regular UEs 115.

In other cases, the first system information 210 may be received via a channel which is not associated with (e.g., dedicated to) reduced-capability UEs 115. In some aspects, the first system information 210 received by the UE 115-*a* may be multiplexed with other system information receivable by other UEs 115 (e.g., full-capability UE 115-*b*). For example, in some cases, the base station 105-*a* may multiplex system information receivable by reduced-capability UEs 115 (e.g., UE 115-*a*) with other system information receivable by full-capability UEs 115 (e.g., UE 115-*b*) in order to generate the first system information 210. In some aspects, the UE 115-*a* may evaluate the first system information 210 for a dedicated field that includes an indicator that additional system information 220 for reduced-capability UEs 115 (e.g., UE 115-*a*) may be received in response to on-demand requests. In this regard, the UE 115-*a* may determine whether or not the first system information 210 includes a dedicated field indicating whether the network supports ODSI for reduced-capability UEs 115. In some aspects, the dedicated field within the first system information 210 may include one or more bit fields.

In some aspects, the UE 115-*a* may determine a system information request mode for requesting additional system information 220. The system information request mode may indicate whether the base station 105-*a* supports broadcasts for additional system information 220 for reduced-capability UEs 115. Additionally or alternatively, the system information request mode may indicate channels and/or resources for requesting additional system information 220. In this regard, the UE 115-*a* may determine the system information request mode in order to determine whether additional system information 220 for reduced-capability UEs 115 may be received without an on-demand request, whether additional system information 220 for reduced-capability UEs 115 may be received in response to on-demand requests, the channel (e.g., resources) which may be used to request additional system information 220, or any combination thereof.

The UE 115-*a* may determine the system information request mode based on information included within the dedicated field of the first system information 210, information included within a configuration information element of the first system information 210, or both. In this regard, the UE 115-*a* may determine the system information request mode based on receiving the first system information 210, evaluating whether the first system information 210 includes the dedicated field associated with the additional system information 220, or both. For example, in cases where the UE 115-*a* determines that the first system information 210 includes a dedicated field, the UE 115-*a* may determine the system information request mode based on the information included in the dedicated field. By way of another example, in cases where the UE 115-*a* determines that the first system information 210 does not include a dedicated field (e.g., dedicated field is absent from first system information 210), the UE 115-*a* may determine the system information request mode based on the information included in a configuration information element (e.g., SI-RequestConfig-RB) of the first system information 210.

In some aspects, the UE 115-*a* may determine the respective system information request modes in order to determine a channel, a set of resources (e.g., BWP), or both, over which a request 215 for additional system information 220 may be transmitted. For example, the respective system information request modes may be associated with a PRACH channel, an SRS, a PUSCH, a PUCCH, or any combination thereof. In this regard, the UE 115-*a* may be configured to determine a channel (e.g., PRACH, PUSCH, PUCCH) and/or a set of resources (e.g., set of SRS resources, set of time/frequency resources, uplink BWP) over which a request 215 for additional system information 220 may be transmitted based on the determined system information request mode. In some cases, the UE 115-*a* may be configured to determine that requests 215 for additional system information 220 are to be transmitted within uplink BWPs which are dedicated for reduced-capability UEs 115.

In some aspects, the UE 115-*a* may determine whether additional system information 220 for reduced-capability UEs 115 may be obtained (e.g., acquired, received) based on receiving the first system information 210, evaluating the first system information 210 for the dedicated field, determining the system information request mode, or any combination thereof. In particular, the UE 115-*a* may determine whether additional system information 220 for reduced-capability UEs 115 may be received without a request 215, may be received in response to on-demand requests (e.g., request 215), or both. In some aspects, the UE 115-*a* may be configured to determine whether additional system information 220 may (or may not) be received based on the information included within the dedicated field of the first system information 210 (if any), based on a configuration information element of the first system information 210, or both.

For example, in cases where the UE 115-*a* determines that the first system information 210 includes a dedicated field, the UE 115-*a* may determine whether or not additional system information 220 may be received in response to on-demand requests (e.g., request 215) and/or without a request 215 based on the information included in the dedicated field. By way of another example, in cases where the UE 115-*a* determines that the first system information 210 does not include a dedicated field (e.g., dedicated field is absent from first system information 210), the UE 115-*a* may determine whether or not additional system information 220 may be received in response to on-demand requests (e.g., request 215) and/or without a request 215 based on the information included in a configuration information element (e.g., SI-RequestConfig-RB) of the first system information 210. In this regard, the dedicated field may serve as an efficient, early indicator as to whether or not the base station 105-*a* is configured for ODSI for reduced-capability UEs 115.

In cases where the first system information 210 includes a dedicated field including one or more bit fields, the UE 115-*a* may be configured to determine that a first value of a bit field of the one or more bit fields (e.g., OSI-Indicator–RB=1) indicates that the additional system information 220 for reduced-capability UEs 115 may be received in response to on-demand requests (e.g., request 215). Conversely, the UE 115-*a* may be further configured to determine that a second value of the bit field of the one or more bit fields (e.g., OSI-Indicator–RB=0) indicates that the additional system information 220 for reduced-capability UEs 115 may not be received in response to on-demand requests (e.g., request 215).

In cases where the UE 115-*a* determines that additional system information 220 for reduced-capability UEs 115 may not be obtained with or without on-demand requests (e.g., request 215), the UE 115-*a* may continue wireless communications without obtaining the additional system information 220 for reduced-capability UEs 115, select a new cell, or both. For example, in cases where the UE 115-*a* determines that additional system information 220 for reduced-capability UEs 115 may not be received in response to a request 215 (or without a request 215), the UE 115-*a* may search for a new cell supported by the base station 105-*a* and/or a different base station 105 which does allow reduced-capability UEs 115 (e.g., UE 115-*a*) to receive additional system information 220 in response to on-demand requests (e.g., request 215) and/or without a request 215. By way of another example, in some cases, the UE 115-*a* may determine a system information mode which indicates that the base station 105-*a* is not configured to transmit additional system information 220 for reduced-capability UEs 115. In this example, the UE 115-*a* may continue wireless communications without obtaining the additional system information 220 for reduced-capability UEs 115, select a new cell, or both, based on the determined system information request mode.

Comparatively, in case where the UE 115-*a* determines that additional system information 220 for reduced-capability UEs 115 may be received in response to on-demand requests (e.g., request 215), the UE 115-*a*, the base station 105-*a*, or both, may determine a set of thresholds for transmitting a request 215 for the additional system information 220. In some aspects, the UE 115-*a* may determine the set of thresholds for transmitting the request 215 based on information included within the dedicated field of the first system information 210 (if any), based on information included within the configuration information element of the first system information 210, or both. In this regard, the UE 115-*a* may determine the set of thresholds based on receiving the first system information 210, evaluating the first system information 210 for the dedicated field, determining the system information request mode, determining whether additional system information 220 for reduced-capability UEs 115 may be obtained with and/or without a request 215, or any combination thereof.

In cases where the dedicated field includes one or more bit fields, the UE 115-*a* may determine the set of thresholds based on one or more values of one or more bit fields of the dedicated field. In some aspects, the UE 115-*a* may be pre-configured (e.g., via RRC signaling or other control signaling) to interpret different bit values of the dedicated field and/or configuration information element as indicating different sets of thresholds. For example, the UE 115-*a* may receive a control message (e.g., RRC message) which indicates a first value of a bit field of the dedicated field is associated with a first set of thresholds, and a second value of a bit field of the dedicated field is associated with a second set of thresholds. Subsequently, a value of a bit field of the dedicated field within the first system information 210 may be used to indicate which set of thresholds the UE 115-*a* is to use.

The set of thresholds for transmitting the request 215 for the additional system information 220 may include any thresholds or parameters known in the art. For example, the set of thresholds may include a threshold associated with a bandwidth capability of the UE 115-*a* (e.g., minimum bandwidth capability the UE 115-*a* may have to be able to request additional system information 220), a threshold associated with a quantity of antennas of the UE 115-*a* (e.g., minimum quantity of antennas the UE 115-*a* may have to be able to request additional system information 220), or both. By way of another example, the set of thresholds may include a threshold associated with a signal quality of signals received at the UE 115-*a* (e.g., RSRP threshold, reference signal received quality (RSRQ) threshold, received signal strength indicator (RSSI) threshold, SNR threshold, signal-to-interference-plus-noise ratio (SINR) threshold), a threshold associated with a quantity of requests 215 for the additional system information 220 which may be transmitted by the UE 115-*a* (e.g., maximum number of requests 215 the UE 115-*a* may transmit), or any combination thereof.

The set of thresholds may be indicated by the base station 105-*a* via the first system information 210 to indicate which UEs 115 may be allowed to request additional system information 220. In order to request additional system information 220, the UE 115-*a* may be required to satisfy one or more thresholds (e.g., all) of the set of thresholds. In this regard, the UE 115-*a* may be configured to determine the set of thresholds and determine whether the UE 115-*a* satisfies one or more thresholds in order to determine whether the UE 115-*a* is able to transmit a request 215 for additional system information 220.

In some aspects, the UE 115-*a*, the base station 105-*a*, or both, may determine a set of additional system informations (e.g., RB-SIB1, RB-SIB2, RB-SIB3) which may be requested from the base station 105-*a*. In some aspects, the UE 115-*a* may determine the set of additional system informations which may be requested based on information included within the dedicated field of the first system information 210 (if any), based on information included within the configuration information element of the first system information 210, or both. In this regard, the UE 115-*a* may determine the set of additional system informations which may be requested based on receiving the first system information 210, evaluating the first system information 210 for the dedicated field, determining the system information request mode, determining whether additional system information 220 for reduced-capability UEs 115 may be obtained with and/or without a request 215, determining the thresholds for transmitting the request 215, or any combination thereof.

In some aspects, the UE 115-*a*, the base station 105-*a*, or both, may determine a set of parameters usable by the base station 105-*a* to transmit the additional system information 220. Additionally or alternatively, the UE 115-*a* may determine a set of parameters usable by the UE 115-*a* to receive the additional system information 220. In some aspects, the UE 115-*a* may determine the set of parameters for transmitting and/or receiving the additional system information 220 based on information included within the dedicated field of the first system information 210 (if any), based on information included within the configuration information element of the first system information 210, or both. In this regard, the UE 115-*a* may determine the set of parameters for transmitting and/or receiving the additional system information 220 based on receiving the first system information 210, evaluating the first system information 210 for the dedicated field, determining the system information request mode, determining whether additional system information 220 for reduced-capability UEs 115 may be obtained with and/or without a request 215, determining the thresholds for transmitting the request 215, determining the set of additional system information which may be requested, or any combination thereof.

In some aspects, the set of parameters usable by the base station 105-*a* to transmit the additional system information 220 (e.g., parameters usable by the UE 115-*a* to receive the additional system information 220) may include an MCS, a code rate, a set of time resources, a set of frequency resources, a set of spatial resources, or any combination thereof. For example, the parameters usable by the base station 105-*a* to transmit the additional system information 220 may include configured BWPs which are associated with (e.g., dedicated for) reduced-capability UEs 115, regular UEs 115, or both. In this regard, the base station 105-*a* may indicate, and the UE 115-*a* may determine, a coverage enhancement scheme which may be used to transmit and/or receive the additional system information 220 based on information included within the dedicated field and/or configuration information element of the first system information 210. In some aspects, one or more parameters in the set of parameters usable to transmit and/or receive the additional system information 220 (e.g., BWP for transmitting/receiving additional system information 220) may be different from at least one parameters used to transmit and/or receive the first system information 210.

In some aspects, the UE 115-*a*, the base station 105-*a*, or both, may determine a periodicity associated with the additional system information 220. The periodicity may include a periodicity at which the base station 105-*a* may transmit the additional system information 220. In some cases, the periodicity associated with the additional system information 220 may be different from a periodicity associated with the first system information 210 (e.g., a periodicity at which the first system information 210 is transmitted or broadcast). In some aspects, the UE 115-*a* may determine the periodicity associated with the additional system information 220 based on information included within the dedicated field of the first system information 210 (if any), based on information included within the configuration information element of the first system information 210, or both. In this regard, the UE 115-*a* may determine the periodicity associated with the additional system information 220 based on receiving the first system information 210, evaluating the first system information 210 for the dedicated field, determining the system information request mode, determining whether additional system information 220 for reduced-capability UEs 115 may be obtained with and/or without a request 215, determining the thresholds for transmitting the request 215, determining the set of additional system information which may be requested, determining the parameters for transmitting/receiving the additional system information 220, or any combination thereof.

In some aspects, the UE 115-*a* may transmit a request 215 for additional system information 220. In some aspects, the UE 115-*a* may transmit the request 215 for the additional system information 220 in accordance with information included within the dedicated field of the first system information 210 (if any), based on information included within the configuration information element of the first system information 210, or both. In this regard, the UE 115-*a* may transmit the request 215 for the additional system information 220 based on receiving the first system information 210, evaluating the first system information 210 for the dedicated field, determining the system information request mode, determining whether additional system information 220 for reduced-capability UEs 115 may be obtained, determining the thresholds for transmitting the request 215, determining the set of additional system information which may be requested, determining the parameters for transmitting/receiving the additional system information 220, determining the periodicity of the additional system information 220, or any combination thereof.

In some aspects, the UE 115-*a* may transmit the request 215 for the additional system information 220 in accordance with a determined system information request mode. For example, the determined system information request mode may be associated with a given set of resources (e.g., PRACH resources, SRS resources, PUSCH resources, PUCCH resources, configured or dedicated BWPs, or any combination thereof), and the UE 115-*a* may transmit the request 215 based on (e.g., in accordance with) the determined set of resources. For instance, dependent upon the determined system information request mode, the UE 115-*a* may transmit the request 215 via a set of resources associated with a PRACH, an SRS, a PUSCH, a PUCCH, or any combination thereof. By way of another example, the UE 115-*a* may transmit the request 215 via an uplink BWP which is associated with (e.g., dedicated for) reduced-capability UEs 115.

In some aspects, the UE 115-*a* may transmit the request 215 based on determining that the UE 115-*a* satisfies at least one threshold of the determined set of thresholds. For example, the set of thresholds may include a minimum bandwidth capability threshold. In this example, the UE 115-*a* may determine that a bandwidth capability of the UE 115-*a* satisfies (e.g., exceeds) the minimum bandwidth capability threshold, and may thereby transmit the request 215 based on determining that the UE 115-*a* satisfies the minimum bandwidth capability threshold. As noted previously herein, the UE 115-*a* may be configured to determine that it may transmit the request 215 based on determining that it satisfies only a subset of the set of thresholds, determining that it satisfies every threshold of the set of thresholds, or both.

In some aspects, the UE 115-*a* may indicate to the base station 105-*a* via the request 215 (and/or another uplink transmission) an indication of which additional system information 220 is being requested, an indication of one or more parameters (e.g., coverage enhancement schemes) that the base station 105-*a* may use to transmit the additional system information 220, or both. For example, the UE 115-*a* may determine a set of additional system informations which may be requested based on the first system information 210, determine (e.g., select) which additional system information 220 from the set of additional system informations which is to be requested, and may indicate the determined (e.g., selected) additional system information 220 to the base station 105-a via the request 215 and/or another uplink transmission.

By way of another example, the UE 115-a may determine a set of parameters (e.g., coverage enhancement schemes, MCS, code rate, time/frequency resources, BWPs) usable by the base station 105-a to transmit the additional system information 220. In this example, the UE 115-a may determine (e.g., select) one or more parameters from the set of parameters which will be used by the base station 105-a to transmit the additional system information 220, and may indicate the determined (e.g., selected) parameters to the base station 105-a via the request 215 and/or another uplink transmission. For instance, the UE 115-a may determine a set of MCSs which may be used by the base station 105-a to transmit the additional system information 220, and may indicate in the request 215 which MCS the base station 105-a should use to transmit the additional system information 220. By way of another example, the UE 115-a may determine a set of downlink BWPs which may be used by the base station 105-a to transmit the additional system information 220, and may indicate in the request 215 which BWP (e.g., downlink BWP dedicated for reduced-capability UEs 115) the base station 105-a should use to transmit the additional system information 220. In some cases, the parameters usable by the base station 105-a to transmit the additional system information 220 which are selected and indicated to the base station 105-a may be different from at least one parameter used by the base station 105-a to transmit the first system information 210.

In some cases, the UE 115-a may be configured to obtain the additional system information 220 without transmitting a request 215, and may therefore refrain from transmitting the request 215 illustrated in FIG. 2. For example, in some cases, the determined system information request mode may indicate that the UE 115-a need not transmit a request 215 for additional system information 220. In this example, the UE 115-a may be configured to refrain from transmitting the request 215, and may instead monitor for the additional system information 220 in order to obtain the additional system information 220 in accordance with the determined system information request mode.

In some aspects, the UE 115-a may obtain (e.g., receive) the additional system information 220 for reduced-capability UEs 115. In some aspects, additional system information 220 may include a SIB of a second type (e.g., RB-SIB2, RB-SIB3) which is different from the SIB of the first type associated with the first system information 210. The UE 115-a may obtain the additional system information 220 in accordance with the information included in the dedicated field of the first system information 210 when the dedicated field is present, the information included within the configuration information element of the first system information 210 when the dedicated field is absent from the first system information 210, or both. In some cases, the UE 115-a may receive the additional system information 220 within a downlink BWP which is associated with (e.g., dedicated for) reduced capability UEs 115, regular UEs 115, or both.

In this regard, the UE 115-a may obtain (e.g., receive) the additional system information 220 for reduced-capability UEs 115 based on receiving the first system information 210, evaluating the first system information 210 for the dedicated field, determining the system information request mode, determining whether additional system information 220 for reduced-capability UEs 115 may be obtained with and/or without a request 215, determining the thresholds for transmitting the request 215, determining the set of additional system information which may be requested, determining the parameters for transmitting/receiving the additional system information 220, determining the periodicity of the additional system information 220, transmitting the request 215, or any combination thereof. Moreover, the UE 115-a may be configured to obtain the additional system information 220 based on indicating, to the base station 105-a, which additional system information 220 is being requested, which parameters the base station 105-a is to use to transmit the additional system information 220, or any combination thereof.

In some cases, the base station 105-a may be configured to determine a quantity of reduced-capability UEs 115 which are communicatively coupled to the base station 105-a. The base station 105-a may determine the quantity of reduced-capability UEs 115 which are communicatively coupled to the base station 105-a in order to determine whether it should continue transmitting (e.g., broadcasting) the additional system information 220, or if it may end broadcasts of the additional system information 220. In some aspects, the base station 105-a may be configured to refrain from transmitting (e.g., broadcasting) the additional system information 220 (e.g., end broadcasts of the additional system information 220) in cases where the base station 105-a determines that a quantity of reduced-capability UEs 115 which are in wireless communications with the base station 105-a is less than a threshold quantity of reduced-capability UEs 115. For example, the base station 105-a may be configured to refrain from transmitting (e.g., broadcasting) the additional system information 220 in cases where the base station 105-a determines that there are no reduced-capability UEs 115 which are in wireless communications with the base station 105-a. Additionally or alternatively, the base station 105-a may be configured to refrain from transmitting the additional system information 220 when the UE 115-a which requested the additional system information 220 (e.g., UE 115-a) is no longer in wireless communications with the base station 105-a, after a predetermined time, after a predetermined quantity of broadcasts, or any combination thereof.

The techniques described herein may provide for on-demand broadcast of system information, which may reduce signaling overhead and lead to a more efficient use of resources within the wireless communications system 200. In particular, techniques described herein may enable the base station 105-a of the wireless communications system 200 to broadcast additional system information upon request, thereby reducing signaling overhead and preventing a waste of resources in cases where there are few (or no) reduced-capability UEs 115 which are to receive the additional system information.

Figure 3:
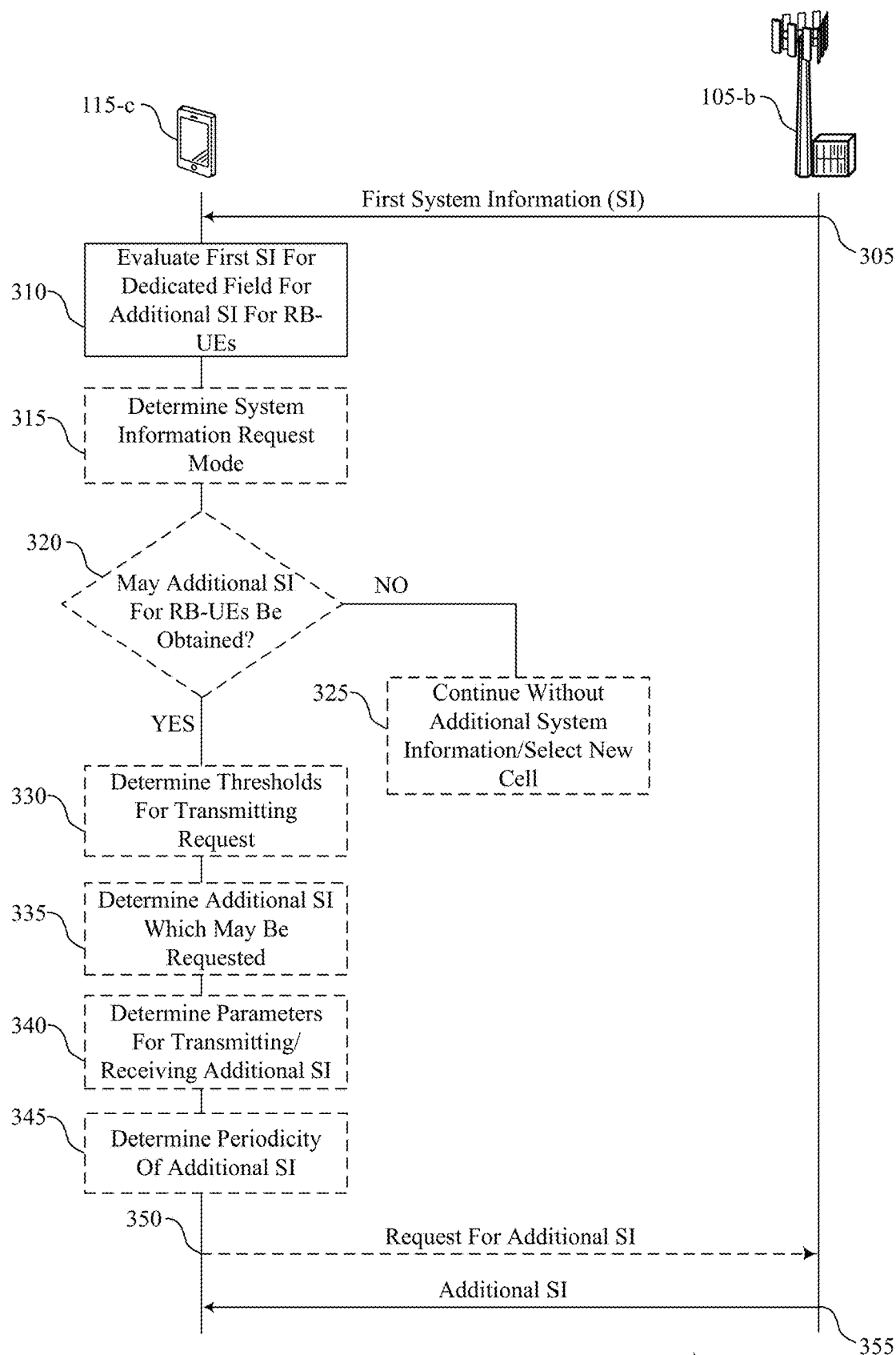
FIG. 3 illustrates an example of a process flow that supports techniques for adaptively requesting ODSI in accordance with aspects of the present disclosure.

FIG. 3 illustrates an example of a process flow 300 that supports techniques for adaptatively requesting ODSI in accordance with aspects of the present disclosure. In some examples, process flow 300 may implement, or be implemented by, aspects of wireless communications system 100, wireless communications system 200, or both. For example, the process flow 300 may illustrate a reduced-capability UE 115-c receiving a first system information from a base station 105-b, evaluating whether the first system information includes a dedicated field indicating whether additional system information for reduced-capability UEs 115 may be received in response to on-demand requests, and obtaining the additional system information in accordance with the information included within the first system information, as described with reference to FIGS. 1-2, among other aspects.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-c (e.g., reduced-capability UE 115-c) may receive first system information from the base station 105-b. In some aspects, the first system information may be configured for (e.g., receivable by) reduced-capability UEs 115 which include a bandwidth capability below a threshold. For example, the first system information may include a SIB of a first type (e.g., RB-SIB1), a MIB of a first type (e.g., RB-MIB), or a combination thereof.

In some aspects, the first system information received at 305 may be received via a dedicated PBCH associated with reduced-capability UEs 115, a dedicated PDSCH associated with reduced-capability UEs 115, a dedicated downlink BWP associated with reduced-capability UEs 115, or any combination thereof. In other cases, the first system information may be received via a channel which is not associated with (e.g., dedicated to) reduced-capability UEs 115. In some aspects, the first system information received by the UE 115-c may be multiplexed with other system information receivable by other UEs 115 (e.g., full-capability UEs 115). For example, in some cases, the base station 105-b may multiplex system information receivable by reduced-capability UEs 115 (e.g., UE 115-c) with other system information receivable by full-capability UEs 115 in order to generate the first system information transmitted at 305. At 310, the UE 115-c may evaluate the first system information for a dedicated field that includes an indicator that additional system information for reduced-capability UEs 115 (e.g., UE 115-c) may be received in response to on-demand requests. In this regard, the UE 115-c may determine whether or not the first system information includes a dedicated field indicating whether the network supports ODSI for reduced-capability UEs 115. In some aspects, the dedicated field within the first system information may include one or more bit fields.

At 315, the UE 115-c may determine a system information request mode for requesting additional system information. The system information request mode may indicate whether the base station 105-b supports broadcasts for additional system information for reduced-capability UEs 115. Additionally or alternatively, the system information request mode may indicate channels and/or resources (e.g., uplink BWPs) for requesting additional system information. In this regard, the UE 115-c may determine the system information request mode in order to determine whether additional system information for reduced-capability UEs 115 may be received without an on-demand request, whether additional system information for reduced-capability UEs 115 may be received in response to on-demand requests, the channel (e.g., resources) which may be used to request additional system information, or any combination thereof.

In some aspects, the UE 115-c may determine the system information request mode based on information included within the dedicated field of the first system information, information included within a configuration information element of the first system information, or both. In this regard, the UE 115-c may determine the system information request mode at 315 based on receiving the first system information at 305, evaluating whether the first system information includes the dedicated field at 310, or both. For example, in cases where the UE 115-c determines that the first system information includes a dedicated field at 310, the UE 115-c may determine the system information request mode at 315 based on the information included in the dedicated field. By way of another example, in cases where the UE 115-c determines that the first system information does not include a dedicated field at 310 (e.g., dedicated field is absent from first system information), the UE 115-c may determine the system information request mode at 315 based on the information included in a configuration information element (e.g., SI-RequestConfig-RB) of the first system information.

In some implementations, the first system information may indicate time/frequency resources for receiving additional system information. For example, the first system information may indicate a downlink BWP (e.g., dedicated downlink BWP for reduced-capability UEs 115) which is to be used for receiving the additional system information. In this regard, the first system information may indicate downlink BWP configurations for receiving the first system information and/or additional system information. In some aspects, the downlink BWP for the additional system information may be the same or different as the downlink BWP used for receiving the first system information. In other words, a first downlink BWP associated with the first system information may be shared or separately configured with a second downlink BWP for the additional system information.

In some aspects, the UE 115-c may determine the respective system information modes at 315 in order to determine a channel, a set of resources (e.g., BWP), or both, over which a request for additional system information may be transmitted. For example, the respective system information request modes may be associated with a PRACH channel, an SRS, a PUSCH, a PUCCH, or any combination thereof. In this regard, the UE 115-c may be configured to determine a channel (e.g., PRACH, PUSCH, PUCCH) and/or a set of resources (e.g., set of SRS resources, set of time/frequency resources) over which a request for additional system information may be transmitted based on the system information request mode determined at 315. In other words, the first system information may indicate an uplink BWP (e.g., uplink BWP configuration) for transmitting requests for additional system information.

At 320, the UE 115-c may determine whether additional system information for reduced-capability UEs 115 may be received (e.g., acquired). The UE 115-c may determine whether additional system information for reduced-capability UEs 115 may be received in response to on-demand requests based on receiving the first system information at 305, evaluating the first system information for the dedicated field at 310, determining the system information request mode at 315, or any combination thereof.

In some aspects, the UE 115-c may determine whether additional system information for reduced-capability UEs 115 may be received without a request, may be received in response to on-demand requests, or both. In some aspects, the UE 115-c may be configured to determine whether additional system information may (or may not) be received based on the information included within the dedicated field of the first system information (if any), based on a configuration information element of the first system information, or both. For example, in cases where the UE 115-c determines that the first system information includes a dedicated field at 310, the UE 115-*c* may determine whether or not additional system information may be received in response to on-demand requests and/or without a request at 320 based on the information included in the dedicated field. By way of another example, in cases where the UE 115-*c* determines that the first system information does not include a dedicated field at 310 (e.g., dedicated field is absent from first system information), the UE 115-*c* may determine whether or not additional system information may be received in response to on-demand requests and/or without a request at 320 based on the information included in a configuration information element (e.g., SI-RequestConfig-RB) of the first system information. In this regard, the dedicated field may serve as an efficient, early indicator as to whether or not the base station 105-*b* is configured for ODSI for reduced-capability UEs 115.

In cases where the first system information includes a dedicated field including one or more bit fields, the UE 115-*c* may be configured to determine that a first value of a bit field of the one or more bit fields (e.g., OSI-Indicator–RB=1) indicates that the additional system information for reduced-capability UEs 115 may be received in response to on-demand requests. Conversely, the UE 115-*c* may be further configured to determine that a second value of the bit field of the one or more bit fields (e.g., OSI-Indicator–RB=0) indicates that the additional system information for reduced-capability UEs 115 may not be received in response to on-demand requests.

In cases where the UE 115-*c* determines that additional system information for reduced-capability UEs 115 may not be obtained with or without on-demand requests, the process flow 300 may proceed to 325.

At 325, the UE 115-*c* may continue wireless communications without obtaining the additional system information for reduced-capability UEs 115, select a new cell, or both. For example, in cases where the UE 115-*c* determines that additional system information for reduced-capability UEs 115 may not be received in response to on-demand requests (or without a request), the UE 115-*c* may search for a new cell supported by the base station 105-*b* and/or a different base station 105 which does allow reduced-capability UEs 115-*c* to receive additional system information in response to on-demand requests and/or without a request. By way of another example, in some cases, the UE 115-*c* may determine a system information mode at 315 which indicates that the base station 105-*b* is not configured to transmit additional system information for reduced-capability UEs 115. In this example, the UE 115-*c* may continue wireless communications without obtaining the additional system information for reduced-capability UEs 115, select a new cell, or both, based on the determined system information request mode.

Reference will again be made to 320 of process flow 300. In case where the UE 115-*c* determines that additional system information for reduced-capability UEs 115 may be received in response to on-demand requests at 320, the process flow 300 may proceed to 330.

At 330, the UE 115-*c*, the base station 105-*b*, or both, may determine a set of thresholds for transmitting a request for the additional system information. In some aspects, the UE 115-*c* may determine the set of thresholds for transmitting the request based on information included within the dedicated field of the first system information (if any), based on information included within the configuration information element of the first system information, or both. In this regard, the UE 115-*c* may determine the set of thresholds based on receiving the first system information at 305, evaluating the first system information for the dedicated field at 310, determining the system information request mode at 315, determining whether additional system information for reduced-capability UEs 115 may be obtained at 320, or any combination thereof.

In cases where the dedicated field includes one or more bit fields, the UE 115-*c* may determine the set of thresholds based on one or more values of one or more bit fields of the dedicated field. In some aspects, the UE 115-*c* may be pre-configured (e.g., via RRC signaling or other control signaling) to interpret different bit values of the dedicated field and/or configuration information element as indicating different sets of thresholds. For example, the UE 115-*c* may receive a control message (e.g., RRC message) which indicates a first value of a bit field of the dedicated field is associated with a first set of thresholds, and a second value of a bit field of the dedicated field is associated with a second set of thresholds. Subsequently, a value of a bit field of the dedicated field within the first system information may be used to indicate which set of thresholds the UE 115-*c* is to use.

The set of thresholds for transmitting the request for the additional system information may include any thresholds or parameters known in the art. For example, the set of thresholds may include a threshold associated with a bandwidth capability of the UE 115-*c* (e.g., minimum bandwidth capability the UE 115-*c* may have to be able to request additional system information), a threshold associated with a quantity of antennas of the UE 115-*c* (e.g., minimum quantity of antennas the UE 115-*c* may have to be able to request additional system information), or both. By way of another example, the set of thresholds may include a threshold associated with a signal quality of signals received at the UE 115-*c* (e.g., RSRP threshold, RSRQ threshold, RSSI threshold, SNR threshold, SINR threshold), a threshold associated with a quantity of requests for the additional system information which may be transmitted by the UE 115-*c* (e.g., maximum number of requests the UE 115-*c* may transmit), or any combination thereof.

The set of thresholds may be indicated by the base station 105-*b* via the first system information to indicate which UEs 115 may be allowed to request additional system information. In order to request additional system information, the UE 115-*c* may be required to satisfy one or more thresholds (e.g., all) of the set of thresholds. In this regard, the UE 115-*c* may be configured to determine the set of thresholds and determine whether the UE 115-*c* satisfies one or more thresholds in order to determine whether the UE 115-*c* is able to transmit a request for additional system information.

At 335, the UE 115-*c*, the base station 105-*b*, or both, may determine a set of additional system informations (e.g., RB-SIB1, RB-SIB2, RB-SIB3) which may be requested from the base station 105-*b*. In other words, the UE 115-*c* may determine what type(s) of additional system information may be obtained. In some aspects, the UE 115-*c* may determine the set of additional system informations which may be requested based on information included within the dedicated field of the first system information (if any), based on information included within the configuration information element of the first system information, or both. In this regard, the UE 115-*c* may determine the set of additional system informations which may be requested based on receiving the first system information at 305, evaluating the first system information for the dedicated field at 310, determining the system information request mode at 315, determining whether additional system information for reduced-capability UEs 115 may be obtained at 320, determining the thresholds for transmitting the request at 330, or any combination thereof.

Additional system information which may be obtained may include SSBs, other downlink broadcast reference signals, COREST(s), common sears space (CSS) configurations for random access procedures, paging and system information update information, or any combination thereof. Additionally, or alternatively, the additional system information may include a SIB of a second type (e.g., second type which is different from a SIB of a first type associated with the first system information), a MIB of a second type (e.g., second type which is different from a MIB of a first type associated with the first system information), or both.

At 340, the UE 115-c, the base station 105-b, or both, may determine a set of parameters usable by the base station 105-b to transmit the additional system information. Additionally or alternatively, the UE 115-c may determine a set of parameters usable by the UE 115-c to receive the additional system information. In some aspects, the UE 115-c may determine the set of parameters for transmitting and/or receiving the additional system information based on information included within the dedicated field of the first system information (if any), based on information included within the configuration information element of the first system information, or both. In this regard, the UE 115-c may determine the set of parameters (e.g., resources, BWPs) for transmitting and/or receiving the additional system information based on receiving the first system information at 305, evaluating the first system information for the dedicated field at 310, determining the system information request mode at 315, determining whether additional system information for reduced-capability UEs 115 may be obtained at 320, determining the thresholds for transmitting the request at 330, determining the set of additional system information which may be requested at 335, or any combination thereof.

In some aspects, the set of parameters usable by the base station 105-b to transmit the additional system information (e.g., parameters usable by the UE 115-c to receive the additional system information) may include an MCS, a code rate, a set of time resources, a set of frequency resources (BWPs), a set of spatial resources, or any combination thereof. In this regard, the base station 105-b may indicate, and the UE 115-c may determine, a coverage enhancement scheme which may be used to transmit and/or receive the additional system information based on information included within the dedicated field and/or configuration information element of the first system information. In some aspects, one or more parameters in the set of parameters determined at 340 may be different from at least one parameters used to transmit and/or receive the first system information at 305.

At 345, the UE 115-c, the base station 105-b, or both, may determine a periodicity associated with the additional system information. The periodicity may include a periodicity at which the base station 105-b may transmit the additional system information. In some cases, the periodicity associated with the additional system information may be different from a periodicity associated with the first system information (e.g., a periodicity at which the first system information is transmitted or broadcast). In some aspects, the UE 115-c may determine the periodicity associated with the additional system information based on information included within the dedicated field of the first system information (if any), based on information included within the configuration information element of the first system information, or both.

In some aspects, the periodicity of the additional system information may be dependent on the contents of the additional system information (e.g., based on the type of additional system information). In this regard, the periodicity of the additional system information may be based on whether the additional system information includes SSBs, other downlink broadcast reference signals (e.g., broadcast reference signals for synchronization, radio resources management (RRM), radio link monitoring (RLM)), COREST(s), CSS configurations for scheduling system information and random access procedures, paging and system information update information, a SIB of a second type, a MIB of a second type, or any combination thereof.

In this regard, the UE 115-c may determine the periodicity associated with the additional system information based on receiving the first system information at 305, evaluating the first system information for the dedicated field at 310, determining the system information request mode at 315, determining whether additional system information for reduced-capability UEs 115 may be obtained at 320, determining the thresholds for transmitting the request at 330, determining the set of additional system information which may be requested at 335, determining the parameters for transmitting/receiving the additional system information at 340, or any combination thereof.

At 350, the UE 115-c may transmit a request for additional system information. In some aspects, the UE 115-c may transmit the request for the additional system information in accordance with information included within the dedicated field of the first system information (if any), based on information included within the configuration information element of the first system information, or both. Additionally, or alternatively, the UE 115-c may transmit the request for the additional system information via an uplink BWP which is dedicated for reduced-capability UEs 115. In this regard, the UE 115-c may transmit the request for the additional system information based on receiving the first system information at 305, evaluating the first system information for the dedicated field at 310, determining the system information request mode at 315, determining whether additional system information for reduced-capability UEs 115 may be obtained at 320, determining the thresholds for transmitting the request at 330, determining the set of additional system information which may be requested at 335, determining the parameters for transmitting/receiving the additional system information at 340, determining the periodicity of the additional system information at 345, or any combination thereof.

In some aspects, the UE 115-c may determine the system information request mode at 315, and may transmit the request for the additional system information in accordance with the determined system information request mode. For example, the determined system information request mode may be associated with a given set of resources (e.g., PRACH resources, SRS resources, PUSCH resources, PUCCH resources, BWP(s), or any combination thereof), and the UE 115-c may transmit the request at 350 based on (e.g., in accordance with) the determined set of resources. For instance, dependent upon the determined system information request mode, the UE 115-c may transmit the request at 350 via a set of resources associated with a PRACH, an SRS, a PUSCH, a PUCCH, an uplink BWP, or any combination thereof.

In some aspects, the UE 115-c may transmit the request at 350 based on determining that the UE 115-c satisfies at least one threshold of the set of thresholds determined at 330. For example, the set of thresholds may include a minimum bandwidth capability threshold. In this example, the UE 115-*c* may determine that a bandwidth capability of the UE 115-*c* satisfies (e.g., exceeds) the minimum bandwidth capability threshold, and may thereby transmit the request at 350 based on determining that the UE 115-*c* satisfies the minimum bandwidth capability threshold. As noted previously herein, the UE 115-*c* may be configured to determine that it may transmit the request at 350 based on determining that it satisfies only a subset of the set of thresholds, determining that it satisfies every threshold of the set of thresholds, or both.

In some aspects, the UE 115-*c* may indicate to the base station 105-*b* via the request and/or another uplink transmission an indication of which additional system information is being requested, an indication of one or more parameters (e.g., coverage enhancement schemes) that the base station 105-*b* may use to transmit the additional system information, or both. For example, the UE 115-*c* may determine a set of additional system informations which may be requested at 335. In this example, the UE 115-*c* may determine (e.g., select) which additional system information from the set of additional system informations which is to be requested, and may indicate the determined (e.g., selected) additional system information to the base station 105-*b* via the request and/or another uplink transmission.

By way of another example, at 340, the UE 115-*c* may determine a set of parameters (e.g., coverage enhancement schemes, MCS, code rate, time/frequency resources) usable by the base station 105-*b* to transmit the additional system information. In this example, the UE 115-*c* may determine (e.g., select) one or more parameters from the set of parameters which will be used by the base station 105-*b* to transmit the additional system information, and may indicate the determined (e.g., selected) parameters to the base station 105-*b* via the request and/or another uplink transmission. For instance, the UE 115-*c* may determine a set of MCSs which may be used by the base station 105-*b* to transmit the additional system information, and may indicate in the request which MCS the base station 105-*b* should use to transmit the additional system information. In some cases, the parameters usable by the base station 105-*b* to transmit the additional system information which are selected and indicated to the base station 105-*b* may be different from at least one parameter used by the base station 105-*b* to transmit the first system information at 305.

In some cases, the UE 115-*c* may be configured to obtain the additional system information without transmitting a request, and may therefore refrain from transmitting the request at 350. For example, in some cases, the system information request mode determined at 315 may indicate that the UE 115-*c* need not transmit a request for additional system information. In this example, the UE 115-*c* may be configured to refrain from transmitting the request at 350, and may instead monitor for the additional system information in order to obtain the additional system information in accordance with the determined system information request mode.

At 355, the UE 115-*c* may obtain (e.g., receive) the additional system information for reduced-capability UEs 115. In some aspects, additional system information may include a SIB of a second type (e.g., RB-SIB2, RB-SIB3) which is different from the SIB of the first type associated with the first system information, a MIB of a second type which is different from the MIB of the first type associated with the first system information, or any combination thereof. For example, if an additional SSB (e.g., PSS, SSS, PBCH) is transmitted for reduced-capability UEs 115 UE in a separately configured downlink BWP, an additional MIB may also transmitted in PBCH as part of the additional system information.

The UE 115-*c* may obtain the additional system information at 355 in accordance with the information included in the dedicated field of the first system information when the dedicated field is present, the information included within the configuration information element of the first system information when the dedicated field is absent from the first system information, or both. For example, the UE 115-*c* may obtain the additional system information via a downlink BWP which is associated with (e.g., dedicated for) reduced-capability UEs 115.

In this regard, the UE 115-*c* may obtain (e.g., receive) the additional system information for reduced-capability UEs 115 based on receiving the first system information at 305, evaluating the first system information for the dedicated field at 310, determining the system information request mode at 315, determining whether additional system information for reduced-capability UEs 115 may be obtained at 320, determining the thresholds for transmitting the request at 330, determining the set of additional system information which may be requested at 335, determining the parameters for transmitting/receiving the additional system information at 340, determining the periodicity of the additional system information at 345, transmitting the request at 350, or any combination thereof. Moreover, the UE 115-*c* may be configured to obtain the additional system information based on indicating, to the base station 105-*b*, which additional system information is being requested, which parameters the base station 105-*b* is to use to transmit the additional system information, or any combination thereof.

In some cases, the base station 105-*b* may be configured to determine a quantity of reduced-capability UEs 115 which are communicatively coupled to the base station 105-*b*. The base station 105-*b* may determine the quantity of reduced-capability UEs 115 which are communicatively coupled to the base station 105-*b* in order to determine whether it should continue transmitting (e.g., broadcasting) the additional system information, or if it may end broadcasts of the additional system information. In some aspects, the base station 105-*b* may be configured to refrain from transmitting (e.g., broadcasting) the additional system information (e.g., end broadcasts of the additional system information) in cases where the base station 105-*b* determines that a quantity of reduced-capability UEs 115 which are in wireless communications with the base station 105-*b* is less than a threshold quantity of reduced-capability UEs 115. For example, the base station 105-*b* may be configured to refrain from transmitting (e.g., broadcasting) the additional system information in cases where the base station 105-*b* determines that there are no reduced-capability UEs 115 which are in wireless communications with the base station 105-*b*. Additionally or alternatively, the base station 105-*b* may be configured to refrain from transmitting the additional system information at 355 when the UE 115-*c* which requested the additional system information is no longer in wireless communications with the base station 105-*b*, after a predetermined time, after a predetermined quantity of broadcasts, or any combination thereof.

The techniques described herein may provide for on-demand broadcast of system information, which may reduce signaling overhead and lead to a more efficient use of resources within a wireless communications system (e.g., wireless communications system 100 or 200). In particular, techniques described herein may enable the base station 105-*b* of a wireless communications system to broadcast additional system information upon request, thereby reducing signaling overhead and preventing a waste of resources in cases where there are few (or no) reduced-capability UEs 115 which are to receive the additional system information.

Figure 4:
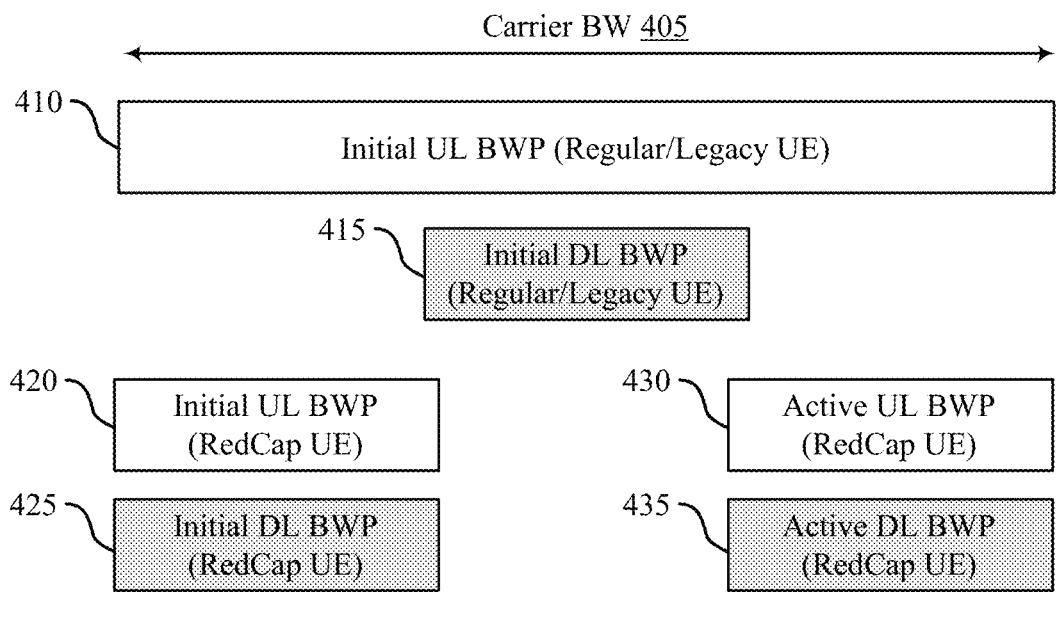
FIG. 4 illustrates an example of a resource configuration that supports techniques for adaptively requesting ODSI in accordance with aspects of the present disclosure.

FIG. 4 shows a resource configuration 400 that supports techniques for adaptatively requesting ODSI in accordance with aspects of the present disclosure. Aspects of the resource configuration 400 may implement, or be implemented by, aspects of the wireless communications system 100, wireless communications system 200, process flow 300, or any combination thereof.

As noted previously herein, some wireless communications systems (e.g., wireless communications systems 100, 200) may be configured with BWPs which are associated with, or dedicated for, reduced-capability UEs 115 and/or regular UEs 115. In some cases, a wireless communications system may include different sets of downlink and uplink BWPs which are dedicated to reduced-capability and regular UEs 115, respectively. For example, as shown in FIG. 4, a wireless communications system may be configured with a resource configuration 400 including an initial uplink BWP 410 and an initial downlink BWP 415 for regular UEs 115. The initial downlink BWP 415 may be associated with a cell-defining SSB (CD-SSB). Moreover, the wireless communications system may be configured with an initial uplink BWP 420, an initial downlink BWP 425, an active uplink BWP 430, and an active downlink BWP 435 for reduced-capability UEs 115. Each of the respective BWPs of the resource configuration 400 may be included within a carrier bandwidth 405 of the respective network or serving cell.

In some aspects, the respective BWPs of the resource configuration 400 may be pre-configured, configured via control signaling (e.g., RRC signaling, MAC-CE signaling, SIB messages), or both. The BWPs which are dedicated for reduced-capability UEs 115 (e.g., initial uplink BWP 420, initial downlink BWP 425, active uplink BWP 430, and active downlink BWP 435) may span bandwidths which are smaller than BWPs for regular UEs 115, and may be configured so as to not exceed an expected maximum bandwidth capability supported by reduced-capability UEs 115.

In some aspects, regular UEs 115 (e.g., non-reduced-capability UEs 115) may be configured to communicate via the initial uplink BWP 410 and the initial downlink BWP 415. Additionally, or alternatively, regular UEs 115 may be configured to communicate via BWPs which are dedicated for reduced-capability UEs 115 (e.g., initial uplink BWP 420, initial downlink BWP 425, active uplink BWP 430, and active downlink BWP 435). Comparatively, reduced-capability UEs 115 may be unable to communicate via BWPs which are associated with (e.g., dedicated for) regular UEs 115, and may therefore communicate via BWPs which are dedicated for reduced-capability UEs 115 (e.g., initial uplink BWP 420, initial downlink BWP 425, active uplink BWP 430, and active downlink BWP 435). In particular, reduced-capability UEs 115 may receive system information (e.g., first information 210), additional system information (e.g., additional system information 220), or both, via downlink BWPs which are dedicated for reduced-capability UEs 115, and may transmit requests for additional system information via uplink BWPs which are dedicated for reduced-capability UEs 115.

For example, when performing an initial access procedure, a reduced-capability UE 115 (e.g., reduced-capability UEs 115-*a*, 115-*c*) may select a serving cell and may detect an uplink signal configuration or uplink channel configuration for transmitting an ODSI request. Each respective uplink signal/channel configuration may be associated with respective resource configurations (e.g., resource configuration 400) including sets of resources (BWPs) which are associated with, or dedicated for, regular and/or reduced-capability UEs 115. The reduced-capability UE 115 may transmit an ODSI request on a pre-configured uplink signal/channel based on the uplink signal/channel configuration. For example, the UE 115 may transmit an ODSI request via the initial uplink BWP 420 associated with (e.g., dedicated for) reduced-capability UEs 115.

Upon receiving the ODSI request from reduced-capability UE 115, the network (e.g., base stations 105-*a*, 105-*b*) may begin broadcasting RB-SSBs, RB-MIBs, and/or RB-SIBs dedicated to reduced-capability UEs via the initial downlink BWP 425 associated with reduced-capability UEs 115. System information updates for reduced-capability UEs 115 may be communicated via dedicated RB-SIB messages over the initial downlink BWP 425. Moreover, msg2 and msg4 of a four-step RACH procedure may be transmitted via the initial downlink BWP 425, as well as msgB of a two-step RACH procedure and PDCCH scheduling for msg2, msg4, msgB, and retransmissions for msg3. ay In some aspects, the initial downlink/uplink configuration for reduced-capability UEs 115 (e.g., configuration of the initial uplink BWP 420 and initial downlink BWP 425) may be included or signaled via the system information for cell selection, or may be included in system information update for the reduced-capability UE 115.

Following the initial access procedure, the reduced-capability UE 115 may be switched to a pair of active uplink/downlink BWPs after RRC connection establishment. For example, the UE 115 may switch from the initial uplink BWP 420 and the initial downlink BWP 425 to the active uplink BWP 430 and the active downlink BWP 435. The UE 115 may switch between the initial and active BWPs by performing BWP switching procedures. In some aspects, the active uplink BWP 430 and the active downlink BWP 435 may be configured or signaled by RB-SIB, which is transmitted in the initial downlink BWP 425 dedicated for reduced-capability UEs 115. The active downlink BWP 435 for reduced-capability UEs 115 may or may not include a dedicated SSB. In some aspects, the reduced-capability UE 115 may measure the periodic tracking reference signals (TRSs) and/or periodic CSI-RS in the active downlink BWP 435. Additionally, or alternatively, in cases where the SSB is not transmitted in the active downlink BWP 435, the reduced-capability UE 115 may switch to the initial downlink BWP 425 to measure the SSB. A common search space (CSS) can be configured for paging and wake-up signal (WUS) in the active downlink BWP 435, as well as a Layer 3 (L3) measurement gap. Moreover, system information updates for reduced-capability UEs 115 may be based on paging, dedicated RRC signaling, or both. For example, in cases where a paging search space is not configured, system information updates may be communicated via dedicated RRC signaling over the active downlink BWP 435.

Figure 5:
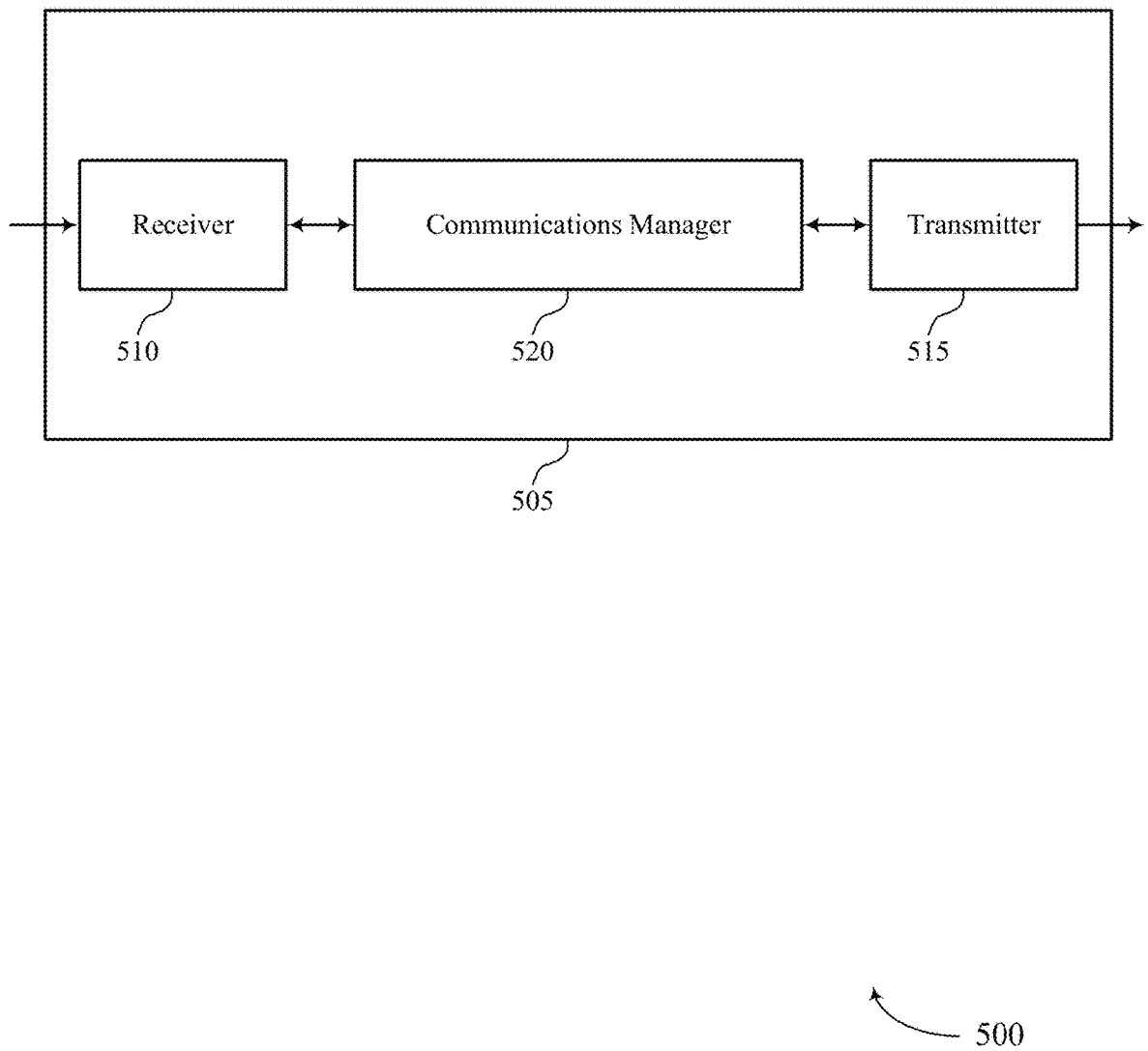
FIGS. 5 and 6 show block diagrams of devices that support techniques for adaptively requesting ODSI in accordance with aspects of the present disclosure.

FIG. 5 shows a block diagram 500 of a device 505 that supports techniques for adaptatively requesting ODSI in accordance with aspects of the present disclosure. The device 505 may be an example of aspects of a user equipment (UE) 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for adaptatively requesting ODSI). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to size-based neural network selection for autoencoder-based communication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for adaptively requesting ODSI as described herein.

In some examples, the communications manager 520, the receiver 510, the transmitter 515, or various combinations thereof or components thereof, may be implemented in hardware (e.g., in communications management circuitry). The circuitry may include a processor, a digital signal processor (DSP), an application-specific integrated circuit (ASIC), a field-programmable gate array (FPGA) or other programmable logic device, a discrete gate or transistor logic, discrete hardware components, or any combination thereof designed to perform the functions described in the present disclosure.

Additionally or alternatively, in some examples, the communications manager 520, the receiver 510, the transmitter 515, or various combinations thereof or components thereof, may be implemented in code (e.g., as communications management software or firmware) executed by a processor. If implemented in code executed by a processor, the functions of the communications manager 520, the receiver 510, the transmitter 515, or various combinations thereof or components thereof, may be executed by a general-purpose processor, a DSP, a central processing unit (CPU), an ASIC, an FPGA, or any combination of these or other programmable logic devices.

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured to provide or support a means for receiving first system information from a base station, the first system information being for reduced-capability UEs including UEs with a bandwidth capability below a threshold, the UE being a reduced-capability UE. The communications manager 520 may be configured to provide or support a means for evaluating the first system information for a dedicated field that includes an indicator that additional system information for reduced-capability UEs is to be received in response to on-demand requests. The communications manager 520 may be configured to provide or support a means for obtaining the additional system information for reduced-capability UEs in accordance with information included in either the dedicated field when the dedicated field is included in the first system information or in a configuration information element of the first system information when the dedicated field is absent from the first system information.

By including or configuring the communications manager 520 in accordance with examples as described herein, the device 505 (e.g., a processor controlling or otherwise coupled to the receiver 510, the transmitter 515, the communications manager 520, or a combination thereof) may support improved techniques for on-demand broadcasts of system information for reduced-capability UEs 115, which may reduce signaling overhead and lead to more efficient use of resources within a wireless communications system. In particular, techniques described herein may enable the reduced-capability UE 115 to determine whether additional system information may be received in response to on-demand requests based on information included within a first system information, thereby enabling the base station 105 to broadcast the additional system information for reduced-capability UEs 115 on an as-needed basis, which may reduce signaling overhead and prevent wasted resources in cases where there are few (or no) reduced-capability UEs 115 which are to receive the additional system information.

Based on obtaining additional system information for reduced-capability UEs 115 in accordance with information included within a first system information, a processor of the UE 115 (e.g., a processor controlling the receiver 510, the communications manager 520, the transmitter 515, etc.) may reduce processing resources used for acquisition of additional system information. For example, by enabling the UE 115 to efficiently determine whether additional system information may be obtained in response to on-demand requests (and/or without requests), techniques described herein may reduce a duration of time in which the UE 115 spends monitoring for additional system information, which may reduce power consumption and signaling which is associated with monitoring for additional system information. By reducing the power consumption, battery life of the UE 115 may be improved. Moreover, reducing a duration of time in which the UE 115 spends monitoring for additional system information may result in faster, more efficient acquisition of additional system information, leading to improved user experience.

Figure 6:
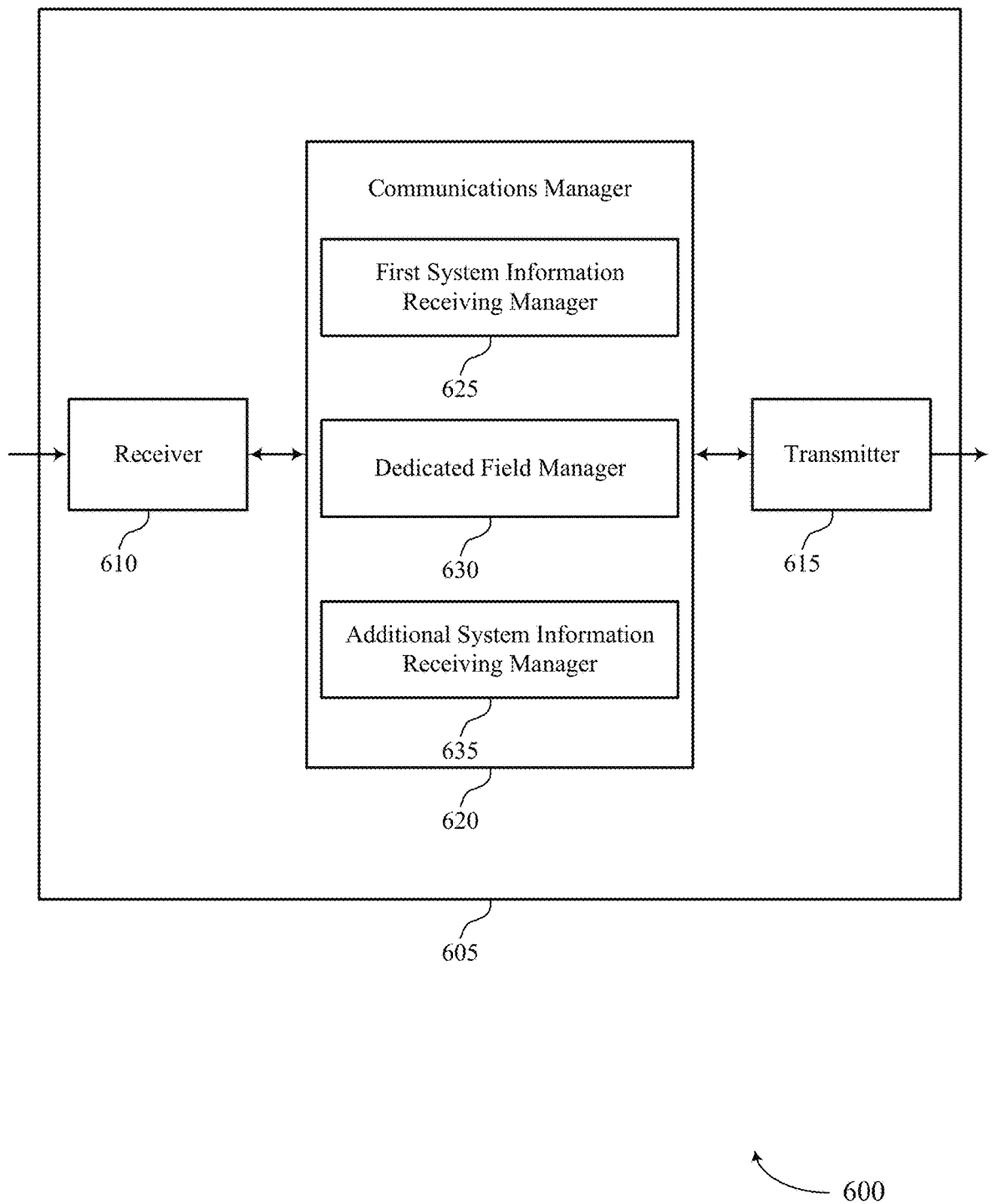

FIG. 6 shows a block diagram 600 of a device 605 that supports techniques for adaptively requesting ODSI in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for adaptively requesting ODSI). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to size-based neural network selection for autoencoder-based communication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for adaptatively requesting ODSI as described herein. For example, the communications manager 620 may include a first system information receiving manager 625, a dedicated field manager 630, an additional system information receiving manager 635, or any combination thereof. The communications manager 620 may be an example of aspects of a communications manager 420 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The first system information receiving manager 625 may be configured to provide or support a means for receiving first system information from a base station, the first system information being for reduced-capability UEs including UEs with a bandwidth capability below a threshold, the UE being a reduced-capability UE. The dedicated field manager 630 may be configured to provide or support a means for evaluating the first system information for a dedicated field that includes an indicator that additional system information for reduced-capability UEs is to be received in response to on-demand requests. The additional system information receiving manager 635 may be configured to provide or support a means for obtaining the additional system information for reduced-capability UEs in accordance with information included in either the dedicated field when the dedicated field is included in the first system information or in a configuration information element of the first system information when the dedicated field is absent from the first system information.

Figure 7:
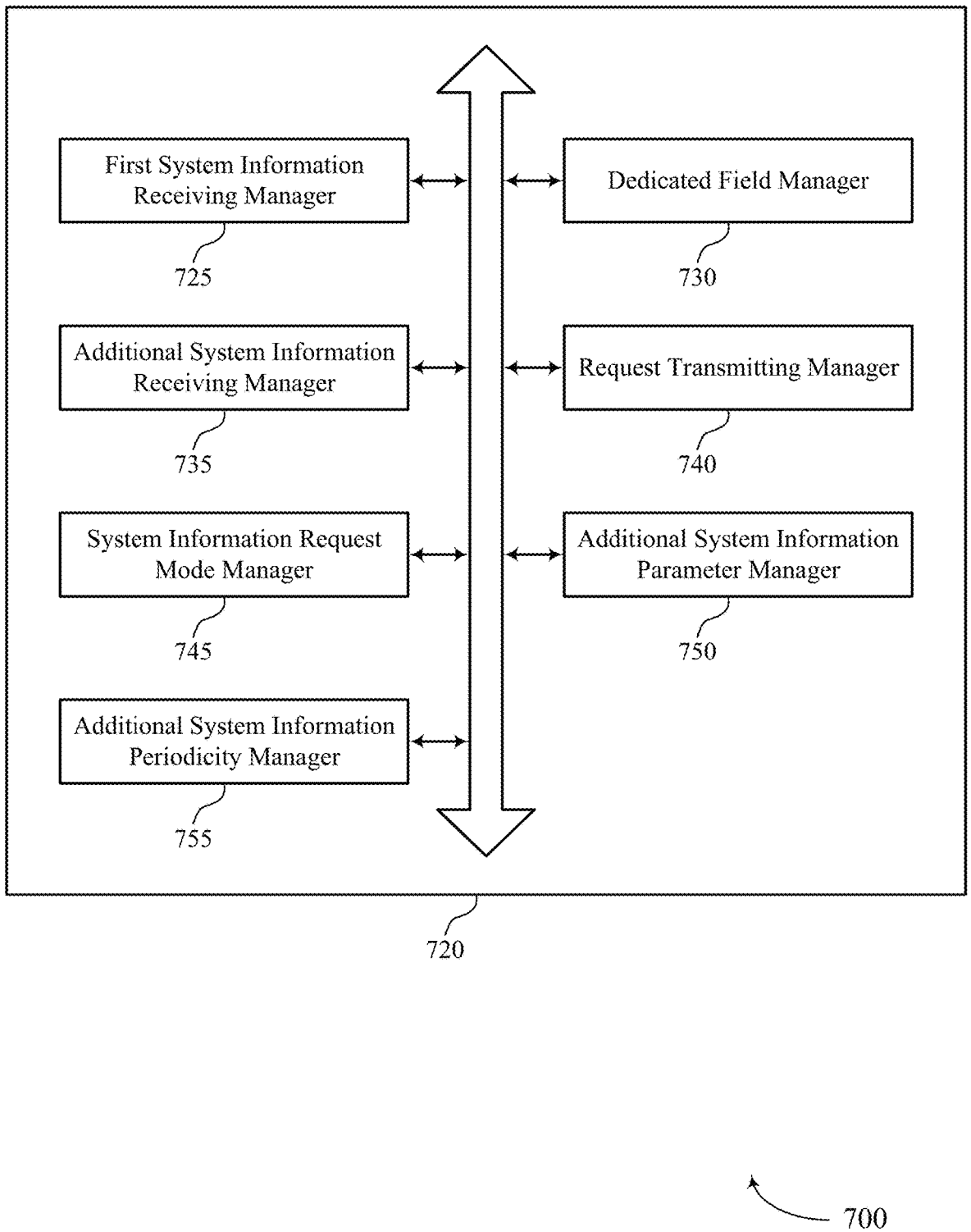
FIG. 7 shows a block diagram of a communications manager that supports techniques for adaptively requesting ODSI in accordance with aspects of the present disclosure.

FIG. 7 shows a block diagram 700 of a communications manager 720 that supports techniques for adaptatively requesting ODSI in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for adaptatively requesting ODSI as described herein. For example, the communications manager 720 may include a first system information receiving manager 725, a dedicated field manager 730, an additional system information receiving manager 735, a request transmitting manager 740, a system information request mode manager 745, an additional system information parameter manager 750, an additional system information periodicity manager 755, or any combination thereof. Each of these components may communicate, directly or indirectly, with one another (e.g., via one or more buses).

The communications manager 720 may support wireless communication at a UE in accordance with examples as disclosed herein. The first system information receiving manager 725 may be configured to provide or support a means for receiving first system information from a base station, the first system information being for reduced-capability UEs including UEs with a bandwidth capability below a threshold, the UE being a reduced-capability UE. The dedicated field manager 730 may be configured to provide or support a means for evaluating the first system information for a dedicated field that includes an indicator that additional system information for reduced-capability UEs is to be received in response to on-demand requests. The additional system information receiving manager 735 may be configured to provide or support a means for obtaining the additional system information for reduced-capability UEs in accordance with information included in either the dedicated field when the dedicated field is included in the first system information or in a configuration information element of the first system information when the dedicated field is absent from the first system information.

In some examples, to support obtaining the additional system information for reduced-capability UEs, the additional system information receiving manager 735 may be configured to provide or support a means for determining that the additional system information is to be received in response to on-demand requests based on the information included in either the dedicated field or in the configuration information element. In some examples, to support obtaining the additional system information for reduced-capability UEs, the request transmitting manager 740 may be configured to provide or support a means for transmitting, to the base station, a request for the additional system information in accordance with the information included in either the dedicated field or in the configuration information element.

In some examples, to support obtaining the additional system information for reduced-capability UEs, the system information request mode manager 745 may be configured to provide or support a means for identifying a system information request mode from the information included in either the dedicated field or in the configuration information element. In some examples, to support obtaining the additional system information for reduced-capability UEs, the request transmitting manager 740 may be configured to provide or support a means for transmitting, to the base station and in accordance with the system information request mode, a request for the additional system information via a set of resources associated with a physical random access channel or a sounding reference signal.

In some examples, to support obtaining the additional system information for reduced-capability UEs, the system information request mode manager 745 may be configured to provide or support a means for identifying a system information request mode from the information included in either the dedicated field or in the configuration information element. In some examples, to support obtaining the additional system information for reduced-capability UEs, the request transmitting manager 740 may be configured to provide or support a means for transmitting, to the base station and in accordance with the system information request mode, a request for the additional system information via a set of resources associated with a physical uplink shared channel or a physical uplink control channel.

In some examples, to support obtaining the additional system information for reduced-capability UEs, the system information request mode manager 745 may be configured to provide or support a means for identifying a system information request mode from the information included in either the dedicated field or in the configuration information element. In some examples, to support obtaining the additional system information for reduced-capability UEs, the request transmitting manager 740 may be configured to provide or support a means for transmitting, to the base station and in accordance with the system information request mode, a request for the additional system information via a set of resources associated with a physical random access channel, a sounding reference signal, a physical uplink shared channel, or a physical uplink control channel.

In some examples, to support obtaining the additional system information for reduced-capability UEs, the system information request mode manager 745 may be configured to provide or support a means for identifying a system information request mode from the information included in either the dedicated field or in the configuration information element. In some examples, to support obtaining the additional system information for reduced-capability UEs, the additional system information receiving manager 735 may be configured to provide or support a means for obtaining the additional system information from the base station in accordance with the system information request mode without transmitting a request for the additional system information.

In some examples, the request transmitting manager 740 may be configured to provide or support a means for determining a set of thresholds for transmitting a request for the additional system information based on the information included in the dedicated field or in the configuration information element. In some examples, the request transmitting manager 740 may be configured to provide or support a means for transmitting, to the base station, the request for the additional system information based on determining that the UE satisfies at least one threshold of the set of thresholds.

In some examples, the dedicated field includes one or more bit fields. In some examples, determining the set of thresholds is based on one or more values of the one or more bit fields of the dedicated field.

In some examples, the set of thresholds for transmitting the request for the additional system information include a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

In some examples, the dedicated field includes one or more bit fields. In some examples, a first value of a bit field of the one or more bit fields indicates that the additional system information for reduced-capability UEs is to be received in response to on-demand requests. In some examples, a second value of the bit field of the one or more bit fields indicates that the additional system information for reduced-capability UEs is not to be received in response to on-demand requests.

In some examples, the additional system information receiving manager 735 may be configured to provide or support a means for determining a set of additional system informations which may be requested based on the information included in the dedicated field or in the configuration information element. In some examples, the request transmitting manager 740 may be configured to provide or support a means for transmitting, to the base station, an indication of the additional system information included within the set of additional system informations, where obtaining the additional system information is based on transmitting the indication of the additional system information.

In some examples, the additional system information parameter manager 750 may be configured to provide or support a means for determining a set of parameters usable by the base station to transmit the additional system information based on the information included in the dedicated field or in the configuration information element. In some examples, the request transmitting manager 740 may be configured to provide or support a means for transmitting, to the base station, an indication of one or more parameters included within the set of parameters, where obtaining the additional system information is based on transmitting the indication of the one or more parameters. In some examples, the one or more parameters includes an MCS, a code rate, or both. In some examples, the one or more parameters used to obtain the additional system information are different from at least one parameter used to receive the first system information.

In some examples, the additional system information periodicity manager 755 may be configured to provide or support a means for determining a periodicity associated with the additional system information based on the information included in the dedicated field or in the configuration information element, where obtaining the additional system information is based on determining the periodicity. In some examples, the periodicity associated with the additional system information is different from a periodicity associated with the first system information.

In some examples, the first system information includes a SIB of a first type (e.g., SIB1), an MIB, an SSB, or any combination thereof. In some examples, the additional system information includes a SIB of a second type which is different from the first type. In some examples, the first system information is received multiplexed with other system information receivable by the other UEs. In some examples, the first system information is received via a PBCH associated with reduced-capability UEs, a PDSCH associated with reduced-capability UEs, or both.

Figure 8:
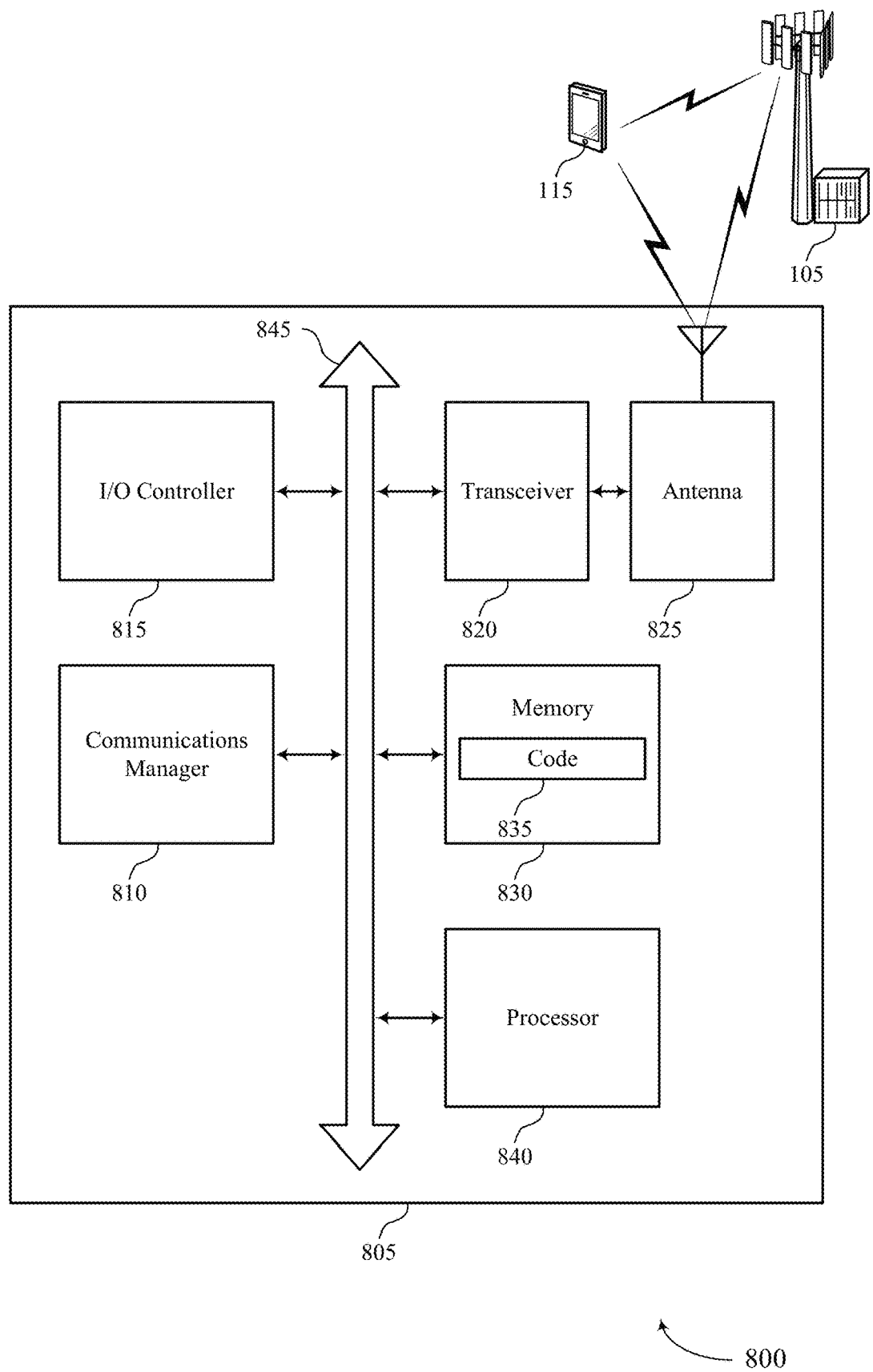
FIG. 8 shows a diagram of a system including a device that supports techniques for adaptively requesting ODSI in accordance with aspects of the present disclosure.

FIG. 8 shows a diagram of a system 800 including a device 805 that supports techniques for adaptively requesting ODSI in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, including a communications manager 810, an I/O controller 815, a transceiver 820, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In some other cases, the I/O controller 815 may represent or interact with a modem, a keyboard, a mouse, a touchscreen, or a similar device. In some cases, the I/O controller 815 may be implemented as part of a processor, such as the processor 840. In some cases, a user may interact with the device 805 via the I/O controller 815 or via hardware components controlled by the I/O controller 815.

In some cases, the device 805 may include a single antenna 825. However, in some other cases the device 805 may have more than one antenna 825, which may be capable of concurrently transmitting or receiving multiple wireless transmissions. The transceiver 820 may communicate bi-directionally, via the one or more antennas 825, wired, or wireless links as described herein. For example, the transceiver 820 may represent a wireless transceiver and may communicate bi-directionally with another wireless transceiver. The transceiver 820 may also include a modem to modulate the packets and provide the modulated packets to one or more antennas 825 for transmission, and to demodulate packets received from the one or more antennas 825. The transceiver 820, or the transceiver 820 and one or more antennas 825, may be an example of a transmitter 415, a transmitter 515, a receiver 410, a receiver 510, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or other type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for adaptatively requesting ODSI). For example, the device 805 or a component of the device 805 may include a processor 840 and memory 830 coupled to the processor 840, the processor 840 and memory 830 configured to perform various functions described herein.

The communications manager 810 may support wireless communication at a UE in accordance with examples as disclosed herein. For example, the communications manager 810 may be configured to provide or support a means for receiving first system information from a base station, the first system information being for reduced-capability UEs including UEs with a bandwidth capability below a threshold, the UE being a reduced-capability UE. The communications manager 810 may be configured to provide or support a means for evaluating the first system information for a dedicated field that includes an indicator that additional system information for reduced-capability UEs is to be received in response to on-demand requests. The communications manager 810 may be configured to provide or support a means for obtaining the additional system information for reduced-capability UEs in accordance with information included in either the dedicated field when the dedicated field is included in the first system information or in a configuration information element of the first system information when the dedicated field is absent from the first system information.

By including or configuring the communications manager 810 in accordance with examples as described herein, the device 805 may support techniques for on-demand broadcasts of system information for reduced-capability UEs 115, which may reduce signaling overhead and lead to more efficient use of resources within a wireless communications system. In particular, techniques described herein may enable the reduced-capability UE 115 to determine whether additional system information may be received in response to on-demand requests based on information included within a first system information, thereby enabling the base station 105 to broadcast the additional system information for reduced-capability UEs 115 on an as-needed basis, which may reduce signaling overhead and prevent wasted resources in cases where there are few (or no) reduced-capability UEs 115 which are to receive the additional system information.

Based on obtaining additional system information for reduced-capability UEs 115 in accordance with information included within a first system information, a processor of the UE 115 (e.g., a processor controlling 820 the communications manager 810, the transceiver 820, etc.) may reduce processing resources used for acquisition of additional system information. For example, by enabling the UE 115 to efficiently determine whether additional system information may be obtained in response to on-demand requests (and/or without requests), techniques described herein may reduce a duration of time in which the UE 115 spends monitoring for additional system information, which may reduce power consumption and signaling which is associated with monitoring for additional system information. By reducing the power consumption, battery life of the UE 115 may be improved. Moreover, reducing a duration of time in which the UE 115 spends monitoring for additional system information may result in faster, more efficient acquisition of additional system information, leading to improved user experience.

In some examples, the communications manager 810 may be configured to perform various operations (e.g., receiving, monitoring, transmitting) using or otherwise in cooperation with the transceiver 820, the one or more antennas 825, or any combination thereof. Although the communications manager 810 is illustrated as a separate component, in some examples, one or more functions described with reference to the communications manager 810 may be supported by or performed by the processor 840, the memory 830, the code 835, or any combination thereof. For example, the code 835 may include instructions executable by the processor 840 to cause the device 805 to perform various aspects of techniques for adaptatively requesting ODSI as described herein, or the processor 840 and the memory 830 may be otherwise configured to perform or support such operations.

Figure 9:
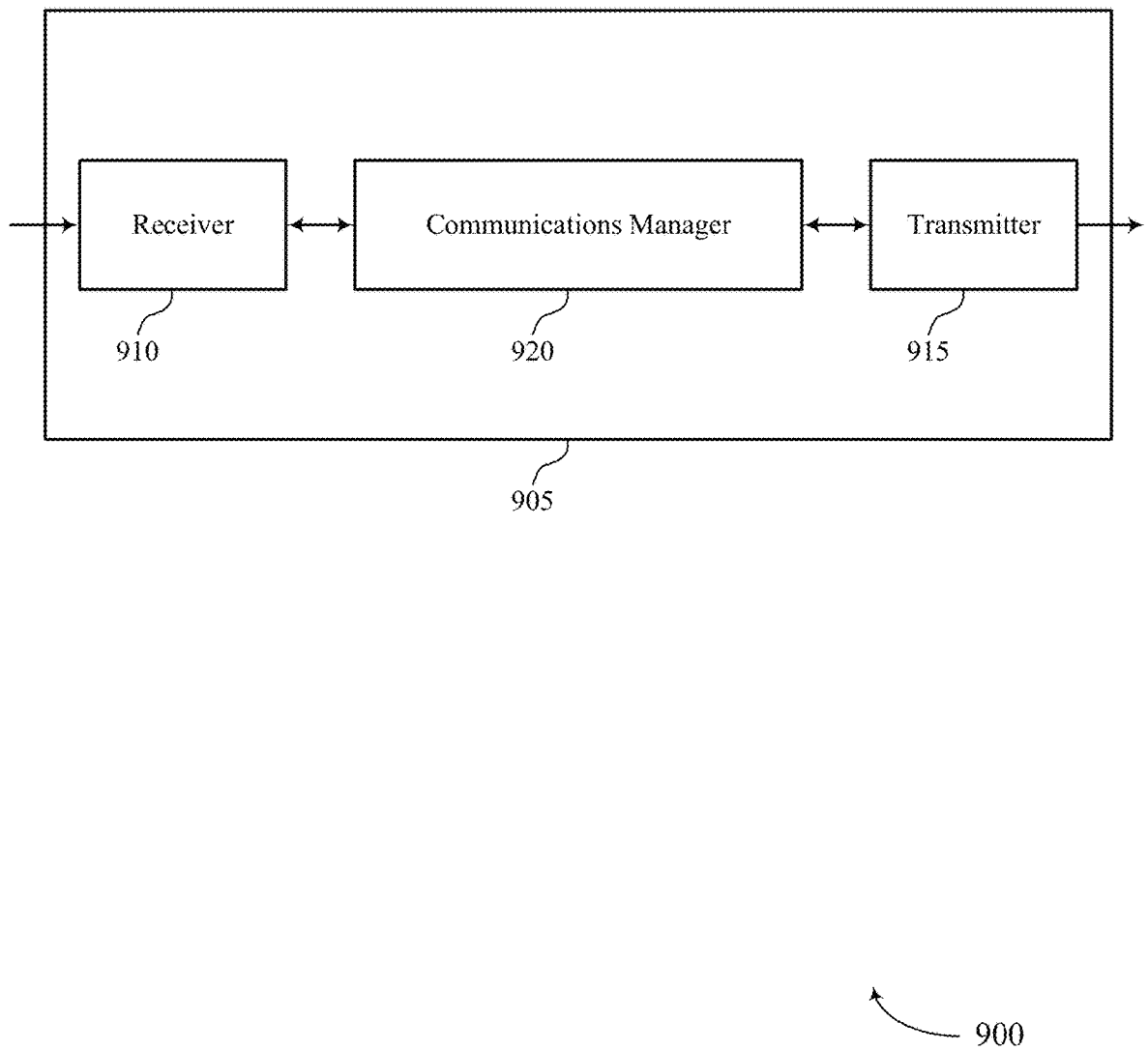
FIGS. 9 and 10 show block diagrams of devices that support techniques for adaptively requesting ODSI in accordance with aspects of the present disclosure.

FIG. 9 shows a block diagram 900 of a device 905 that supports techniques for adaptatively requesting ODSI in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for adaptatively requesting ODSI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to size-based neural network selection for autoencoder-based communication). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for adaptatively requesting ODSI as described herein.

In some examples, the communications manager 920, the receiver 910, the transmitter 915, or various combinations thereof or components thereof, may be implemented in hardware (e.g., in communications management circuitry). The circuitry may include a processor, an DSP, a ASIC, an FPGA or other programmable logic device, a discrete gate or transistor logic, discrete hardware components, or any combination thereof designed to perform the functions described in the present disclosure.

Additionally or alternatively, in some examples, the communications manager 920, the receiver 910, the transmitter 915, or various combinations thereof or components thereof, may be implemented in code (e.g., as communications management software or firmware) executed by a processor. If implemented in code executed by a processor, the functions of the communications manager 920, the receiver 910, the transmitter 915, or various combinations thereof or components thereof, may be executed by a general-purpose processor, a DSP, a CPU, an ASIC, an FPGA, or any combination of these or other programmable logic devices.

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured to provide or support a means for transmitting first system information to a UE, the first system information being for reduced-capability UEs including UEs with a bandwidth capability below a threshold, the UE being a reduced-capability UE. The communications manager 920 may be configured to provide or support a means for evaluating the first system information for a dedicated field that includes an indicator that additional system information for reduced-capability UEs is to be transmitted in response to on-demand requests. The communications manager 920 may be configured to provide or support a means for transmitting the additional system information for reduced-capability UEs in accordance with information included in either the dedicated field when the dedicated field is included in the first system information or in a configuration information element of the first system information when the dedicated field is absent from the first system information.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for on-demand broadcasts of system information for reduced-capability UEs 115, which may reduce signaling overhead and lead to more efficient use of resources within a wireless communications system. In particular, techniques described herein may the base station 105 to transmit additional system information for reduced-capability UEs 115 on an as-needed basis (e.g., in response to on-demand requests), which may reduce signaling overhead and prevent wasted resources in cases where there are few (or no) reduced-capability UEs 115 which are to receive the additional system information.

Based on transmitting additional system information for reduced-capability UEs 115 on an as-needed basis, a processor of the base station (e.g., a processor controlling the receiver 910, the communications manager 920, the transmitter 915, etc.) may reduce processing resources used for acquisition of additional system information. For example, by enabling the base station 105 to indicate to UEs 115 whether additional system information may be received in response to on-demand requests, techniques described herein may enable the base station 105 to transmit additional system information for reduced-capability UEs 115 on an as-needed basis, which may reduce power consumption and signaling at the base station 105 which is associated with continuously or regularly broadcasting the additional system information.

Figure 10:
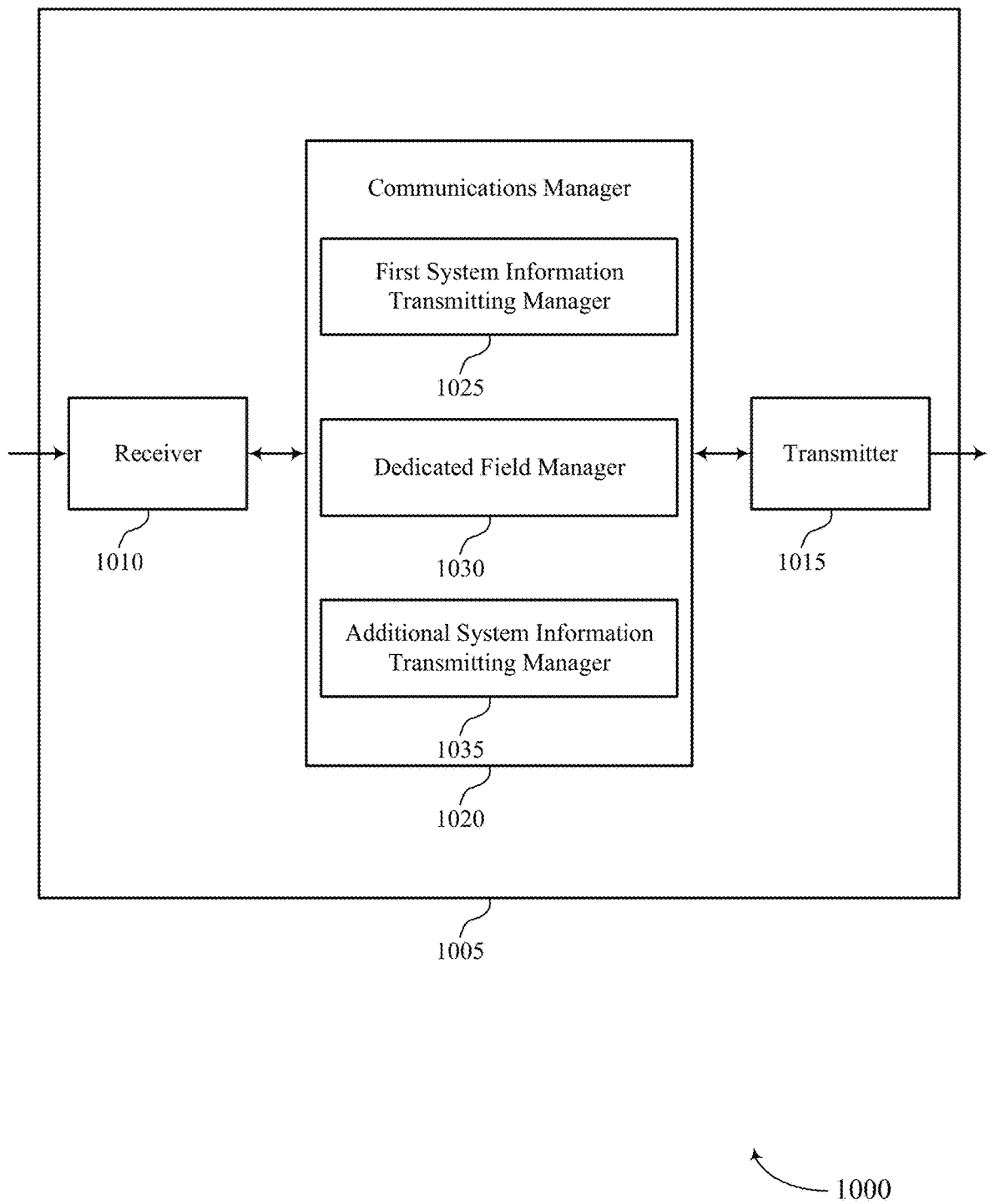

FIG. 10 shows a block diagram 1000 of a device 1005 that supports techniques for adaptatively requesting ODSI in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for adaptatively requesting ODSI). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to size-based neural network selection for autoencoder-based communication). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for adaptatively requesting ODSI as described herein. For example, the communications manager 1020 may include a first system information transmitting manager 1025, a dedicated field manager 1030, an additional system information transmitting manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The first system information transmitting manager 1025 may be configured to provide or support a means for transmitting first system information to a UE, the first system information being for reduced-capability UEs including UEs with a bandwidth capability below a threshold, the UE being a reduced-capability UE. The dedicated field manager 1030 may be configured to provide or support a means for evaluating the first system information for a dedicated field that includes an indicator that additional system information for reduced-capability UEs is to be transmitted in response to on-demand requests. The additional system information transmitting manager 1035 may be configured to provide or support a means for transmitting the additional system information for reduced-capability UEs in accordance with information included in either the dedicated field when the dedicated field is included in the first system information or in a configuration information element of the first system information when the dedicated field is absent from the first system information.

Figure 11:
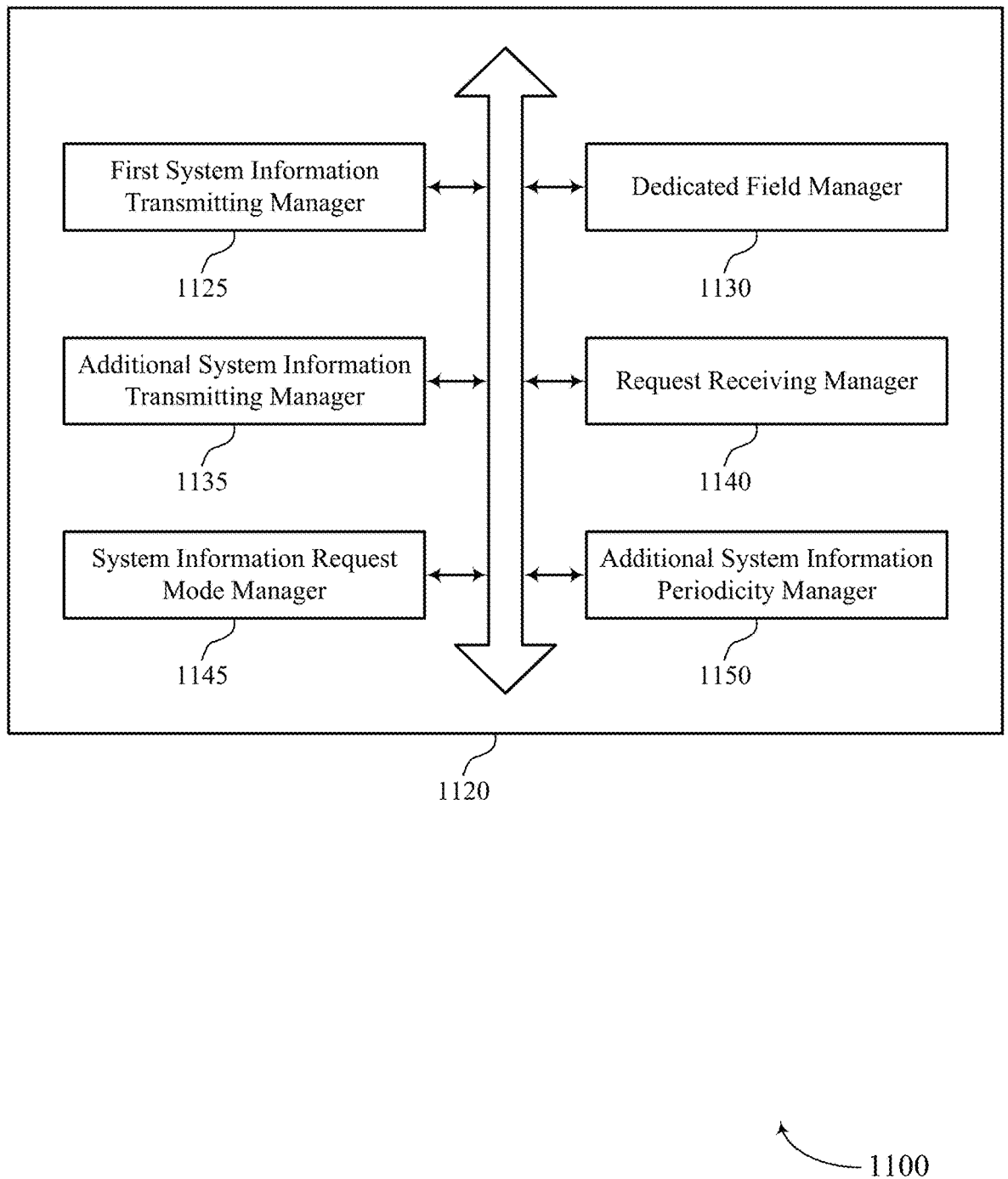
FIG. 11 shows a block diagram of a communications manager that supports techniques for adaptively requesting ODSI in accordance with aspects of the present disclosure.

FIG. 11 shows a block diagram 1100 of a communications manager 1120 that supports techniques for adaptatively requesting ODSI in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for adaptatively requesting ODSI as described herein. For example, the communications manager 1120 may include a first system information transmitting manager 1125, a dedicated field manager 1130, an additional system information transmitting manager 1135, a request receiving manager 1140, a system information request mode manager 1145, an additional system information periodicity manager 1150, or any combination thereof. Each of these components may communicate, directly or indirectly, with one another (e.g., via one or more buses).

The communications manager 1120 may support wireless communication at a base station in accordance with examples as disclosed herein. The first system information transmitting manager 1125 may be configured to provide or support a means for transmitting first system information to a UE, the first system information being for reduced-capability UEs including UEs with a bandwidth capability below a threshold, the UE being a reduced-capability UE. The dedicated field manager 1130 may be configured to provide or support a means for evaluating the first system information for a dedicated field that includes an indicator that additional system information for reduced-capability UEs is to be transmitted in response to on-demand requests. The additional system information transmitting manager 1135 may be configured to provide or support a means for transmitting the additional system information for reduced-capability UEs in accordance with information included in either the dedicated field when the dedicated field is included in the first system information or in a configuration information element of the first system information when the dedicated field is absent from the first system information.

In some examples, to support transmitting the additional system information for reduced-capability UEs, the additional system information transmitting manager 1135 may be configured to provide or support a means for determining that the additional system information is to be transmitted in response to on-demand requests based on the information included in either the dedicated field or in the configuration information element. In some examples, to support transmitting the additional system information for reduced-capability UEs, the request receiving manager 1140 may be configured to provide or support a means for receiving, from the UE, a request for the additional system information in accordance with the information included in either the dedicated field or in the configuration information element.

In some examples, to support transmitting the additional system information for reduced-capability UEs, the system information request mode manager 1145 may be configured to provide or support a means for identifying a system information request mode from the information included in either the dedicated field or in the configuration information element. In some examples, to support transmitting the additional system information for reduced-capability UEs, the request receiving manager 1140 may be configured to provide or support a means for receiving, from the UE and in accordance with the system information request mode, a request for the additional system information via a set of resources associated with a physical random access channel or a sounding reference signal.

In some examples, to support transmitting the additional system information for reduced-capability UEs, the system information request mode manager 1145 may be configured to provide or support a means for identifying a system information request mode from the information included in either the dedicated field or in the configuration information element. In some examples, to support transmitting the additional system information for reduced-capability UEs, the request receiving manager 1140 may be configured to provide or support a means for receiving, from the UE and in accordance with the system information request mode, a request for the additional system information via a set of resources associated with a physical uplink shared channel or a physical uplink control channel.

In some examples, to support transmitting the additional system information for reduced-capability UEs, the system information request mode manager 1145 may be configured to provide or support a means for identifying a system information request mode from the information included in either the dedicated field or in the configuration information element. In some examples, to support transmitting the additional system information for reduced-capability UEs, the request receiving manager 1140 may be configured to provide or support a means for receiving, from the UE and in accordance with the system information request mode, a request for the additional system information via a set of resources associated with a physical random access channel, a sounding reference signal, a physical uplink shared channel, or a physical uplink control channel.

In some examples, to support transmitting the additional system information for reduced-capability UEs, the system information request mode manager 1145 may be configured to provide or support a means for identifying a system information request mode from the information included in either the dedicated field or in the configuration information element. In some examples, to support transmitting the additional system information for reduced-capability UEs, the request receiving manager 1140 may be configured to provide or support a means for transmitting the additional system information from the base station in accordance with the system information request mode without receiving a request for the additional system information.

In some examples, the additional system information transmitting manager 1135 may be configured to provide or support a means for determining a set of thresholds for transmitting a request for the additional system information based on the information included in the dedicated field or in the configuration information element. In some examples, the request receiving manager 1140 may be configured to provide or support a means for receiving, from the UE, the request for the additional system information based on the UE satisfying at least one threshold of the set of thresholds.

In some examples, the dedicated field includes one or more bit fields. In some examples, determining the set of thresholds is based on one or more values of the one or more bit fields of the dedicated field.

In some examples, the set of thresholds for transmitting the request for the additional system information include a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

In some examples, the dedicated field includes one or more bit fields. In some examples, a first value of a bit field of the one or more bit fields indicates that the additional system information for reduced-capability UEs is to be received in response to on-demand requests. In some examples, a second value of the bit field of the one or more bit fields indicates that the additional system information for reduced-capability UEs is not to be received in response to on-demand requests.

In some examples, the additional system information transmitting manager 1135 may be configured to provide or support a means for determining a set of additional system informations which may be requested based on the information included in the dedicated field or in the configuration information element. In some examples, the request receiving manager 1140 may be configured to provide or support a means for receiving, from the UE, an indication of the additional system information included within the set of additional system informations, where transmitting the additional system information is based on receiving the indication of the additional system information.

In some examples, the additional system information transmitting manager 1135 may be configured to provide or support a means for determining a set of parameters usable by the base station to transmit the additional system information based on the information included in the dedicated field or in the configuration information element. In some examples, the request receiving manager 1140 may be configured to provide or support a means for receiving, from the UE, an indication of one or more parameters included within the set of parameters, where transmitting the additional system information is based on receiving the indication of the one or more parameters.

In some examples, the one or more parameters includes an MCS, a code rate, or both. In some examples, the one or more parameters used to transmit the additional system information are different from at least one parameter used to transmit the first system information.

In some examples, the additional system information periodicity manager 1150 may be configured to provide or support a means for determining a periodicity associated with the additional system information based on the information included in the dedicated field or in the configuration information element, where transmitting the additional system information is based on determining the periodicity. In some examples, the periodicity associated with the additional system information is different from a periodicity associated with the first system information.

In some examples, the first system information includes a SIB of a first type (e.g., SIB1), an MIB, an SSB, or any combination thereof. In some examples, the additional system information includes a SIB of a second type (e.g., SIB2, SIB3) which is different from the first type. In some examples, the first system information is transmitted multiplexed with other system information receivable by the other UEs.

In some examples, the first system information is transmitted via a PBCH associated with reduced-capability UEs, a PDSCH associated with reduced-capability UEs, or both.

Figure 12:
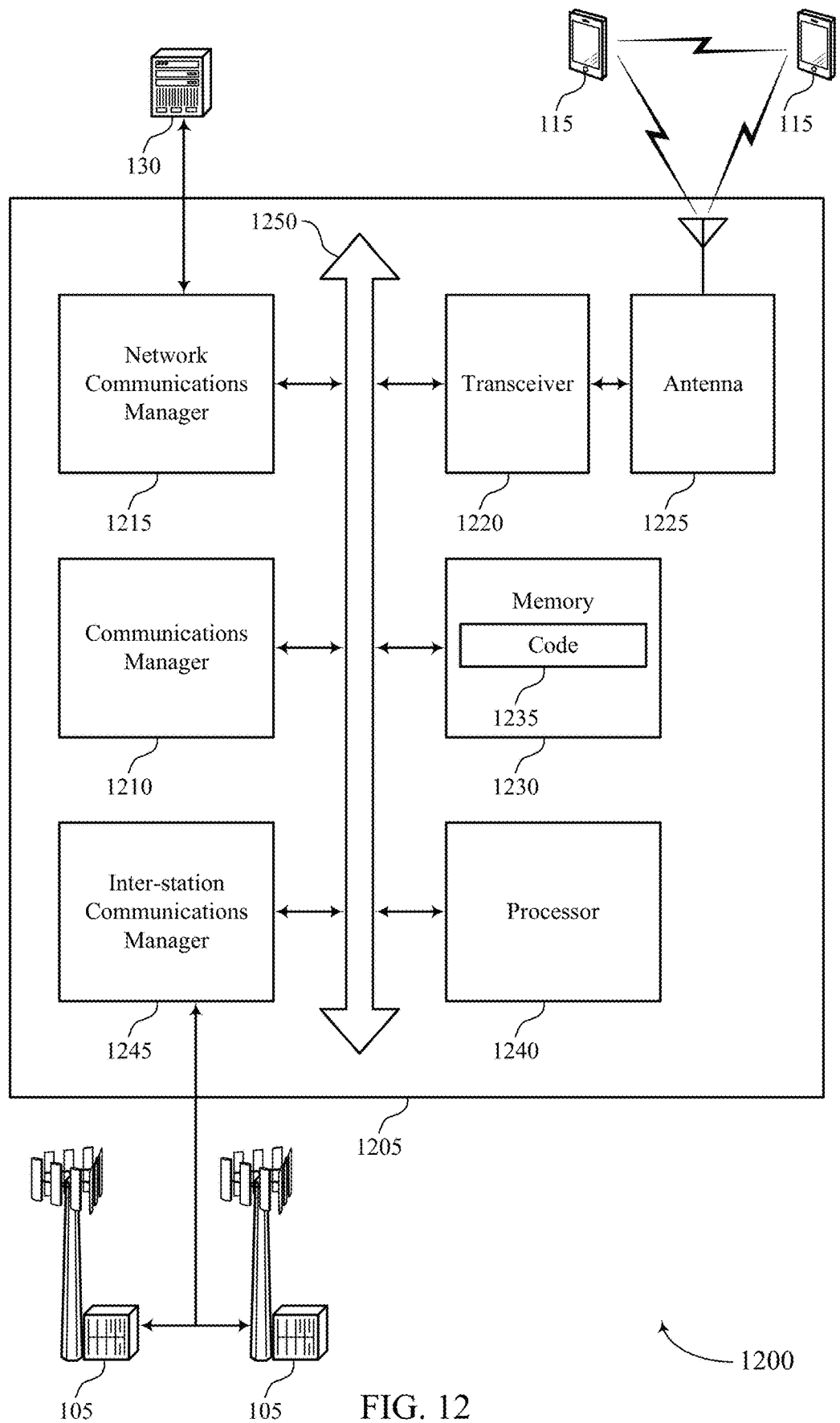
FIG. 12 shows a diagram of a system including a device that supports techniques for adaptively requesting ODSI in accordance with aspects of the present disclosure.

FIG. 12 shows a diagram of a system 1200 including a device 1205 that supports techniques for adaptively requesting ODSI in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, including a communications manager 1210, a network communications manager 1215, a transceiver 1220, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1215 may manage communications with a core network (e.g., via one or more wired backhaul links). For example, the network communications manager 1215 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1220 may communicate bi-directionally, via the one or more antennas 1225, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to one or more antennas 1225 for transmission, and to demodulate packets received from the one or more antennas 1225. The transceiver 1220, or the transceiver 1220 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for adaptatively requesting ODSI). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1210 may support wireless communication at a base station in accordance with examples as disclosed herein. For example, the communications manager 1210 may be configured to provide or support a means for transmitting first system information to a UE, the first system information being for reduced-capability UEs including UEs with a bandwidth capability below a threshold, the UE being a reduced-capability UE. The communications manager 1210 may be configured to provide or support a means for evaluating the first system information for a dedicated field that includes an indicator that additional system information for reduced-capability UEs is to be transmitted in response to on-demand requests. The communications manager 1210 may be configured to provide or support a means for transmitting the additional system information for reduced-capability UEs in accordance with information included in either the dedicated field when the dedicated field is included in the first system information or in a configuration information element of the first system information when the dedicated field is absent from the first system information.

By including or configuring the communications manager 1210 in accordance with examples as described herein, the device 1205 may support techniques for on-demand broadcasts of system information for reduced-capability UEs 115, which may reduce signaling overhead and lead to more efficient use of resources within a wireless communications system. In particular, techniques described herein may the base station 105 to transmit additional system information for reduced-capability UEs 115 on an as-needed basis (e.g., in response to on-demand requests), which may reduce signaling overhead and prevent wasted resources in cases where there are few (or no) reduced-capability UEs 115 which are to receive the additional system information. Additionally, by enabling the base station 105 to indicate to UEs 115 whether additional system information may be received in response to on-demand requests, techniques described herein may enable the base station 105 to transmit additional system information for reduced-capability UEs 115 on an as-needed basis, which may reduce power consumption and signaling at the base station 105 which is associated with continuously or regularly broadcasting the additional system information.

In some examples, the communications manager 1210 may be configured to perform various operations (e.g., receiving, monitoring, transmitting) using or otherwise in cooperation with the transceiver 1220, the one or more antennas 1225, or any combination thereof. Although the communications manager 1210 is illustrated as a separate component, in some examples, one or more functions described with reference to the communications manager 1210 may be supported by or performed by the processor 1240, the memory 1230, the code 1235, or any combination thereof. For example, the code 1235 may include instructions executable by the processor 1240 to cause the device 1205 to perform various aspects of techniques for adaptatively requesting ODSI as described herein, or the processor 1240 and the memory 1230 may be otherwise configured to perform or support such operations.

Figure 13:
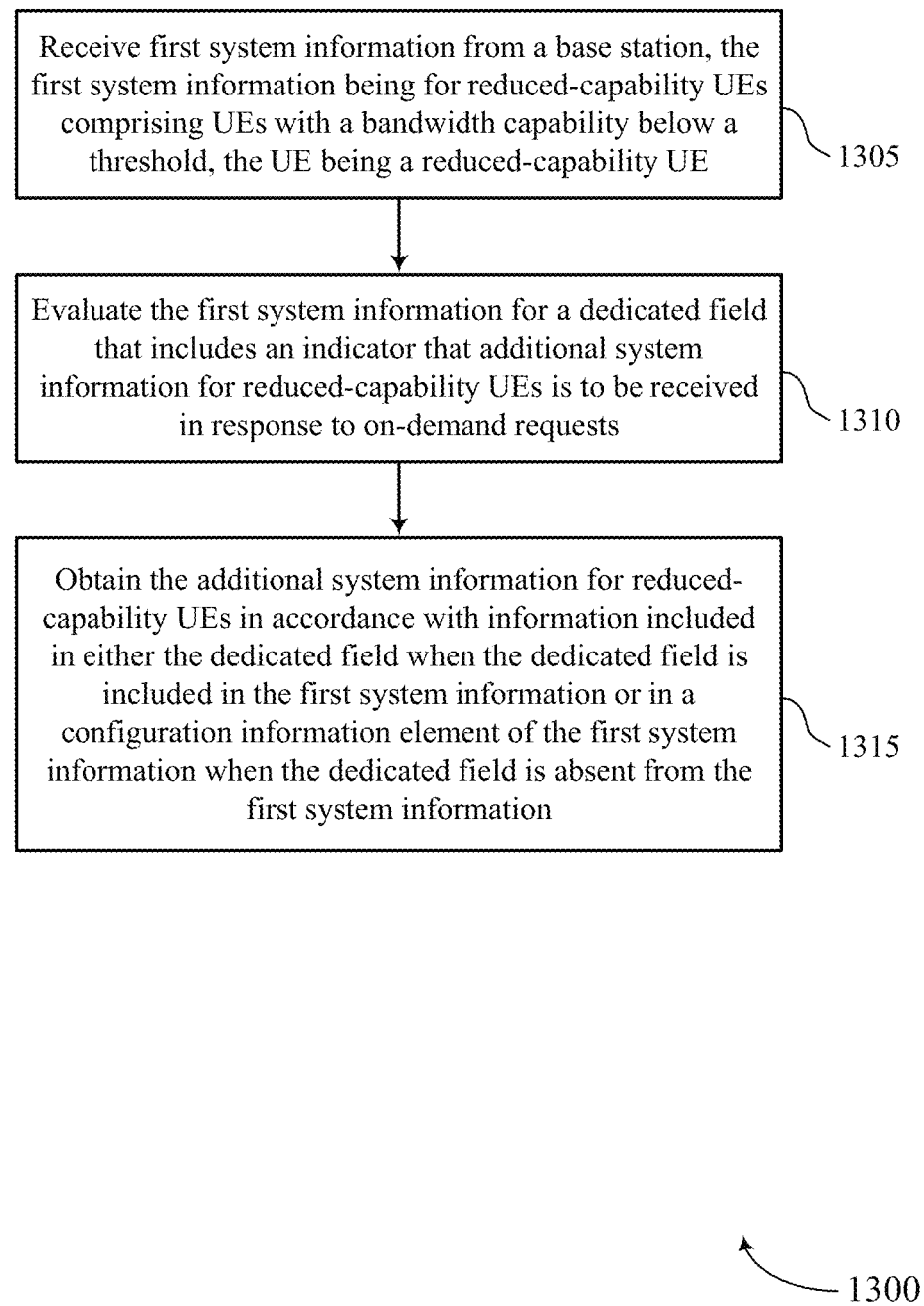
FIGS. 13 through 16 show flowcharts illustrating methods that support techniques for adaptively requesting ODSI in accordance with aspects of the present disclosure.

FIG. 13 shows a flowchart illustrating a method 1300 that supports techniques for adaptatively requesting ODSI in accordance with aspects of the present disclosure. The operations of the method 1200 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving first system information from a base station, the first system information being for reduced-capability UEs including UEs with a bandwidth capability below a threshold, the UE being a reduced-capability UE. The operations of 1305 may be performed according to the methods described herein. In some examples, aspects of the operations of 1305 may be performed by a first system information receiving manager 725 as described with reference to FIG. 7.

At 1310, the method may include evaluating the first system information for a dedicated field that includes an indicator that additional system information for reduced-capability UEs is to be received in response to on-demand requests. The operations of 1710 may be performed according to the methods described herein. In some examples, aspects of the operations of 1310 may be performed by a dedicated field manager 730 as described with reference to FIG. 7.

At 1315, the method may include obtaining the additional system information for reduced-capability UEs in accordance with information included in either the dedicated field when the dedicated field is included in the first system information or in a configuration information element of the first system information when the dedicated field is absent from the first system information. The operations of 1315 may be performed according to the methods described herein. In some examples, aspects of the operations of 1315 may be performed by an additional system information receiving manager 735 as described with reference to FIG. 7.

Figure 14:
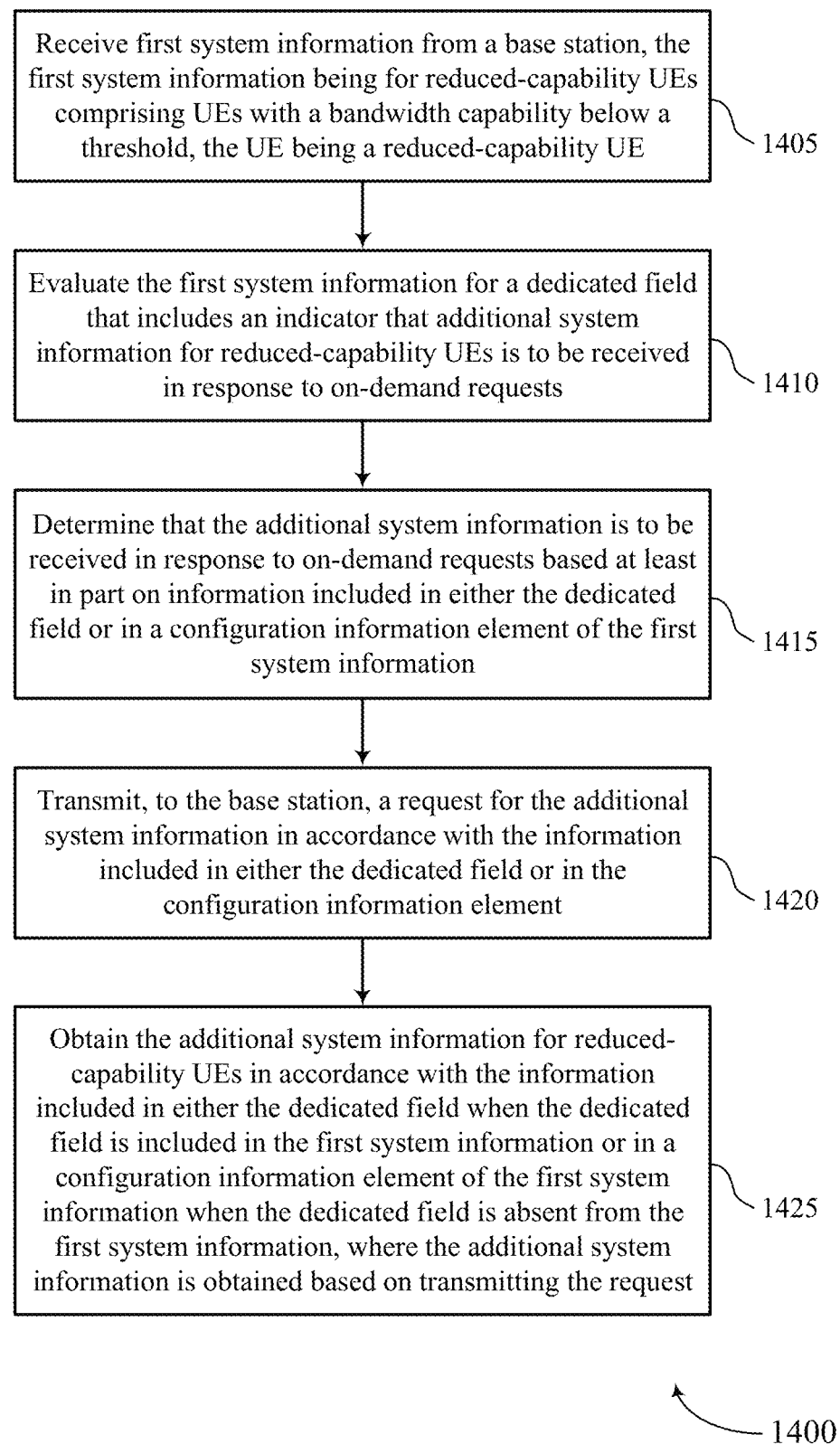

FIG. 14 shows a flowchart illustrating a method 1400 that supports techniques for adaptively requesting ODSI in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving first system information from a base station, the first system information being for reduced-capability UEs including UEs with a bandwidth capability below a threshold, the UE being a reduced-capability UE. The operations of 1405 may be performed according to the methods described herein. In some examples, aspects of the operations of 1405 may be performed by a first system information receiving manager 725 as described with reference to FIG. 7.

At 1410, the method may include evaluating the first system information for a dedicated field that includes an indicator that additional system information for reduced-capability UEs is to be received in response to on-demand requests. The operations of 1410 may be performed according to the methods described herein. In some examples, aspects of the operations of 1410 may be performed by a dedicated field manager 730 as described with reference to FIG. 7.

At 1415, the method may include determining that the additional system information is to be received in response to on-demand requests based on information included in either the dedicated field or in a configuration information element of the first system information. The operations of 1415 may be performed according to the methods described herein. In some examples, aspects of the operations of 1415 may be performed by an additional system information receiving manager 735 as described with reference to FIG. 7.

At 1420, the method may include transmitting, to the base station, a request for the additional system information in accordance with the information included in either the dedicated field or in the configuration information element. The operations of 1420 may be performed according to the methods described herein. In some examples, aspects of the operations of 1420 may be performed by a request transmitting manager 740 as described with reference to FIG. 7.

At 1425, the method may include obtaining the additional system information for reduced-capability UEs in accordance with the information included in either the dedicated field when the dedicated field is included in the first system information or in a configuration information element of the first system information when the dedicated field is absent from the first system information, where the additional system information is obtained based on transmitting the request. The operations of 1425 may be performed according to the methods described herein. In some examples, aspects of the operations of 1425 may be performed by an additional system information receiving manager 735 as described with reference to FIG. 7.

Figure 15:
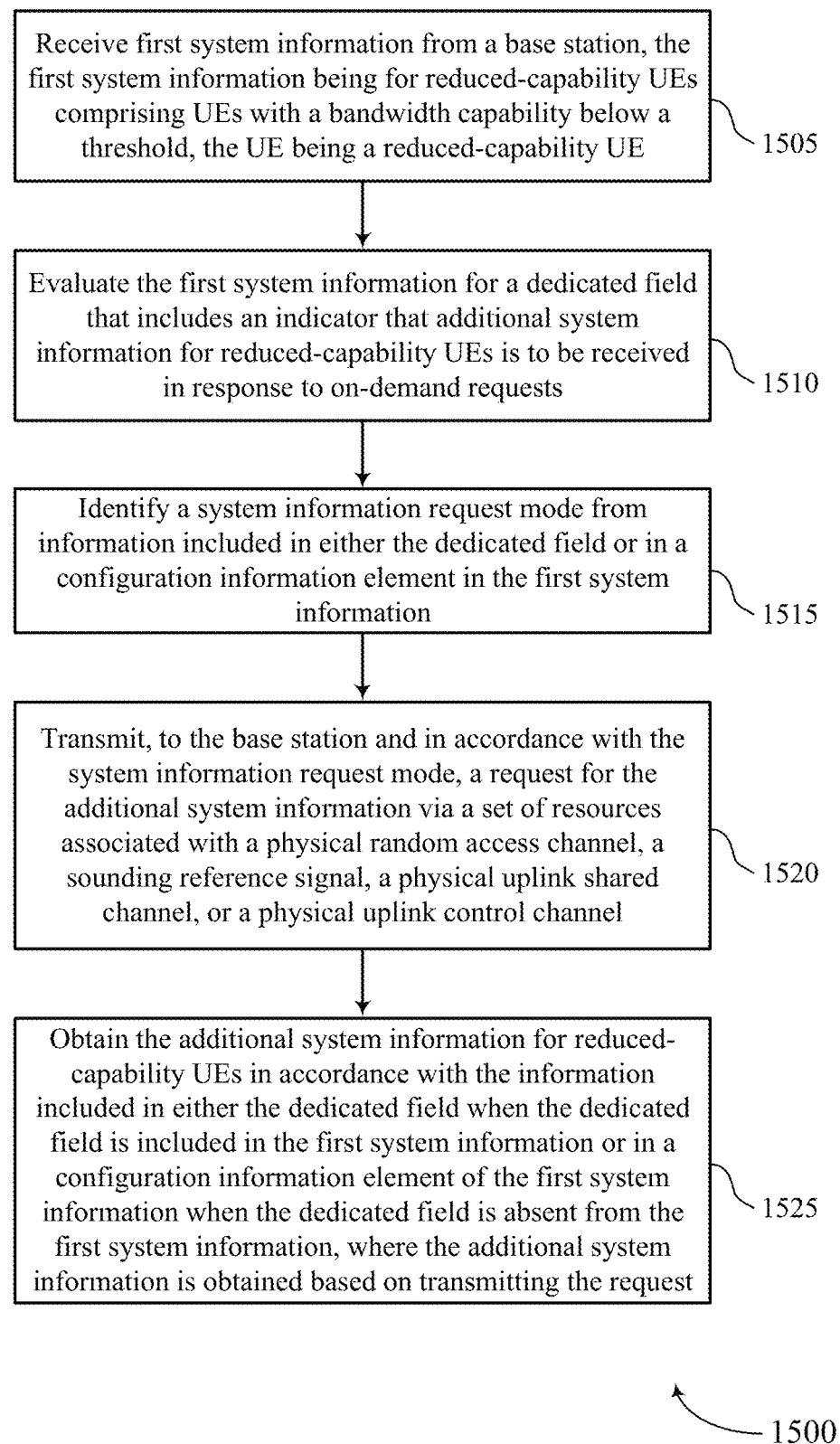

FIG. 15 shows a flowchart illustrating a method 1400 that supports techniques for adaptively requesting ODSI in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving first system information from a base station, the first system information being for reduced-capability UEs including UEs with a bandwidth capability below a threshold, the UE being a reduced-capability UE. The operations of 1505 may be performed according to the methods described herein. In some examples, aspects of the operations of 1505 may be performed by a first system information receiving manager 725 as described with reference to FIG. 7.

At 1510, the method may include evaluating the first system information for a dedicated field that includes an indicator that additional system information for reduced-capability UEs is to be received in response to on-demand requests. The operations of 1510 may be performed according to the methods described herein. In some examples, aspects of the operations of 1510 may be performed by a dedicated field manager 730 as described with reference to FIG. 7.

At 1515, the method may include identifying a system information request mode from information included in either the dedicated field or in a configuration information element of the first system information. The operations of 1515 may be performed according to the methods described herein. In some examples, aspects of the operations of 1515 may be performed by a system information request mode manager 745 as described with reference to FIG. 7.

At 1520, the method may include transmitting, to the base station and in accordance with the system information request mode, a request for the additional system information via a set of resources associated with a physical random access channel, a sounding reference signal, a physical uplink shared channel, or a physical uplink control channel. The operations of 1520 may be performed according to the methods described herein. In some examples, aspects of the operations of 1520 may be performed by a request transmitting manager 740 as described with reference to FIG. 7.

At 1525, the method may include obtaining the additional system information for reduced-capability UEs in accordance with information included in either the dedicated field when the dedicated field is included in the first system information or in a configuration information element of the first system information when the dedicated field is absent from the first system information, where the additional system information is obtained based on transmitting the request. The operations of 1525 may be performed according to the methods described herein. In some examples, aspects of the operations of 1525 may be performed by an additional system information receiving manager 735 as described with reference to FIG. 7.

Figure 16:
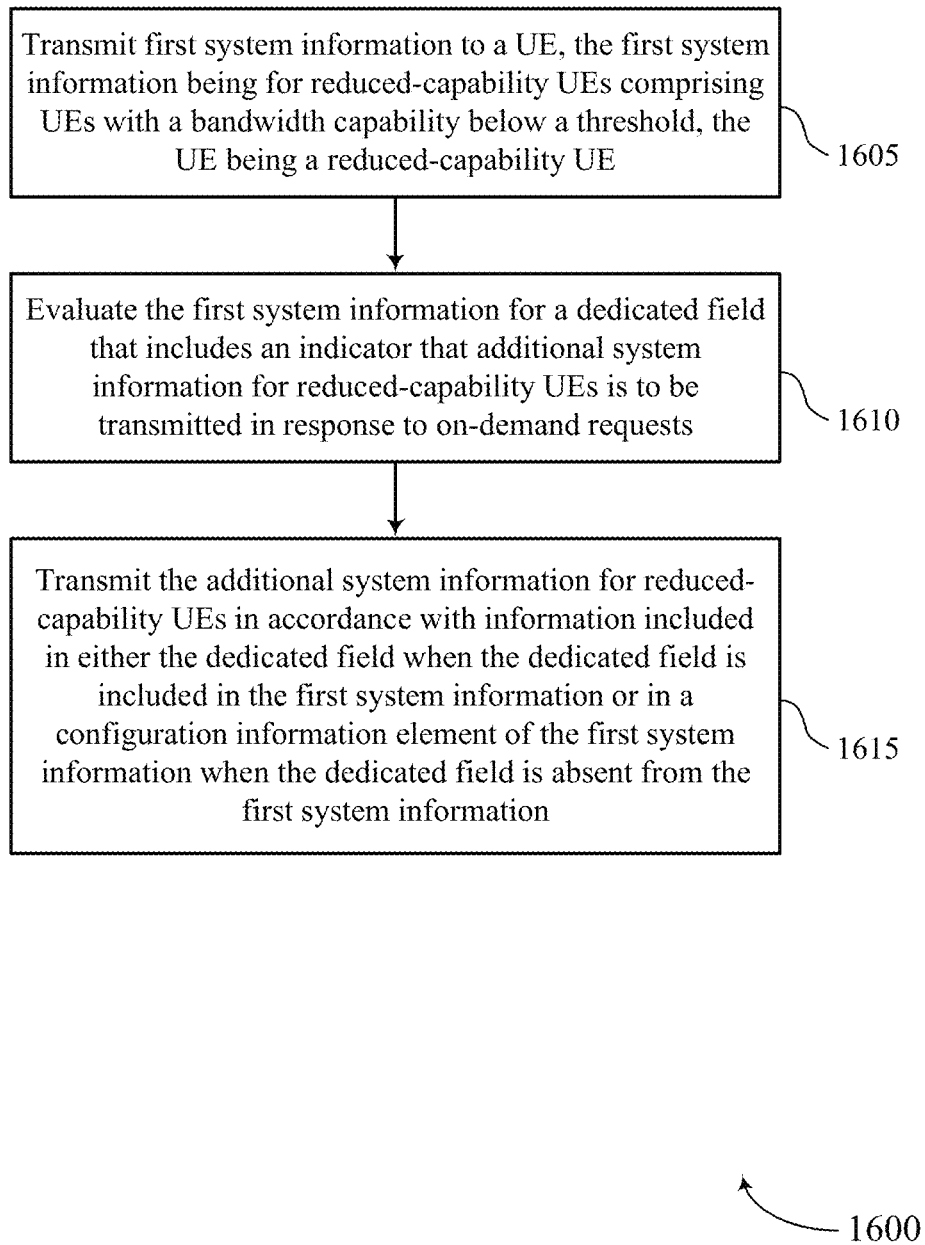

FIG. 16 shows a flowchart illustrating a method 1600 that supports techniques for adaptatively requesting ODSI in accordance with aspects of the present disclosure. The operations of the method 1600 may be implemented by a base station or its components as described herein. For example, the operations of the method 1600 may be performed by a base station 105 as described with reference to FIGS. 1 through 3 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting first system information to a UE, the first system information being for reduced-capability UEs including UEs with a bandwidth capability below a threshold, the UE being a reduced-capability UE. The operations of 1605 may be performed according to the methods described herein. In some examples, aspects of the operations of 1605 may be performed by a first system information transmitting manager 1125 as described with reference to FIG. 11.

At 1610, the method may include evaluating the first system information for a dedicated field that includes an indicator that additional system information for reduced-capability UEs is to be transmitted in response to on-demand requests. The operations of 1610 may be performed according to the methods described herein. In some examples, aspects of the operations of 1610 may be performed by a dedicated field manager 1130 as described with reference to FIG. 11.

At 1615, the method may include transmitting the additional system information for reduced-capability UEs in accordance with information included in either the dedicated field when the dedicated field is included in the first system information or in a configuration information element of the first system information when the dedicated field is absent from the first system information. The operations of 1615 may be performed according to the methods described herein. In some examples, aspects of the operations of 1615 may be performed by an additional system information transmitting manager 1135 as described with reference to FIG. 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving first system information from a base station, the first system information being for reduced-capability UEs comprising UEs with a bandwidth capability below a threshold, the UE being a reduced-capability UE; evaluating the first system information for a dedicated field that includes an indicator that additional system information for reduced-capability UEs is to be received in response to on-demand requests; and obtaining the additional system information for reduced-capability UEs in accordance with information included in either the dedicated field when the dedicated field is included in the first system information or in a configuration information element of the first system information when the dedicated field is absent from the first system information.

Aspect 2: The method of aspect 1, wherein obtaining the additional system information for reduced-capability UEs comprises: determining that the additional system information is to be received in response to on-demand requests based at least in part on the information included in either the dedicated field or in the configuration information element; and transmitting, to the base station, a request for the additional system information in accordance with the information included in either the dedicated field or in the configuration information element.

Aspect 3: The method of any of aspects 1 through 2, wherein obtaining the additional system information for reduced-capability UEs comprises: identifying a system information request mode from the information included in either the dedicated field or in the configuration information element; and transmitting, to the base station and in accordance with the system information request mode, a request for the additional system information via a set of resources associated with a PRACH, a SRS, a PUSCH, or a PUCCH.

Aspect 4: The method of any of aspects 1 through 3, wherein obtaining the additional system information for reduced-capability UEs comprises: identifying a system information request mode from the information included in either the dedicated field or in the configuration information element; and obtaining the additional system information from the base station in accordance with the system information request mode without transmitting a request for the additional system information.

Aspect 5: The method of any of aspects 1 through 4, further comprising: determining a set of thresholds for transmitting a request for the additional system information based at least in part on the information included in the dedicated field or in the configuration information element; and transmitting, to the base station, the request for the additional system information based at least in part on determining that the UE satisfies at least one threshold of the set of thresholds.

Aspect 6: The method of aspect 5, wherein the dedicated field comprises one or more bit fields, and determining the set of thresholds is based at least in part on one or more values of the one or more bit fields of the dedicated field.

Aspect 7: The method of any of aspects 5 through 6, wherein the set of thresholds for transmitting the request for the additional system information comprise a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

Aspect 8: The method of any of aspects 1 through 7, wherein the first system information is received via a first downlink BWP associated with reduced-capability UEs, the method further comprising: receiving, via the first system information, an indication of a second downlink BWP for obtaining the additional system information, wherein the additional system information is obtained via the second downlink BWP, wherein the second downlink BWP is associated with reduced-capability UEs, and wherein the second downlink BWP is the same as the first downlink BWP or different from the first downlink BWP.

Aspect 9: The method of any of aspects 1 through 8, further comprising: transmitting, to the base station, a request for the additional system information via an uplink BWP associated with reduced-capability UEs, wherein the uplink BWP is indicated via the first system information.

Aspect 10: The method of any of aspects 1 through 9, wherein the dedicated field comprises one or more bit fields, a first value of a bit field of the one or more bit fields indicates that the additional system information for reduced-capability UEs is to be received in response to on-demand requests, and a second value of the bit field of the one or more bit fields indicates that the additional system information for reduced-capability UEs is not to be received in response to on-demand requests.

Aspect 11: The method of any of aspects 1 through 10, further comprising: determining a set of additional system informations for reduced-capability UEs which may be requested based at least in part on the information included in the dedicated field or in the configuration information element, wherein the set of additional system informations include SSBs, downlink broadcast reference signals, CORESETs, CSS configurations for random access procedures, paging and system information update information, or any combination thereof; and transmitting, to the base station, an indication of the additional system information included within the set of additional system informations, wherein obtaining the additional system information is based at least in part on transmitting the indication of the additional system information.

Aspect 12: The method of any of aspects 1 through 11, further comprising: determining a set of parameters usable by the base station to transmit the additional system information based at least in part on the information included in the dedicated field or in the configuration information element; and transmitting, to the base station, an indication of one or more parameters included within the set of parameters, wherein obtaining the additional system information is based at least in part on transmitting the indication of the one or more parameters.

Aspect 13: The method of aspect 12, wherein the one or more parameters comprises an MCS, a code rate, or both.

Aspect 14: The method of any of aspects 12 through 13, wherein the one or more parameters used to obtain the additional system information are different from at least one parameter used to receive the first system information.

Aspect 15: The method of any of aspects 1 through 14, further comprising: determining a periodicity associated with the additional system information based at least in part on the information included in the dedicated field or in the configuration information element, wherein obtaining the additional system information is based at least in part on determining the periodicity.

Aspect 16: The method of aspect 15, wherein the periodicity associated with the additional system information is different from a periodicity associated with the first system information, and the periodicity associated with the additional system information is based at least in part on information included within the additional system information, the information comprising SSBs, downlink broadcast reference signals, CORESETs, CSS configurations for random access procedures, paging and system information update information, or any combination thereof.

Aspect 17: The method of any of aspects 1 through 16, wherein the first system information comprises an SIB of a first type, a MIB (MIB) of a first type, or a combination thereof, the method further comprising: receiving, via the first system information, an indication of one or more downlink BWP configurations associated with reduced-capability UEs for receiving the first system information, one or more uplink BWP configurations associated with reduced-capability UEs for transmitting requests for the additional system information, one or more additional downlink BWP configurations associated with reduced-capability UEs for receiving the additional system information, or any combination thereof.

Aspect 18: The method of aspect 17, wherein the additional system information comprises a SIB of a second type which is different from the first type, a MIB of a second type, or a combination thereof.

Aspect 19: The method of any of aspects 1 through 18, wherein the first system information is received multiplexed with other system information receivable by the other UEs.

Aspect 20: The method of any of aspects 1 through 19, wherein the first system information is received via a PBCH associated with reduced-capability UEs, a PDSCH associated with reduced-capability UEs, or both.

Aspect 21: A method for wireless communication at a base station, comprising: transmitting first system information to a UE, the first system information being for reduced-capability UEs comprising UEs with a bandwidth capability below a threshold, the UE being a reduced-capability UE evaluating the first system information for a dedicated field that includes an indicator that additional system information for reduced-capability UEs is to be transmitted in response to on-demand requests; and transmitting the additional system information for reduced-capability UEs in accordance with information included in either the dedicated field when the dedicated field is included in the first system information or in a configuration information element of the first system information when the dedicated field is absent from the first system information.

Aspect 22: The method of aspect 21, wherein transmitting the additional system information for reduced-capability UEs comprises: determining that the additional system information is to be transmitted in response to on-demand requests based at least in part on the information included in either the dedicated field or in the configuration information element; and receiving, from the UE, a request for the additional system information in accordance with the information included in either the dedicated field or in the configuration information element.

Aspect 23: The method of any of aspects 21 through 22, wherein transmitting the additional system information for reduced-capability UEs comprises: identifying a system information request mode from the information included in either the dedicated field or in the configuration information element; and receiving, from the UE and in accordance with the system information request mode, a request for the additional system information via a set of resources associated with a PRACH, a SRS, a PUSCH, or a PUCCH.

Aspect 24: The method of any of aspects 21 through 23, wherein transmitting the additional system information for reduced-capability UEs comprises: identifying a system information request mode from the information included in either the dedicated field or in the configuration information element; and transmitting the additional system information from the base station in accordance with the system information request mode without receiving a request for the additional system information.

Aspect 25: The method of any of aspects 21 through 24, further comprising: determining a set of thresholds for transmitting a request for the additional system information based at least in part on the information included in the dedicated field or in the configuration information element; and receiving, from the UE, the request for the additional system information based at least in part on the UE satisfying at least one threshold of the set of thresholds, wherein the set of thresholds comprise a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

Aspect 26: The method of any of aspects 21 through 25, wherein the first system information, the additional system information, or both, are received via a downlink BWP associated with reduced-capability UEs.

Aspect 27: The method of any of aspects 21 through 26, further comprising: receiving, from the UE, a request for the additional system information via an uplink BWP associated with reduced-capability UEs.

Aspect 28: The method of any of aspects 21 through 27, wherein the dedicated field comprises one or more bit fields, a first value of a bit field of the one or more bit fields indicates that the additional system information for reduced-capability UEs is to be received in response to on-demand requests, and a second value of the bit field of the one or more bit fields indicates that the additional system information for reduced-capability UEs is not to be received in response to on-demand requests.

Aspect 29: A method for wireless communication at a UE, comprising: receiving first system information from a base station, the first system information being for reduced-capability UEs comprising UEs with a bandwidth capability below a threshold, the UE being a reduced-capability UE; evaluating the first system information for a dedicated field that includes an indicator that additional system information for reduced-capability UEs is to be received in response to on-demand requests; and obtaining the additional system information for reduced-capability UEs in accordance with information included in either the dedicated field when the dedicated field is included in the first system information or in a configuration information element of the first system information when the dedicated field is absent from the first system information.

Aspect 30: The method of aspect 29, wherein obtaining the additional system information for reduced-capability UEs comprises: determining that the additional system information is to be received in response to on-demand requests based at least in part on the information included in either the dedicated field or in the configuration information element; and transmitting, to the base station, a request for the additional system information in accordance with the information included in either the dedicated field or in the configuration information element.

Aspect 31: The method of any of aspects 29 through 30, wherein obtaining the additional system information for reduced-capability UEs comprises: identifying a system information request mode from the information included in either the dedicated field or in the configuration information element; and transmitting, to the base station and in accordance with the system information request mode, a request for the additional system information via a set of resources associated with a PRACH or a SRS.

Aspect 32: The method of any of aspects 29 through 31, wherein obtaining the additional system information for reduced-capability UEs comprises: identifying a system information request mode from the information included in either the dedicated field or in the configuration information element; and transmitting, to the base station and in accordance with the system information request mode, a request for the additional system information via a set of resources associated with a PUSCH or a PUCCH.

Aspect 33: The method of any of aspects 29 through 32, wherein obtaining the additional system information for reduced-capability UEs comprises: identifying a system information request mode from the information included in either the dedicated field or in the configuration information element; and transmitting, to the base station and in accordance with the system information request mode, a request for the additional system information via a set of resources associated with a PRACH, a SRS, a PUSCH, or a PUCCH.

Aspect 34: The method of any of aspects 29 through 33, wherein obtaining the additional system information for reduced-capability UEs comprises: identifying a system information request mode from the information included in either the dedicated field or in the configuration information element; and obtaining the additional system information from the base station in accordance with the system information request mode without transmitting a request for the additional system information.

Aspect 35: The method of any of aspects 29 through 34, further comprising: determining a set of thresholds for transmitting a request for the additional system information based at least in part on the information included in the dedicated field or in the configuration information element; and transmitting, to the base station, the request for the additional system information based at least in part on determining that the UE satisfies at least one threshold of the set of thresholds.

Aspect 36: The method of aspect 35, wherein the dedicated field comprises one or more bit fields, and determining the set of thresholds is based at least in part on one or more values of the one or more bit fields of the dedicated field.

Aspect 37: The method of any of aspects 35 through 36, wherein the set of thresholds for transmitting the request for the additional system information comprise a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

Aspect 38: The method of any of aspects 29 through 37, wherein the dedicated field comprises one or more bit fields, a first value of a bit field of the one or more bit fields indicates that the additional system information for reduced-capability UEs is to be received in response to on-demand requests, and a second value of the bit field of the one or more bit fields indicates that the additional system information for reduced-capability UEs is not to be received in response to on-demand requests.

Aspect 39: The method of any of aspects 29 through 38, further comprising: determining a set of additional system informations which may be requested based at least in part on the information included in the dedicated field or in the configuration information element; and transmitting, to the base station, an indication of the additional system information included within the set of additional system informations, wherein obtaining the additional system information is based at least in part on transmitting the indication of the additional system information.

Aspect 40: The method of any of aspects 29 through 39, further comprising: determining a set of parameters usable by the base station to transmit the additional system information based at least in part on the information included in the dedicated field or in the configuration information element; and transmitting, to the base station, an indication of one or more parameters included within the set of parameters, wherein obtaining the additional system information is based at least in part on transmitting the indication of the one or more parameters.

Aspect 41: The method of aspect 40, wherein the one or more parameters comprises an MCS, a code rate, or both.

Aspect 42: The method of any of aspects 40 through 41, wherein the one or more parameters used to obtain the additional system information are different from at least one parameter used to receive the first system information.

Aspect 43: The method of any of aspects 29 through 42, further comprising: determining a periodicity associated with the additional system information based at least in part on the information included in the dedicated field or in the configuration information element, wherein obtaining the additional system information is based at least in part on determining the periodicity.

Aspect 44: The method of aspect 43, wherein the periodicity associated with the additional system information is different from a periodicity associated with the first system information.

Aspect 45: The method of any of aspects 29 through 44, wherein the first system information comprises an SIB of a first type, a MIB (MIB), or a combination thereof.

Aspect 46: The method of aspect 45, wherein the additional system information comprises an SIB of a second type which is different from the first type.

Aspect 47: The method of any of aspects 29 through 46, wherein the first system information is received multiplexed with other system information receivable by the other UEs.

Aspect 48: The method of any of aspects 29 through 47, wherein the first system information is received via a PBCH associated with reduced-capability UEs, a PDSCH associated with reduced-capability UEs, or both.

Aspect 49: A method for wireless communication at a base station, comprising: transmitting first system information to a UE, the first system information being for reduced-capability UEs comprising UEs with a bandwidth capability below a threshold, the UE being a reduced-capability UE evaluating the first system information for a dedicated field that includes an indicator that additional system information for reduced-capability UEs is to be transmitted in response to on-demand requests; and transmitting the additional system information for reduced-capability UEs in accordance with information included in either the dedicated field when the dedicated field is included in the first system information or in a configuration information element of the first system information when the dedicated field is absent from the first system information.

Aspect 50: The method of aspect 49, wherein transmitting the additional system information for reduced-capability UEs comprises: determining that the additional system information is to be transmitted in response to on-demand requests based at least in part on the information included in either the dedicated field or in the configuration information element; and receiving, from the UE, a request for the additional system information in accordance with the information included in either the dedicated field or in the configuration information element.

Aspect 51: The method of any of aspects 49 through 50, wherein transmitting the additional system information for reduced-capability UEs comprises: identifying a system information request mode from the information included in either the dedicated field or in the configuration information element; and receiving, from the UE and in accordance with the system information request mode, a request for the additional system information via a set of resources associated with a PRACH or a SRS.

Aspect 52: The method of any of aspects 49 through 51, wherein transmitting the additional system information for reduced-capability UEs comprises: identifying a system information request mode from the information included in either the dedicated field or in the configuration information element; and receiving, from the UE and in accordance with the system information request mode, a request for the additional system information via a set of resources associated with a PUSCH or a PUCCH.

Aspect 53: The method of any of aspects 49 through 52, wherein transmitting the additional system information for reduced-capability UEs comprises: identifying a system information request mode from the information included in either the dedicated field or in the configuration information element; and receiving, from the UE and in accordance with the system information request mode, a request for the additional system information via a set of resources associated with a PRACH, a SRS, a PUSCH, or a PUCCH.

Aspect 54: The method of any of aspects 49 through 53, wherein transmitting the additional system information for reduced-capability UEs comprises: identifying a system information request mode from the information included in either the dedicated field or in the configuration information element; and transmitting the additional system information from the base station in accordance with the system information request mode without receiving a request for the additional system information.

Aspect 55: The method of any of aspects 49 through 54, further comprising: determining a set of thresholds for transmitting a request for the additional system information based at least in part on the information included in the dedicated field or in the configuration information element; and receiving, from the UE, the request for the additional system information based at least in part on the UE satisfying at least one threshold of the set of thresholds.

Aspect 56: The method of aspect 55, wherein the dedicated field comprises one or more bit fields, and determining the set of thresholds is based at least in part on one or more values of the one or more bit fields of the dedicated field.

Aspect 57: The method of any of aspects 55 through 56, wherein the set of thresholds for transmitting the request for the additional system information comprise a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

Aspect 58: The method of any of aspects 49 through 57, wherein the dedicated field comprises one or more bit fields, a first value of a bit field of the one or more bit fields indicates that the additional system information for reduced-capability UEs is to be received in response to on-demand requests, and a second value of the bit field of the one or more bit fields indicates that the additional system information for reduced-capability UEs is not to be received in response to on-demand requests.

Aspect 59: The method of any of aspects 49 through 58, further comprising: determining a set of additional system informations which may be requested based at least in part on the information included in the dedicated field or in the configuration information element; and receiving, from the UE, an indication of the additional system information included within the set of additional system informations, wherein transmitting the additional system information is based at least in part on receiving the indication of the additional system information.

Aspect 60: The method of any of aspects 49 through 59, further comprising: determining a set of parameters usable by the base station to transmit the additional system information based at least in part on the information included in the dedicated field or in the configuration information element; and receiving, from the UE, an indication of one or more parameters included within the set of parameters, wherein transmitting the additional system information is based at least in part on receiving the indication of the one or more parameters.

Aspect 61: The method of aspect 60, wherein the one or more parameters comprises an MCS, a code rate, or both.

Aspect 62: The method of any of aspects 60 through 61, wherein the one or more parameters used to transmit the additional system information are different from at least one parameter used to transmit the first system information.

Aspect 63: The method of any of aspects 49 through 62, further comprising: determining a periodicity associated with the additional system information based at least in part on the information included in the dedicated field or in the configuration information element, wherein transmitting the additional system information is based at least in part on determining the periodicity.

Aspect 64: The method of aspect 63, wherein the periodicity associated with the additional system information is different from a periodicity associated with the first system information.

Aspect 65: The method of any of aspects 49 through 64, wherein the first system information comprises an SIB of a first type, a MIB (MIB), or a combination thereof.

Aspect 66: The method of aspect 65, wherein the additional system information comprises an SIB of a second type which is different from the first type.

Aspect 67: The method of any of aspects 49 through 66, wherein the first system information is transmitted multiplexed with other system information receivable by the other UEs.

Aspect 68: The method of any of aspects 49 through 67, wherein the first system information is transmitted via a PBCH associated with reduced-capability UEs, a PDSCH associated with reduced-capability UEs, or both.

Aspect 69: An apparatus for wireless communication at a UE, comprising a processor; memory coupled with the processor; and instructions stored in the memory and executable by the processor to cause the apparatus to perform a method of any of aspects 1 through 20.

Aspect 70: An apparatus for wireless communication at a UE, comprising at least one means for performing a method of any of aspects 1 through 20.

Aspect 71: A non-transitory computer-readable medium storing code for wireless communication at a UE, the code comprising instructions executable by a processor to perform a method of any of aspects 1 through 20.

Aspect 72: An apparatus for wireless communication at a base station, comprising a processor; memory coupled with the processor; and instructions stored in the memory and executable by the processor to cause the apparatus to perform a method of any of aspects 21 through 28.

Aspect 73: An apparatus for wireless communication at a base station, comprising at least one means for performing a method of any of aspects 21 through 28.

Aspect 74: A non-transitory computer-readable medium storing code for wireless communication at a base station, the code comprising instructions executable by a processor to perform a method of any of aspects 21 through 28.

Aspect 75: An apparatus for wireless communication at a UE, comprising a processor; memory coupled with the processor; and instructions stored in the memory and executable by the processor to cause the apparatus to perform a method of any of aspects 29 through 48.

Aspect 76: An apparatus for wireless communication at a UE, comprising at least one means for performing a method of any of aspects 29 through 48.

Aspect 77: A non-transitory computer-readable medium storing code for wireless communication at a UE, the code comprising instructions executable by a processor to perform a method of any of aspects 29 through 48.

Aspect 78: An apparatus for wireless communication at a base station, comprising a processor; memory coupled with the processor; and instructions stored in the memory and executable by the processor to cause the apparatus to perform a method of any of aspects 49 through 68.

Aspect 79: An apparatus for wireless communication at a base station, comprising at least one means for performing a method of any of aspects 49 through 68.

Aspect 80: A non-transitory computer-readable medium storing code for wireless communication at a base station, the code comprising instructions executable by a processor to perform a method of any of aspects 49 through 68.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving first system information from a network entity, the first system information being for reduced-capability UEs comprising UEs with a bandwidth capability below a threshold, the UE being a reduced-capability UE;
   evaluating the first system information for a dedicated field that includes an indicator that additional system information for reduced-capability UEs is to be received in response to on-demand requests; and
   obtaining the additional system information for reduced-capability UEs in accordance with information included in either the dedicated field when the dedicated field is included in the first system information or in a configuration information element of the first system information when the dedicated field is absent from the first system information.

2. The method of claim 1, wherein obtaining the additional system information for reduced-capability UEs comprises:
   determining that the additional system information is to be received in response to on-demand requests based at least in part on the information included in either the dedicated field or in the configuration information element; and
   transmitting, to the network entity, a request for the additional system information in accordance with the information included in either the dedicated field or in the configuration information element.

3. The method of claim 1, wherein obtaining the additional system information for reduced-capability UEs comprises:
- identifying a system information request mode from the information included in either the dedicated field or in the configuration information element; and
- transmitting, to the network entity and in accordance with the system information request mode, a request for the additional system information via a set of resources associated with a physical random access channel, a sounding reference signal, a physical uplink shared channel, or a physical uplink control channel.

4. The method of claim 1, wherein obtaining the additional system information for reduced-capability UEs comprises:
- identifying a system information request mode from the information included in either the dedicated field or in the configuration information element; and
- obtaining the additional system information from the network entity in accordance with the system information request mode without transmitting a request for the additional system information.

5. The method of claim 1, further comprising:
- determining a set of thresholds for transmitting a request for the additional system information based at least in part on the information included in the dedicated field or in the configuration information element; and
- transmitting, to the network entity, the request for the additional system information based at least in part on determining that the UE satisfies at least one threshold of the set of thresholds.

6. The method of claim 5, wherein the dedicated field comprises one or more bit fields, and wherein determining the set of thresholds is based at least in part on one or more values of the one or more bit fields of the dedicated field.

7. The method of claim 5, wherein the set of thresholds for transmitting the request for the additional system information comprise a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

8. The method of claim 1, wherein the first system information is received via a first downlink bandwidth part associated with reduced-capability UEs, the method further comprising:
- receiving, via the first system information, an indication of a second downlink bandwidth part for obtaining the additional system information, wherein the additional system information is obtained via the second downlink bandwidth part, wherein the second downlink bandwidth part is associated with reduced-capability UEs, and wherein the second downlink bandwidth part is the same as the first downlink bandwidth part or different from the first downlink bandwidth part.

9. The method of claim 1, further comprising:
- transmitting, to the network entity, a request for the additional system information via an uplink bandwidth part associated with reduced-capability UEs, wherein the uplink bandwidth part is indicated via the first system information.

10. The method of claim 1, wherein the dedicated field comprises one or more bit fields, wherein a first value of a bit field of the one or more bit fields indicates that the additional system information for reduced-capability UEs is to be received in response to on-demand requests, and wherein a second value of the bit field of the one or more bit fields indicates that the additional system information for reduced-capability UEs is not to be received in response to on-demand requests.

11. The method of claim 1, further comprising:
- determining a set of additional system informations for reduced-capability UEs which may be requested based at least in part on the information included in the dedicated field or in the configuration information element, wherein the set of additional system informations include synchronization signal blocks, downlink broadcast reference signals, control resource set configurations, common search space configurations for random access procedures, paging and system information update information, or any combination thereof; and
- transmitting, to the network entity, an indication of the additional system information included within the set of additional system informations, wherein obtaining the additional system information is based at least in part on transmitting the indication of the additional system information.

12. The method of claim 1, further comprising:
- determining a set of parameters usable by the network entity to transmit the additional system information based at least in part on the information included in the dedicated field or in the configuration information element; and
- transmitting, to the network entity, an indication of one or more parameters included within the set of parameters, wherein obtaining the additional system information is based at least in part on transmitting the indication of the one or more parameters.

13. The method of claim 12, wherein the one or more parameters comprises a modulation and coding scheme, a code rate, or both.

14. The method of claim 12, wherein the one or more parameters used to obtain the additional system information are different from at least one parameter used to receive the first system information.

15. The method of claim 1, further comprising:
- determining a periodicity associated with the additional system information based at least in part on the information included in the dedicated field or in the configuration information element, wherein obtaining the additional system information is based at least in part on determining the periodicity.

16. The method of claim 15, wherein the periodicity associated with the additional system information is different from a periodicity associated with the first system information, and wherein the periodicity associated with the additional system information is based at least in part on information included within the additional system information, the information comprising synchronization signal blocks, downlink broadcast reference signals, control resource set configurations, common search space configurations for random access procedures, paging and system information update information, or any combination thereof.

17. The method of claim 1, wherein the first system information comprises a system information block (SIB) of a first type, a master information block (MIB) of a first type, or a combination thereof, the method further comprising:
- receiving, via the first system information, an indication of one or more downlink bandwidth part configurations associated with reduced-capability UEs for receiving the first system information, one or more uplink bandwidth part configurations associated with reduced-capability UEs for transmitting requests for the additional system information, one or more additional downlink bandwidth part configurations associated with reduced-capability UEs for receiving the additional system information, or any combination thereof.

18. The method of claim 17, wherein the additional system information comprises a SIB of a second type which is different from the first type, a MIB of a second type, or a combination thereof.

19. The method of claim 1, wherein the first system information is received multiplexed with other system information receivable by other UEs.

20. The method of claim 1, wherein the first system information is received via a physical broadcast channel associated with reduced-capability UEs, a physical downlink shared channel associated with reduced-capability UEs, or both.

21. A method for wireless communication at a network entity, comprising:
transmitting first system information to a user equipment (UE), the first system information being for reduced-capability UEs comprising UEs with a bandwidth capability below a threshold, the UE being a reduced-capability UE;
evaluating the first system information for a dedicated field that includes an indicator that additional system information for reduced-capability UEs is to be transmitted in response to on-demand requests; and
transmitting the additional system information for reduced-capability UEs in accordance with information included in either the dedicated field when the dedicated field is included in the first system information or in a configuration information element of the first system information when the dedicated field is absent from the first system information.

22. The method of claim 21, wherein transmitting the additional system information for reduced-capability UEs comprises:
determining that the additional system information is to be transmitted in response to on-demand requests based at least in part on the information included in either the dedicated field or in the configuration information element; and
receiving, from the UE, a request for the additional system information in accordance with the information included in either the dedicated field or in the configuration information element.

23. The method of claim 21, wherein transmitting the additional system information for reduced-capability UEs comprises:
identifying a system information request mode from the information included in either the dedicated field or in the configuration information element; and
receiving, from the UE and in accordance with the system information request mode, a request for the additional system information via a set of resources associated with a physical random access channel, a sounding reference signal, a physical uplink shared channel, or a physical uplink control channel.

24. The method of claim 21, wherein transmitting the additional system information for reduced-capability UEs comprises:
identifying a system information request mode from the information included in either the dedicated field or in the configuration information element; and
transmitting the additional system information in accordance with the system information request mode without receiving a request for the additional system information.

25. The method of claim 21, further comprising:
determining a set of thresholds for transmitting a request for the additional system information based at least in part on the information included in the dedicated field or in the configuration information element; and
receiving, from the UE, the request for the additional system information based at least in part on the UE satisfying at least one threshold of the set of thresholds, wherein the set of thresholds comprise a first threshold associated with a bandwidth capability of the UE, a second threshold associated with a quantity of antennas of the UE, a third threshold associated with a signal quality of signals received at the UE, a fourth threshold associated with a quantity of requests for the additional system information which may be transmitted by the UE, or any combination thereof.

26. The method of claim 21, wherein the first system information, the additional system information, or both, are received via a downlink bandwidth part associated with reduced-capability UEs.

27. The method of claim 21, further comprising:
receiving, from the UE, a request for the additional system information via an uplink bandwidth part associated with reduced-capability UEs.

28. The method of claim 21, wherein the dedicated field comprises one or more bit fields, wherein a first value of a bit field of the one or more bit fields indicates that the additional system information for reduced-capability UEs is to be received in response to on-demand requests, and wherein a second value of the bit field of the one or more bit fields indicates that the additional system information for reduced-capability UEs is not to be received in response to on-demand requests.

29. An apparatus for wireless communication at a user equipment (UE), comprising:
at least one processor;
memory coupled with the at least one processor; and
instructions stored in the memory and executable by the at least one processor to cause the apparatus to:
receive first system information from a network entity, the first system information being for reduced-capability UEs comprising UEs with a bandwidth capability below a threshold, the UE being a reduced-capability UE;
evaluate the first system information for a dedicated field that includes an indicator that additional system information for reduced-capability UEs is to be received in response to on-demand requests; and
obtain the additional system information for reduced-capability UEs in accordance with information included in either the dedicated field when the dedicated field is included in the first system information or in a configuration information element of the first system information when the dedicated field is absent from the first system information.

30. An apparatus for wireless communication at a network entity, comprising:
at least one processor;
memory coupled with the at least one processor; and
instructions stored in the memory and executable by the at least one processor to cause the apparatus to:
transmit first system information to a user equipment (UE), the first system information being for reduced-capability UEs comprising UEs with a bandwidth capability below a threshold, the UE being a reduced-capability UE;

evaluate the first system information for a dedicated field that includes an indicator that additional system information for reduced-capability UEs is to be transmitted in response to on-demand requests; and transmit the additional system information for reduced-capability UEs in accordance with information included in either the dedicated field when the dedicated field is included in the first system information or in a configuration information element of the first system information when the dedicated field is absent from the first system information.

\* \* \* \* \*